United States Patent
Jomori et al.

(10) Patent No.: US 12,487,137 B2
(45) Date of Patent: Dec. 2, 2025

(54) PIEZOELECTRIC ELEMENT, PIEZOELECTRIC DEVICE, AND METHOD OF MANUFACTURING PIEZOELECTRIC ELEMENT

(71) Applicant: DENSO CORPORATION, Kariya (JP)

(72) Inventors: Tomoya Jomori, Kariya (JP); Ryuichiro Abe, Kariya (JP); Daisuke Kobayashi, Kariya (JP); Takahiro Higuchi, Kariya (JP); Yutaka Hayakawa, Kariya (JP); Minekazu Sakai, Kariya (JP); Kazuaki Mawatari, Kariya (JP); Yuji Koyama, Kariya (JP); Masaaki Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 319 days.

(21) Appl. No.: 18/297,036

(22) Filed: Apr. 7, 2023

(65) Prior Publication Data
US 2023/0243710 A1    Aug. 3, 2023

Related U.S. Application Data

(63) Continuation of application No. PCT/JP2021/040075, filed on Oct. 29, 2021.

(30) Foreign Application Priority Data

Nov. 3, 2020 (JP) ................................ 2020-184022
Feb. 3, 2021 (JP) ................................ 2021-016149

(51) Int. Cl.
*G01L 9/00* (2006.01)
*B81C 1/00* (2006.01)
(Continued)

(52) U.S. Cl.
CPC .......... *G01L 9/0022* (2013.01); *B81C 1/0015* (2013.01); *B81C 1/00388* (2013.01);
(Continued)

(58) Field of Classification Search
CPC ....... G01L 9/00; G01L 9/0022; G01L 9/0033; G01L 9/08; B81C 1/0015; B81B 2201/0264; H10N 30/302; H10N 30/87
See application file for complete search history.

(56) References Cited

U.S. PATENT DOCUMENTS

| 10,536,779 B2 | 1/2020 | Kitamura et al. |
| 2012/0250909 A1 | 10/2012 | Grosh et al. |

(Continued)

FOREIGN PATENT DOCUMENTS

| JP | 2012-059851 A | 3/2012 | |
| WO | WO-2020059200 A1 * | 3/2020 | ............. H10N 30/87 |

*Primary Examiner* — Benjamin R Schmitt
(74) *Attorney, Agent, or Firm* — Posz Law Group, PLC

(57) ABSTRACT

A piezoelectric element includes a plurality of vibration regions that are separated from each other by a slit, and the slit is formed to have a tapered portion that is tapered from a first surface of the vibration regions on an opposite side to a support to a second surface opposite to the first surface. An electrode film is positioned inside than the slit when being viewed from a normal direction orthogonal to the first surface, and an angle formed by a side surface of the tapered portion in the vibration region and a surface parallel to the first surface is in a range of 39 to 81 degrees.

14 Claims, 37 Drawing Sheets

(51) Int. Cl.
  *G01L 9/08* (2006.01)
  *H10N 30/00* (2023.01)
  *H10N 30/06* (2023.01)
  *H10N 30/082* (2023.01)
  *H10N 30/30* (2023.01)
  *H10N 30/853* (2023.01)
  *H10N 30/87* (2023.01)

(52) U.S. Cl.
  CPC ............... *G01L 9/08* (2013.01); *H10N 30/06* (2023.02); *H10N 30/082* (2023.02); *H10N 30/302* (2023.02); *H10N 30/706* (2024.05); *H10N 30/853* (2023.02); *H10N 30/87* (2023.02); *B81B 2201/0264* (2013.01)

(56) References Cited

U.S. PATENT DOCUMENTS

| | | |
|---|---|---|
| 2015/0271606 A1 | 9/2015 | Grosh et al. |
| 2019/0043920 A1* | 2/2019 | Berger ................. H10N 30/308 |
| 2019/0281393 A1 | 9/2019 | Grosh et al. |
| 2022/0248145 A1 | 8/2022 | Grosh et al. |

* cited by examiner

PIEZOELECTRIC ELEMENT, PIEZOELECTRIC DEVICE, AND METHOD OF MANUFACTURING PIEZOELECTRIC ELEMENT

CROSS REFERENCE TO RELATED APPLICATION

The present application is a continuation application of International Patent Application No. PCT/JP2021/040075 filed on Oct. 29, 2021, which designated the U.S. and claims the benefit of priority from Japanese Patent Applications No. 2020-184022 filed on Nov. 3, 2020 and No. 2021-016149 filed on Feb. 3, 2021. The entire disclosures of all of the above applications are incorporated herein by reference.

TECHNICAL FIELD

The present disclosure generally relates to a piezoelectric element having a cantilevered vibration region, a piezoelectric device having the same, and a method of manufacturing the piezoelectric element.

BACKGROUND

Conventionally, a piezoelectric element is provided with a vibration region that is cantilever-supported by a support. The piezoelectric element is manufactured, such that a piezoelectric film and an electrode film are formed on a support, and a slit is formed in the piezoelectric film to form the vibration region.

SUMMARY

According to an aspect of the present disclosure, a piezoelectric element includes a support, and a vibrating portion configured to output a pressure detection signal in accordance with a pressure. The vibrating portion includes a piezoelectric film disposed on the support and made of scandium aluminum nitride, and an electrode film connected to the piezoelectric film to generate electric charges by deformation and to extract the electric charges generated. The vibrating portion is configured to have a support region supported by the support, and a plurality of vibration regions connected to the support region and floating from the support. The plurality of vibration regions are separated from each other by a slit. The slit has a tapered portion that is tapered from a first surface of the vibration regions on an opposite side to the support, to a second surface opposite to the first surface. The electrode film is positioned in the vibration region inside than the slit when being viewed from a normal direction that is orthogonal to the first surface, and an angle defined by a side surface of the tapered portion in the vibration region and a surface parallel to the first surface is in a range of 39 to 81 degrees.

A piezoelectric device may include a casing, and the above piezoelectric element disposed in the casing. In this case, the casing includes a mounted member on which the piezoelectric element is mounted, and a lid portion fixed to the mounted member in a state of accommodating the piezoelectric element in the casing. Furthermore, the casing may have a through hole communicating with an outside and introducing an atmospheric pressure therein.

A method of manufacturing a piezoelectric element may include:
 forming a piezoelectric film and an electrode film on a support;
 arranging an etching mask member on the piezoelectric film and the electrode film, and forming an opening in the etching mask member to expose a portion of the piezoelectric film where a slit is to be formed;
 performing an etching using the etching mask member as a mask to form (i) the slit that penetrates the piezoelectric film and reaches the support and (ii) a vibration region forming portion having a tapered portion; and
 forming a recess from a side of the support opposite to the piezoelectric film to float the vibration region forming portion and to form a vibrating portion having a plurality of vibration regions. In this case, the slit having an angle of 39 to 81 degrees may be formed.

BRIEF DESCRIPTION OF THE DRAWING

The objects, features and advantages of the present disclosure will become more apparent from the following detailed description made with reference to the accompanying drawings. In the drawings.

EMBODIMENTS FOR CARRYING OUT THE INVENTION

Figure 1:
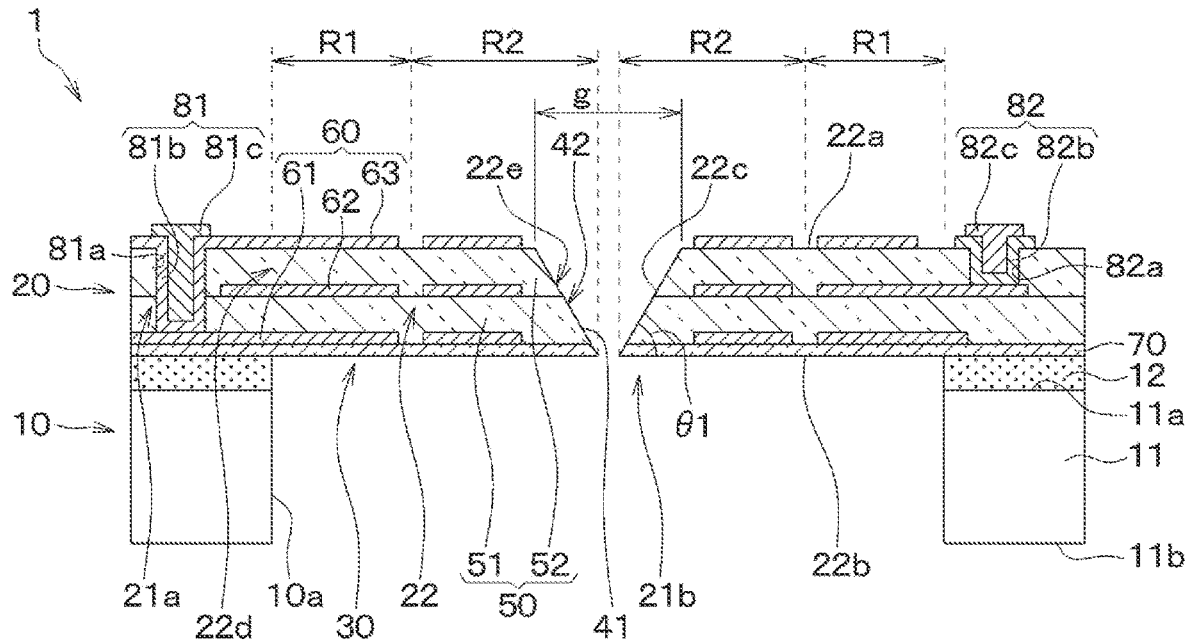
FIG. 1 is a cross-sectional view of a piezoelectric element according to a first embodiment.

A piezoelectric element may include a support and a vibrating portion arranged on the support. The vibrating portion has a piezoelectric film and an electrode film connected to the piezoelectric film. The piezoelectric film may be made of aluminum nitride (hereinafter also simply referred to as AlN). The support is formed with a recess for floating an inner area of the vibrating portion. Therefore, the vibrating portion has a floating region that floats above the recess. Further, in this piezoelectric element, the floating region may be divided into vibration regions by forming a slit in the floating region. Thus, a vibration region is formed to be cantilevered by the support.

For example, the piezoelectric film and an electrode film may be formed on a support. Then, a slit may be formed in the piezoelectric film to form a vibration region forming portion. After that, the piezoelectric element may be manufactured by (i) forming a recess in the support, and (ii) floating the vibration region forming portion to form the vibration region.

In the piezoelectric element described above, scandium aluminum nitride (hereinafter referred to as ScAlN) having high piezoelectric properties may be used as the piezoelectric film. However, ScAlN is a difficult-to-etch material. For this reason, if ScAlN is used to manufacture a piezoelectric element by the same manufacturing method as in a case of using AlN as the piezoelectric film, the slits cannot be properly formed, and the shape of the vibration region may possibly vary.

It is an object of the present disclosure to provide a piezoelectric element, a piezoelectric device having the same, and a method for manufacturing the piezoelectric element in which slits are appropriately formed.

According to an exemplar of the present disclosure, a piezoelectric element may include a support, and a vibrating portion configured to output a pressure detection signal in accordance with a pressure. The vibrating portion includes a piezoelectric film disposed on the support and made of scandium aluminum nitride, and an electrode film connected to the piezoelectric film to generate electric charges by deformation and to extract the electric charges generated. The vibrating portion may be configured to have a support region supported by the support, and a plurality of vibration regions connected to the support region and floating from the support, and the plurality of vibration regions may be separated from each other by a slit. For example, the slit has a tapered portion that is tapered from a first surface of the vibration regions on an opposite side to the support, to a second surface opposite to the first surface, and the electrode film is positioned in the vibration region inside than the slit when being viewed from a normal direction that is orthogonal to the first surface. In this arrangement, an angle defined by a side surface of the tapered portion in the vibration region and a surface parallel to the first surface is in a range of 39 to 81 degrees.

Therefore, it is possible to suppress a deterioration of the workability when forming the slits, and the slits can be appropriately formed. Thus, it is also possible to suppress a decrease of detection sensitivity.

For example, the angle defined by the side surface of the tapered portion and the surface parallel to the first surface may be 63 degrees or less, or may be 45 degrees or more.

The slit may be configured to have the tapered portion provided on a side of the first surface of the vibration region and a constant width portion provided on a side of the second surface and having a constant width, and the tapered portion and the constant width portion may be connected to each other. Alternatively, the slit may have a tapered shape in which a width of the slit is narrowed from the support region toward an opposite end of the vibration region opposite to the support region.

The vibration region and the electrode film are arranged in a state of point symmetry with respect to a center portion (C) of the vibration region in the normal direction to the first surface of the vibration region opposite to the support. Furthermore, the vibration region may have a first region adjacent to the support region and a second region different from the first region, and the piezoelectric film may be made of a material having a hexagonal crystal structure. In this case, the electrode film may be divided by six electrode film slits, and may have a hexagonal virtual shape connecting predetermined locations in the electrode film slits of the first region, when being viewed from the normal direction.

The support may have a support substrate and an insulation film disposed on the support substrate and on which the vibrating portion is disposed, the support substrate and the insulation film may be configured to have a recess for floating the vibration region, and the support substrate is made of a silicon substrate. In this case, an outline of the vibration region may have a regular octagonal shape when being viewed from the normal direction.

Alternatively, an outline of the vibration region may have a polygonal shape when being viewed from the normal direction to the first surface of the vibration region opposite to the support. In this case, at least one of the electrode film and the vibration region may have a polygonal shape with a corner, and the corner may be positioned at a different portion from a virtual line connecting opposite corners of the outline of the vibration section.

A piezoelectric device may be provided with the piezoelectric element. In this case, a casing may include a mounted member on which the piezoelectric element is mounted, and a lid portion fixed to the mounted member in a state of accommodating the piezoelectric element in the casing. Furthermore, the casing may have a through hole communicating with an outside and introducing an atmospheric pressure therein.

According to another exemplar of the present disclosure, a method of manufacturing a piezoelectric element may include: a step of forming a piezoelectric film and an electrode film on a support; a step of arranging an etching mask member on the piezoelectric film and the electrode film, and forming an opening in the etching mask member to expose a portion of the piezoelectric film where a slit is to be formed; a step of performing an etching using the etching mask member as a mask to form (i) the slit that penetrates the piezoelectric film and reaches the support and (ii) a vibration region forming portion having a tapered portion; and a step of forming a recess from a side of the support opposite to the piezoelectric film to float the vibration region forming portion and to form a vibrating portion having a plurality of vibration regions. In this case, the slit having an angle of 39 to 81 degrees may be formed.

Thus, it is possible to suppress the deterioration of the workability when forming the slit, and thereby it is possible for the piezoelectric element to suppress the deterioration of the detection sensitivity.

Embodiments of the present disclosure will be described in the following with reference to the drawings. In the following embodiments, the same reference numerals are assigned to components that are the same or equivalent to each other for description.

First Embodiment

Figure 2:
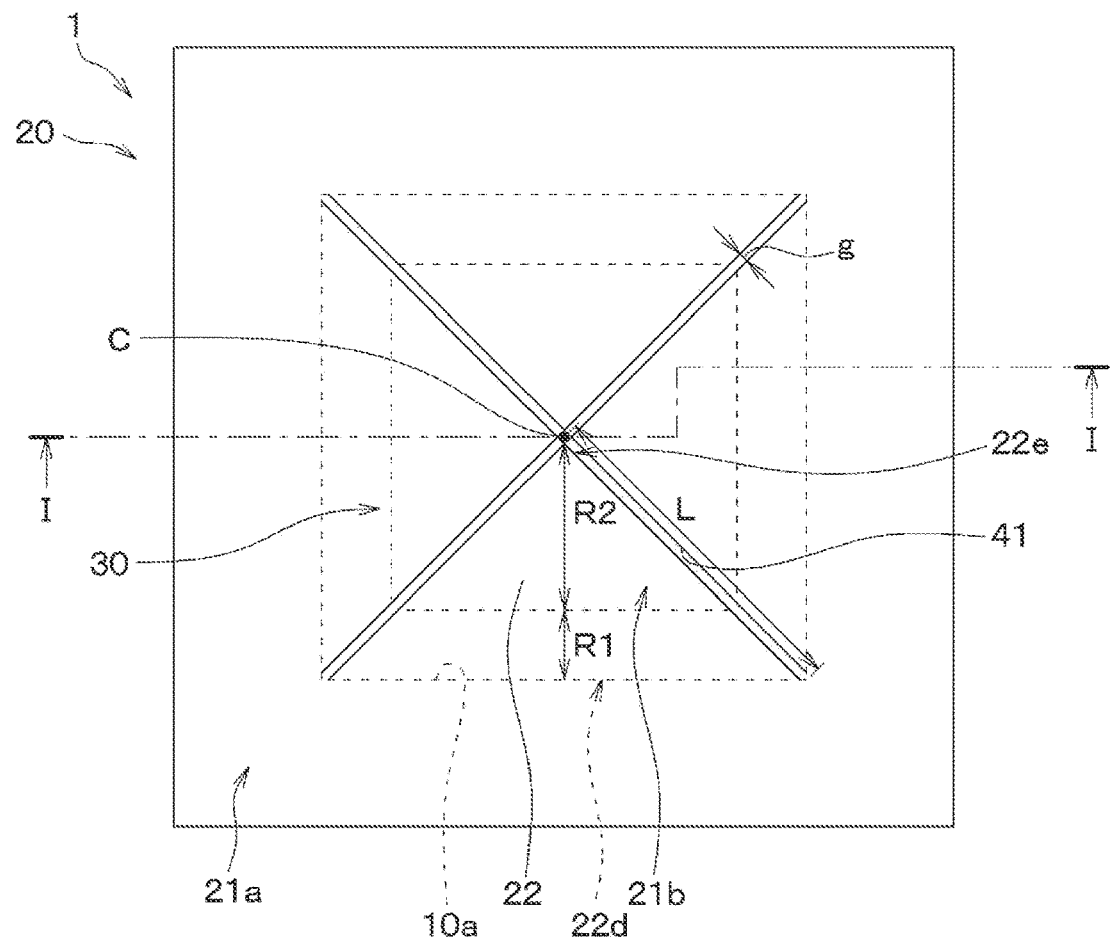
FIG. 2 is a plan view of the piezoelectric element shown in FIG. 1.

A piezoelectric element 1 of the first embodiment will be described with reference to FIGS. 1 and 2. The piezoelectric element 1 of the present embodiment may be suitable for use as, for example, a microphone. In FIG. 2, a first electrode portion 81, a second electrode portion 82 and the like, which will be described later, are omitted. Also in each of the drawings corresponding to FIG. 2 described later, the first electrode portion 81, the second electrode portion 82, and the like are omitted as appropriate.

The piezoelectric element 1 includes a support 10 and a vibrating portion 20, and is formed to have a rectangular planar shape. The support 10 has a support substrate 11 having one surface 11a and the other surface 11b and an insulation film 12 formed on the support substrate 11. The support substrate 11 is made of, for example, a silicon substrate, or the like, and the insulation film 12 is made of an oxide film or the like.

The vibrating portion 20 constitutes a sensing portion 30 that outputs a pressure detection signal corresponding to sound pressure or the like as pressure, and is arranged on the support 10. The support 10 has a recess 10a formed thereon for floating an inner edge side of the vibrating portion 20. Therefore, the vibrating portion 20 has a structure with a support region 21a arranged on the support 10 and a float region 21b connected to the support region 21a and floating on the recess 10a. An opening end of the recess 10a on a vibrating portion 20 side in the present embodiment (hereinafter may also be simply referred to as an opening end of the recess 10a) has a planar rectangular shape. Therefore, the entire float region 21b has a substantially planar, rectangular shape.

The float region 21b of the present embodiment is divided by slits 41 so that four vibration regions 22 are formed. In the present embodiment, two slits 41 are formed to pass through a center portion C of the float region 21b, and extend toward opposite corners of the float region 21b. In other words, the slits 41 extend from the respective corners of the float region 21b, which has a planar rectangular shape, toward the center portion C, and are formed so that the slits 41 intersect with each other at the center portion C. Thus, the float region 21b is separated into four vibration regions 22 each having a substantially planar triangular shape. Although not particularly limited, in the present embodiment, an interval between the vibration regions 22 (that is, an average width of the slit 41) is about 1 μm. Note that the slits 41 are formed by anisotropic dry etching in the present embodiment, as will be described later.

Figure 3:
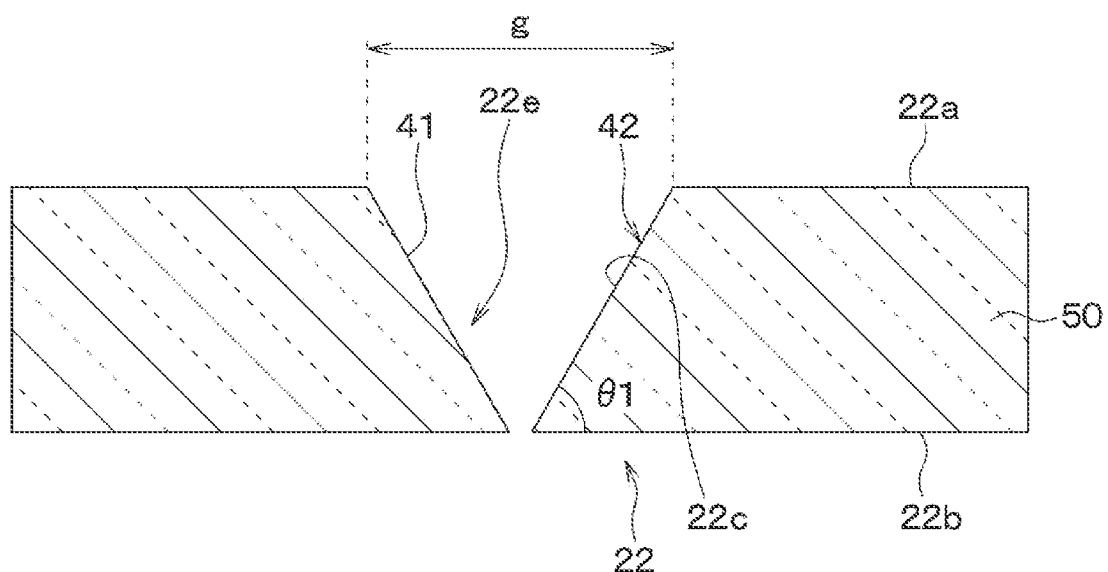
FIG. 3 is a schematic diagram of a vibration region shown in FIG. 1.

Here, the shape of the slit 41 of the present embodiment is specifically described. First, as shown in FIGS. 1 and 3, a surface of the vibration region 22 opposite to the support 10 is defined as one surface 22a, and another surface of the vibration region 22 facing the support 10 is defined as an other surface 22b. In such case, the slit 41 is formed to configure a tapered portion 42 in which a slit width g narrows from the one surface 22a toward the other surface 22b. In other words, the slit 41 is formed so that a side surface 22c, which is a surface connecting the one surface 22a and the other surface 22b in the vibration region 22, serves as the tapered portion 42. In addition, the slit 41 of the present embodiment has a shape in which the slit width g continuously narrows from the one surface 22a toward the other surface 22b. That is, the slit 41 is formed so that the side surface 22c of the vibration region 22 is substantially planar.

The one surface 22a and the other surface 22b of the vibration region 22 are in parallel with each other. Also, the slit width g of the slit 41 is, in other words, an interval between the side surfaces 22c of the vibration regions 22 facing each other. The side surface 22c of the vibration region 22 is a surface formed by the slit 41.

Further, the slit 41 is formed so that an angle θ1 formed between the other surface 22b and the side surface 22c of the vibration region 22 (hereinafter may simply be referred to as an angle formed by the vibration region 22) is within a range from 39 to 81 degrees. In addition, in the present embodiment, the other surface 22b corresponds to a surface parallel to the one surface 22a. Also, the angle θ1 may also be understood as a taper angle of the slit 41. The above is the shape of the slit 41 in the present embodiment.

Since each of the vibration regions 22 is configured by dividing the float region 21b as described above, one end 22d is a fixed end supported by the support 10 (that is, the support region 21a), and an other end 22e is a cantilever, which is a free end. That is, each of the vibration regions 22 is in a state of being connected to the support region 21a and in a state of being cantilevered.

The vibrating portion 20 is configured to have a piezoelectric film 50 and an electrode film 60 connected to the piezoelectric film 50. Specifically, the piezoelectric film 50 has a lower layer piezoelectric film 51 and an upper layer piezoelectric film 52 stacked on the lower layer piezoelectric film 51. Further, the electrode film 60 includes: a lower layer electrode film 61 arranged below the lower layer piezoelectric film 51; an intermediate electrode film 62 arranged between the lower layer piezoelectric film 51 and the upper layer piezoelectric film 52; and an upper layer electrode film 63 arranged on the upper layer piezoelectric film 52. That is, the vibrating portion 20 has a bimorph structure in which the lower layer piezoelectric film 51 is sandwiched between the lower layer electrode film 61 and the intermediate electrode film 62, and the upper layer piezoelectric film 52 is sandwiched between the intermediate electrode film 62 and the upper layer electrode film 63.

Further, the vibrating portion 20 of the present embodiment has a base film 70 on which the lower layer piezoelectric film 51 and the lower layer electrode film 61 are arranged. That is, the piezoelectric film 50 and the electrode film 60 are arranged on the support 10 with the base film 70 interposed therebetween. The base film 70 is not necessarily a required component, but is provided to facilitate crystal growth when forming the lower layer piezoelectric film 51 and the like.

The lower layer piezoelectric film 51 and the upper layer piezoelectric film 52 are made of ScAlN. The lower layer electrode film 61, the intermediate electrode film 62, and the like are made of molybdenum, copper, platinum, titanium, aluminum, or the like. The base film 70 is made of AlN or the like. Further, the thickness of the piezoelectric film 50 is approximately 1,000 nm, and the thickness of the base film 70 is approximately several tens of nm. That is, the base film 70 is made extremely thin with respect to the piezoelectric film 50.

Each of the vibration regions 22 of the present embodiment has a first region R1 on the fixed end side and a second region R2 on the free end side. Further, the lower layer electrode film 61, the intermediate electrode film 62, and the upper layer electrode film 63 are formed in the first region R1 and the second region R2, respectively. It should be noted that the lower layer electrode film 61, the intermediate electrode film 62, and the upper layer electrode film 63 formed in the first region R1 and the lower layer electrode film 61, the intermediate electrode film 62, and the upper layer electrode film 63 formed in the second region R2 are, separated and insulated from each other. Further, the lower layer electrode film 61, the intermediate electrode film 62, and the upper layer electrode film 63 formed in the first region R1 are appropriately extended to the support region 21a, respectively.

The lower layer electrode film 61, the intermediate electrode film 62, and the upper layer electrode film 63 are formed so as not to reach the slit 41, respectively. That is, the lower layer electrode film 61, the intermediate electrode film 62, and the upper layer electrode film 63 are formed so as to terminate inside the side surface 22c of the vibration region 22. In other words, the lower layer electrode film 61, the intermediate electrode film 62, and the upper layer electrode film 63 are arranged, or positioned, inside the slit 41 when being viewed from a normal direction to the one surface 22a of the vibration region 22. That is, the lower layer electrode film 61, the intermediate electrode film 62, and the upper layer electrode film 63 are arranged without exposing or protruding from the side surface 22c of the vibration region 22. Therefore, the side surface 22c of the vibration region 22 is made of the lower layer piezoelectric film 51, the upper layer piezoelectric film 52 and the base film 70. Hereinafter, the normal direction to the one surface 22a of the vibration region 22 may also be simply referred to as a "normal direction". In addition, in the normal direction to the one surface 22a of the vibration region 22 may mean "when being viewed or seen from the normal direction to the one surface 22a of the vibration region 22". For example, the one surface 22a of the vibration region 22 is a first surface of the vibration region 22, the other surface 22b of the vibration region 22 is a second surface opposite to the first surface.

In the support region 21a of the vibrating portion 20, a first electrode portion 81 and a second electrode portion 82 are provided. The first electrode portion 81 is electrically connected to the lower layer electrode film 61 and to the upper layer electrode film 63 provided in the first region R1. The second electrode portion 82 is electrically connected to the intermediate electrode film 62 provided in the first region R1. FIG. 1 is a cross-sectional view taken along a line I-I in FIG. 2, showing a cross section in which the vibration region 22 on a left side of the page is different from the vibration region 22 on a right side of the page. Further, in FIG. 2, the first electrode portion 81 and the second electrode portion 82 are omitted.

The first electrode portion 81 has a through electrode 81b that is directly connected to the lower layer electrode film 61 and to the upper layer electrode film 63. The first electrode portion 81 is formed in a hole portion 81a that penetrates the upper layer electrode film 63, the upper layer piezoelectric film 52, and the lower layer piezoelectric film 51 to expose the lower layer electrode film 61. Further, the first electrode portion 81 has a pad portion 81c formed in the through electrode 81b and electrically connected to the through electrode 81b. The second electrode portion 82 has a through electrode 82b that is formed in a hole portion 82a penetrating the upper layer piezoelectric film 52 and exposes the intermediate electrode film 62 and that is electrically connected to the intermediate electrode film 62. Further, the second electrode portion 82 has a pad portion 82c formed in the through electrode 82b and electrically connected to the through electrode 82b. The first electrode portion 81 and the second electrode portion 82 are made of molybdenum, copper, platinum, titanium, aluminum, or the like, just like the electrode film 60.

The lower layer electrode film 61, the intermediate electrode film 62, and the upper layer electrode film 63 formed in the second region R2 are not electrically connected to the electrode portions 81 and 82, and are in a floating state, respectively. Therefore, the lower layer electrode film 61, the intermediate electrode film 62, and the upper layer electrode film 63 formed in the second region R2 may be not always required. In the present embodiment, they are formed so as to protect portions of the lower layer piezoelectric film 51 and the upper layer piezoelectric film 52 arranged in the second region R2.

Further, the lower layer electrode film 61, the intermediate electrode film 62 and the upper layer electrode film 63 formed in the first region R1 are divided into the respective vibration regions 22 by the slits 41. That is, the lower layer electrode film 61, the intermediate electrode film 62, and the upper layer electrode film 63 formed in the first region R1 of each of the vibration regions 22 are not formed to bridge vibration regions 22 adjacent to each other. Further, the lower layer electrode film 61, the intermediate electrode film 62, and the upper layer electrode film 63 formed in the first region R1 of each of the vibration regions 22 are connected via a wiring film or the like (not shown).

The lower layer electrode film 61, the intermediate electrode film 62, and the upper layer electrode film 63 of the present embodiment respectively have substantially the same outlines as the outline of the vibration region 22, which is, in the present embodiment, a rectangular, planar shape. However, the lower layer electrode film 61, the intermediate electrode film 62, and the upper layer electrode film 63 are respectively divided into the vibration regions 22 as described above. Therefore, a shape of the outlines of the lower layer electrode film 61, the intermediate electrode film 62, and the upper layer electrode film 63 is a shape that is made of (i) the outlines of the lower layer electrode film 61, the intermediate electrode film 62, and the upper layer electrode film 63, and (ii) the extension lines thereof.

Further, the sensing portion 30 of the present embodiment is configured to output variation in charge of the four vibration regions 22, as one pressure detection signal. That is, the four vibration regions 22 are electrically connected in series. More specifically, each of the vibration regions 22 has a bimorph structure, and each lower layer electrode film 61, each intermediate electrode film 62, and each upper layer electrode film 63 formed in each of the vibration regions 22 are connected in parallel to each other, while the vibration regions 22 are connected in series.

The above is the configuration of the piezoelectric element 1 in the present embodiment. In such a piezoelectric element 1, when sound pressure is applied to each of the vibration regions 22 (that is, to the sensing portion 30), each of the vibration regions 22 vibrates. For example, when the other end 22e side of the vibration region 22 (that is, the free end) is displaced upward, a tensile stress is generated in the lower layer piezoelectric film 51 and a compressive stress is generated in the upper layer piezoelectric film 52. Therefore, the sound pressure is detected by extracting the charges from the first electrode portion 81 and from the second electrode portion 82.

At such timing, since a stress generated in the vibration region 22 (that is, in the piezoelectric film 50) is released on the free end side (that is, on the other end portion 22e side), the stress becomes greater on the fixed end side than on the free end side. That is, on the free end side, the generation of electric charges is low, and an SN ratio, which is the ratio of the signal to the noise, may tend to be small. Therefore, in the piezoelectric element 1 of the present embodiment, each of the vibration regions 22 is divided into the first region R1 where the stress tends to increase and the second region R2 where the stress tends to decrease as described above. Further, in the piezoelectric element 1, the lower layer electrode film 61, the upper layer electrode film 63, and the intermediate electrode film 62, which are respectively arranged in the first region R1, are connected to the first and second electrode portions 81 and 82, which enables electric charges generated in the lower layer piezoelectric film 51 and the upper layer piezoelectric film 52 in the first region R1 to be taken out. Thus, it is possible to suppress an influence of noise from becoming large.

Next, a method for manufacturing the piezoelectric element 1 will be described with reference to FIGS. 4A to 4E, 5 and 6.

Figure 4A:
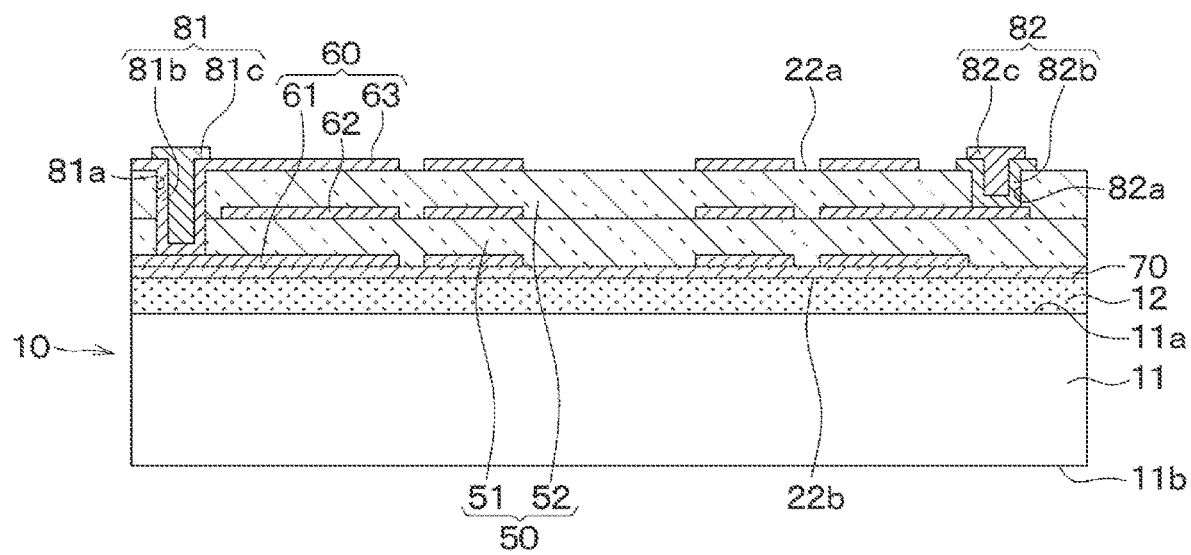
FIG. 4A is a cross-sectional view showing a manufacturing process of the piezoelectric element shown in FIG. 1.

First, as shown in FIG. 4A, a support 10 having a support substrate 11 and an insulation film 12 is prepared, on which a base film 70, a piezoelectric film 50, an electrode film 60, a first electrode portion 81, a second electrode portion 82, and the like are formed. That is, the piezoelectric element 1 shown in FIG. 1 in which the recess 10a and the slit 41 are not formed yet is prepared. The piezoelectric film 50, the electrode film 60, and the like formed in a process of FIG. 4A is a portion of implementing the vibrating portion 20. Therefore, in FIG. 4A, the same reference numerals as those of the one surface 22a and the other surface 22b of the vibration region 22 are attached. Also, a position of the electrode film 60 is adjustably arranged so as not to expose the film 60 from a portion where the slit 41 is formed.

Here, the base film 70, the piezoelectric film 50, the electrode film 60, and the like are formed by appropriately performing a general method of sputtering, etching, or the like. In such case, when the base film 70 and the lower layer electrode film 61 serving as the electrode film 60 are formed on the support 10, since the base film 70 and the lower layer electrode film 61 have linear expansion coefficients greater than that of the support 10, there remains tensile stress between the support 10 and the electrode film 60 and the base film 70. Therefore, when the piezoelectric film 50 is formed as is, the piezoelectric film 50 is likely to be formed with residual tensile stress caused by the tensile stress of the base film 70 and the lower layer electrode film 61 remaining therein. If tensile stress remains in the piezoelectric film 50, the characteristics of the piezoelectric element 1 tend to fluctuate. Therefore, when forming the piezoelectric film 50, for example, the following method may be preferable.

For example, when forming the upper layer piezoelectric film 52, a voltage applied during sputtering may preferably be made higher than when forming the lower layer piezoelectric film 51, so that compressive stress is generated in the upper layer piezoelectric film 52. In such manner, the tensile stress of the lower layer piezoelectric film 51 and the compressive stress of the upper layer piezoelectric film 52 are offset, and the stress remaining inside the piezoelectric film 50 as a whole is reducible. In such case, the upper layer piezoelectric film 52 may be formed by sputtering a plurality of times. Further, in the upper layer piezoelectric film 52, a tensile stress is generated in a portion on a lower layer piezoelectric film 51 side thereof, and a compressive stress is generated in an uppermost layer side portion opposite to the lower layer piezoelectric film 51, thereby making it possible to reduce the stress remaining inside the piezoelectric film 50.

Figure 4B:
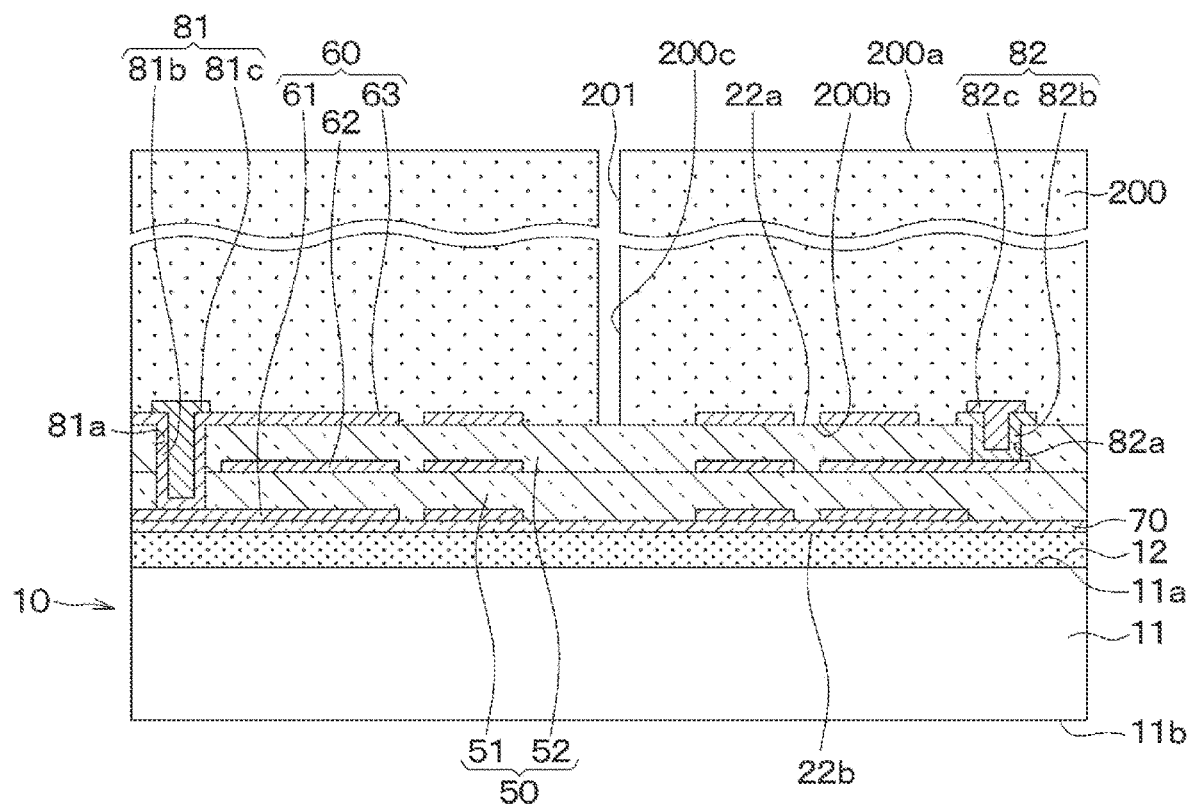
FIG. 4B is a cross-sectional view showing the manufacturing process of the piezoelectric element following FIG. 4A.

Subsequently, as shown in FIG. 4B, an etching mask member 200 made of photoresist or the like is positioned to cover the upper layer electrode film 63 and the like, and an opening 201 is formed in the etching mask member 200, which is opened at portions where the slits 41 are formed. Hereinafter, a surface of the etching mask member 200 facing and covering the upper layer electrode film 63 and the upper layer piezoelectric film 52 is referred to as an other surface 200b, a surface of the etching mask member 200 opposite to the other surface 200b is referred to as a one surface 200a, and a side surface of the opening 201 is referred to as a side surface 200c.

Figure 4C:
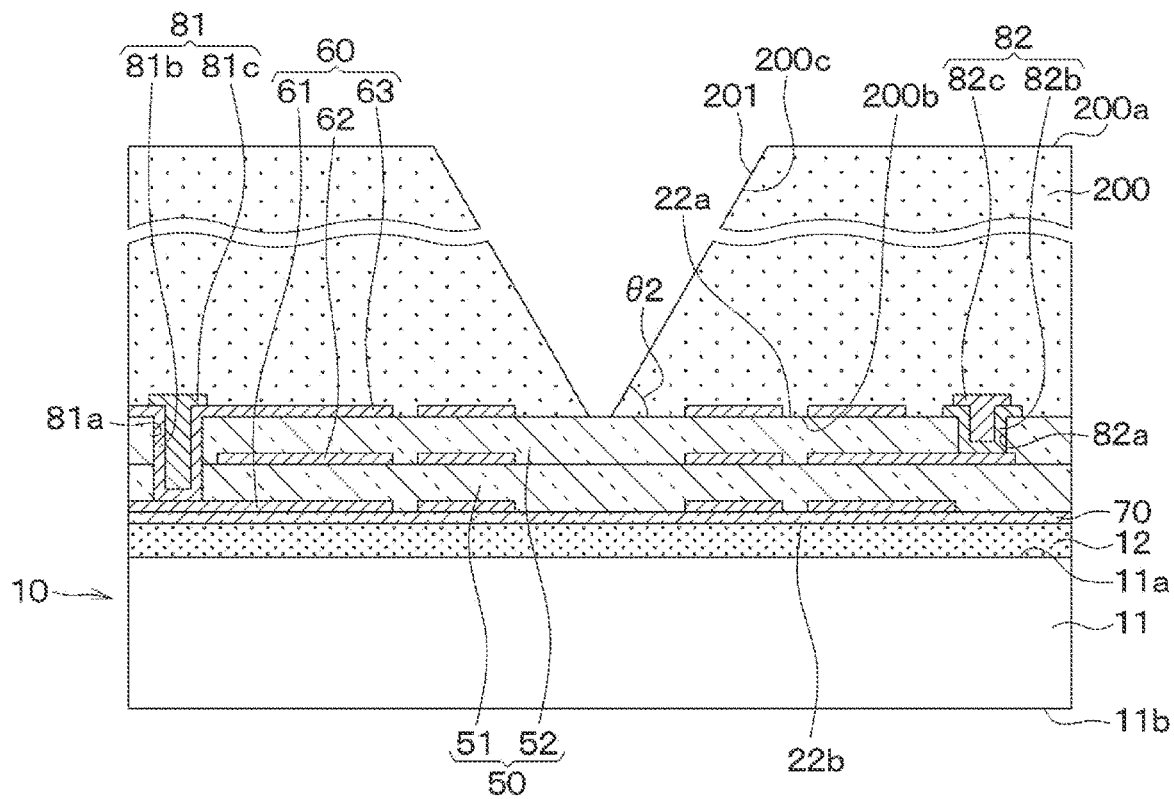
FIG. 4C is a cross-sectional view showing the manufacturing process of the piezoelectric element following FIG. 4B.

Next, as shown in FIG. 4C, heat treatment is performed to adjust the shape of the opening 201 of the etching mask member 200. Specifically, the etching mask member 200 is arranged to cover the upper layer electrode film 63 and the upper layer piezoelectric film 52, and a portion on an other surface 200b side fixed thereto and a portion on a one surface 200a side shrink differently from each other by the heat treatment. More specifically, when the heat treatment is performed, the portion of the etching mask member 200 on the other surface 200b side is difficult to thermally shrink, and the portion on the one surface 200a side is easy to thermally shrink. Therefore, by performing the heat treatment, an angle $\theta 2$ formed between the other surface 200b and the side surface 200c of the etching mask member 200 (hereinafter may also be simply referred to as the angle $\theta 2$ formed by the etching mask member 200) is adjusted to a desired angle according to the angle $\theta 1$ of the vibration region 22. In such case, since the piezoelectric film 50 and the etching mask member 200 are made of different materials, they usually have different etching rates when performing anisotropic dry etching, which is described later. Therefore, based on the etching rate and the like, the angle $\theta 2$ formed by the etching mask member 200 is adjusted so that the angle $\theta 1$ formed by the vibration region 22 has a desired value. Since the angle $\theta 2$ formed by the etching mask member 200 is adjusted as described above, it may match the angle 61 formed by the vibration region 22, but may not match the angle $\theta 1$ formed by the vibration region 22.

Figure 4D:
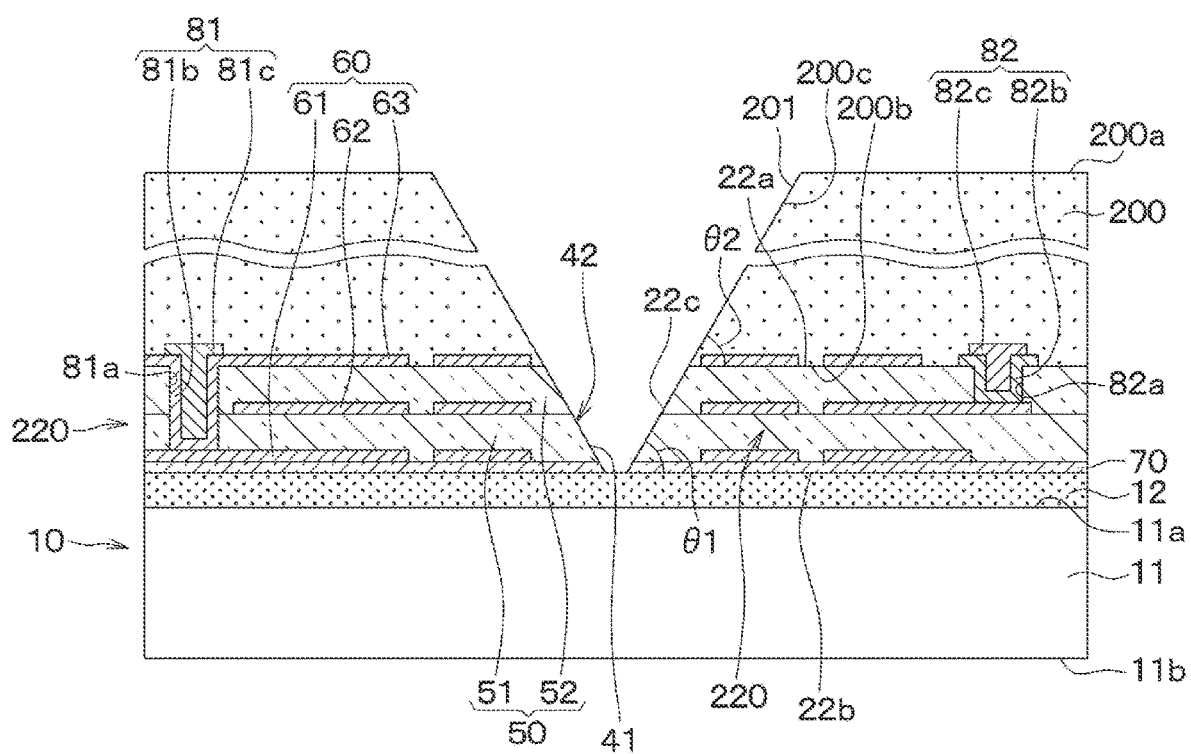
FIG. 4D is a cross-sectional view showing the manufacturing process of the piezoelectric element following FIG. 4C.

Next, as shown in FIG. 4D, anisotropic dry etching is performed using the etching mask member 200 as a mask to form the slit 41 that penetrates the piezoelectric film 50 to reach the support 10. In the present embodiment, the slit 41 is formed so that four vibration region forming portions 220 each having a side surface 22c that serves as the tapered portion 42 are formed.

At this time, as described above, the angle $\theta 2$ formed by the etching mask member 200 is adjusted according to the angle $\theta 1$ formed by the vibration region 22, and the angle $\theta 1$ formed by the vibration region forming portion 220 is set to 39 to 81 degrees. The vibration region forming portion 220 is a portion that becomes the vibration region 22 by forming the recess 10a, which is described later. Therefore, the angle $\theta 1$ formed by the vibration region forming portion 220 and the angle $\theta 1$ formed by the vibration region 22 are the same. Further, in the drawing, the one surface, the other surface, and the side surface of the vibration region forming portion 220 are given the same reference numerals as the one surface 22a, the other surface 22b, and the side surface 22c of the vibration region 22. Further, the shapes of the lower layer electrode film 61, the intermediate electrode film 62, and the upper layer electrode film 63 are adjusted so as not to reach (i.e., not to be exposed from) the slit 41. Therefore, in this step, the piezoelectric film 50 and the base film 70 are anisotropically dry-etched.

Figure 4E:
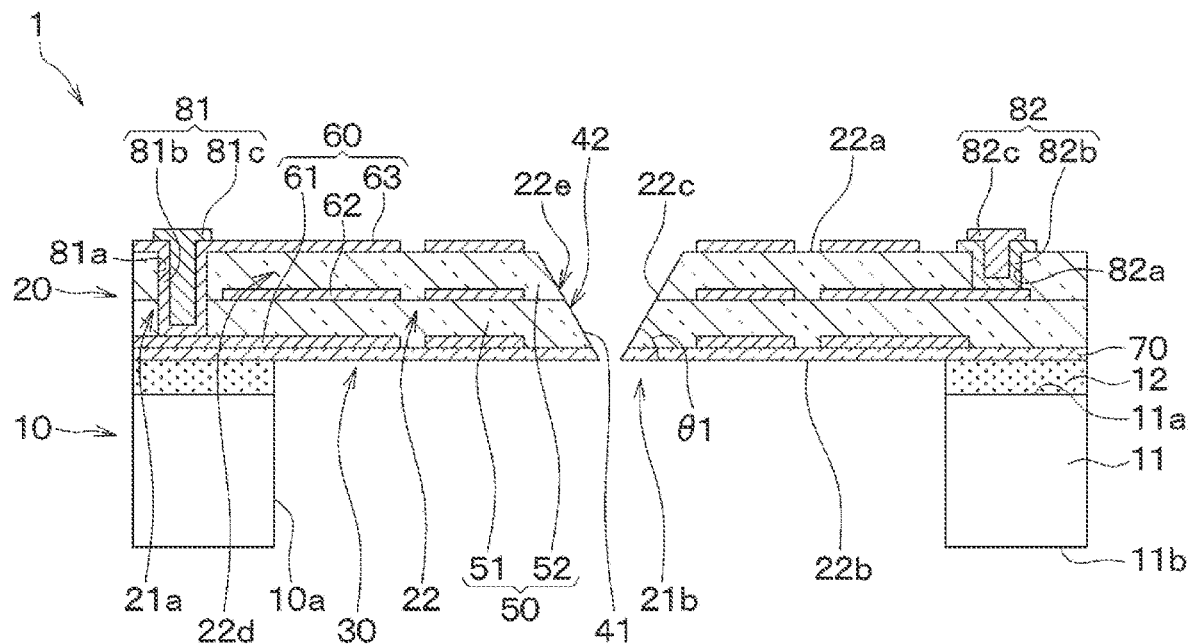
FIG. 4E is a cross-sectional view showing the manufacturing process of the piezoelectric element following FIG. 4D.

Thereafter, as shown in FIG. 4E, using a mask (not shown), etching is performed from the other surface 11b of the support substrate 11 to reach the base film 70 through the insulation film 12 to form the recess 10a. In the present embodiment, after the support substrate 11 is removed by anisotropic dry etching, the insulation film 12 is removed by isotropic wet etching to form the recess 10a. In such manner, the vibration region forming portion 220 is suspended, or floats, from the support 10 to form the vibration region 22, and the piezoelectric element 1 shown in FIG. 1 is manufactured.

In this step, although not shown, a protective resist or the like covering the upper layer piezoelectric film 52 and the upper layer electrode film 63 may be placed to form the recess 10a. Thereby, it is possible to prevent the vibration region 22 from being destroyed when the recess 10a is formed. The protective resist is then removed, i.e., after formation of the recess 10a.

Next, the angle $\theta 1$ formed by the vibration region forming portion 220 (that is, the vibration region 22) in the manufacturing process of the present embodiment is described.

First, according to the study of the inventors of the present application, when the piezoelectric film 50 such as ScAlN is subjected to anisotropic dry etching, the following phenomenon is confirmed when the formed angle $\theta 1$ is 81 degrees or more. That is, it is confirmed that, when the formed angle $\theta 1$ is 81 degrees or more, the workability tends to deteriorate due to the influence of redeposition in which the etched atoms are redeposited on the side surface 22c of the slit 41. Further, according to the study of the present inventors, when the piezoelectric film 50 such as ScAlN is subjected to anisotropic dry etching, the following phenomenon is confirmed when the formed angle $\theta 1$ is 63 degrees or more. That is, when the formed angle $\theta 1$ is 63 degrees or more, it is confirmed the workability tends to deteriorate due to the influence of a fence formed by redepositing etched atoms near the openings of the slits 41 on a one surface 22a side. Therefore, when the slit 41 is formed, it may be preferable that the angle $\theta 1$ formed by the slit 41 is 63 degrees or less. In such manner, it is possible to prevent the workability from deteriorating due to the fence or the like.

Figure 5:
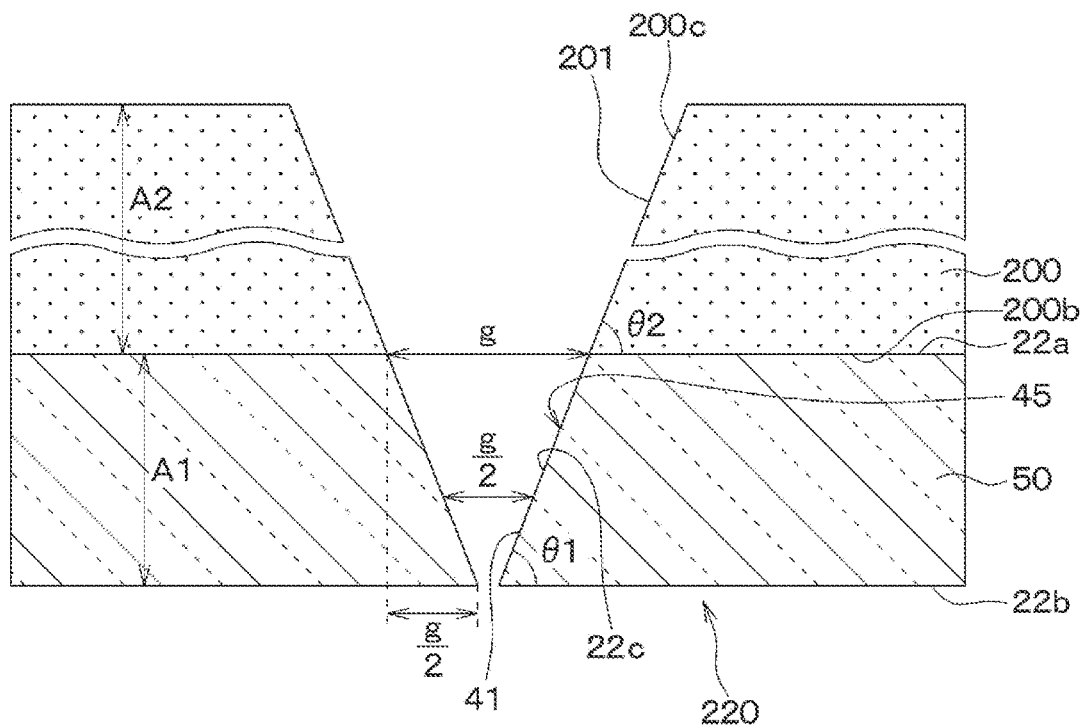
FIG. 5 is a schematic diagram of a portion where a slit is formed in the manufacturing process of FIG. 4D.

Further, ScAlN forming the piezoelectric film 50 is a difficult-to-etch material. According to the study of the present inventors, when the slit 41 penetrating the piezoelectric film 50 is formed, in order to keep the etching mask member 200 unetched on the piezoelectric film 50, it is confirmed that a film thickness of the etching mask member 200 may be preferably 3 to 5 times the thickness of the piezoelectric film 50. In other words, when forming the slit 41 penetrating the piezoelectric film 50, in order to prevent the piezoelectric film 50 covered with the etching mask member 200 from being removed by the anisotropic dry etching, it is confirmed the film thickness of the etching mask member 200 should preferably be set to 3 to 5 times the film thickness of the piezoelectric film 50. That is, as shown in FIG. 5, when the thickness of the piezoelectric film 50 is designated as A1 and the thickness of the etching mask member 200 is designated as A2, the thickness A2 of the etching mask member 200 may preferably be 3A1 to 5A1. It should be noted that the base film 70 of the present embodiment is formed extremely thin with respect to the piezoelectric film 50 as described above. Therefore, the influence of the base film 70 is ignored.

Further, when forming the slit 41, it is also affected by exposure restrictions of the processing apparatus. According to the studies of the present inventors, in the current general processing apparatus, as shown in FIG. 5, it is confirmed that a resolution of the slit width g with respect to A2 is limited to ½ to ⅓ of the film thickness A2 of the etching mask member 200, when the slit width g is defined as a width of the slit 41 on the one surface 22*a* side. Therefore, since the film thickness A2 of the etching mask member 200 is expressed by 3A1 to 5A1, the slit width g is limited to the range of 3A⅓ to 5A½.

Figure 6:
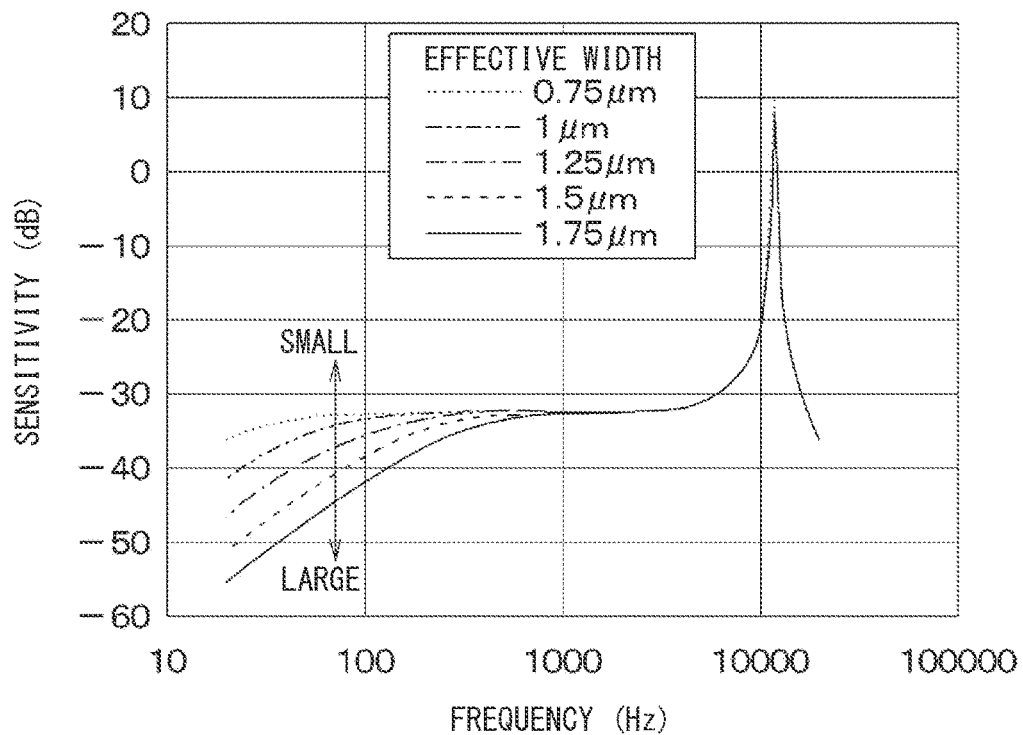
FIG. 6 is a diagram showing a relationship between frequency, sensitivity, and an effective width.

Then, in the piezoelectric element 1 as described above, the sound pressure escapes through the slit 41. In such case, as shown in FIG. 6, the longer an effective width of the slit 41 is, the lower the sensitivity at low frequencies becomes. Thus, it is preferable that the slit 41 is formed so that the effective width thereof is narrow. Note that the effective width of the slits 41 is an average width of the slits 41. For example, when the slit 41 has a tapered shape in which the width continuously narrows from the one surface 22*a* to the other surface 22*b* as shown in the present embodiment, the width of the one surface 22*a* and the width of the other surface 22*b* are averaged to have the effective width.

Moreover, since the slit 41 of the present embodiment is formed by anisotropic dry etching, the side surface 22*c* is substantially planar. Thus, assuming that the width of the slit 41 on the side of the other surface 22*b* is approximately 0 so as to suppress the deterioration in sensitivity, when the thickness of the piezoelectric film 50 is designated as A1, and the width of the slit of the one surface 22*a* is designated as g, tan θ1=A1/(g/2). Note that g/2 can also be said as the effective width of the slit. Therefore, since the slit width g is 3A⅓ to 5A½ as described above, thus it is determined that tan θ1=2 to 0.8, and θ1=39 to 63 degrees is preferable.

Further study by the present inventors has confirmed that the film thickness A2 of the etching mask member 200 may be 1 to 5 times the film thickness A1 of the piezoelectric film 50. That is, it is confirmed that the film thickness A2 of the etching mask member 200 may be A1 to 5A. Therefore, the slit width g is limited to A⅓ to 5A½. Thus, according to further studies by the present inventors, it is determined that tan θ1=6 to 0.8, and θ1=39 to 81 degrees is preferable. Therefore, when forming the slit 41, it is preferable to set the angle θ1 formed by the vibration region forming portion 220 to be 39 to 81 degrees. Thus, it is possible to prevent the workability of the slit 41 from deteriorating due to the film thickness A2 of the etching mask member 200.

Figure 7:
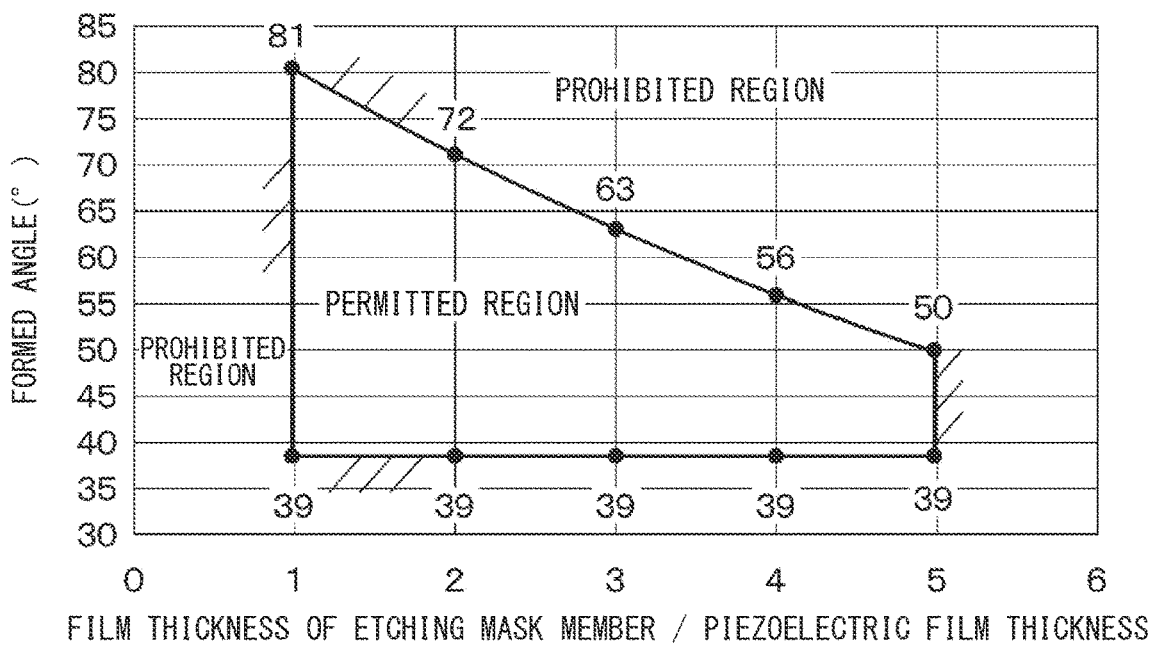
FIG. 7 is a diagram showing a relationship between a film thickness of an etching mask member with respect to a film thickness of a piezoelectric film and an angle formed.

FIG. 7 summarizes the relationship between a ratio of the film thickness A2 of the etching mask member 200 to the film thickness A1 of the piezoelectric film 50 (hereinafter may also be referred to as a film thickness ratio) and the formed angle. As described above, the resolution of the slit width g with respect to the film thickness A2 of the etching mask member 200 is limited to ½ to ⅓ of the film thickness A2 of the etching mask member 200. Therefore, the lower limit of 39 degrees for the formed angle θ1 corresponds to a case where the resolution is ½ times that of the etching mask member 200, and the upper limit corresponds to a case where the resolution is ⅓ times that of the etching mask member.

Here, as a piezoelectric element 1 of a comparative example, it is assumed that the piezoelectric element 1 has (i) the piezoelectric film 50 made of an easily-etchable material such as AlN, and (ii) the side surface 22*c* of the vibration region 22 substantially perpendicular to the other surface 22*b*. Then, the effective width of the slit 41 in the piezoelectric element 1 of the comparative example is designated as g. In such case, if the effective width of the piezoelectric element 1 of the present embodiment is g or more, the width of the slit 41 is widened, and the sensitivity may fall to be lower than that of the piezoelectric element 1 of the comparative example.

Therefore, the slit 41 is preferably formed so that the effective width is equal to or less than the effective width of the slit 41 in the piezoelectric element 1 of the comparative example. That is, it may be preferable that tan θ1 is set to 1 or more. Therefore, θ1 is preferably 45 degrees or more, preferably 45 to 81 degrees. In such manner, it is possible to suppress a deterioration in sensitivity. In such case, by setting θ1 to 63 degrees or less, it is possible to suppress deterioration in workability of the slit 41 due to the fence or the like.

Next, a piezoelectric device S10 using the above-described piezoelectric element 1 is described.

Figure 8:
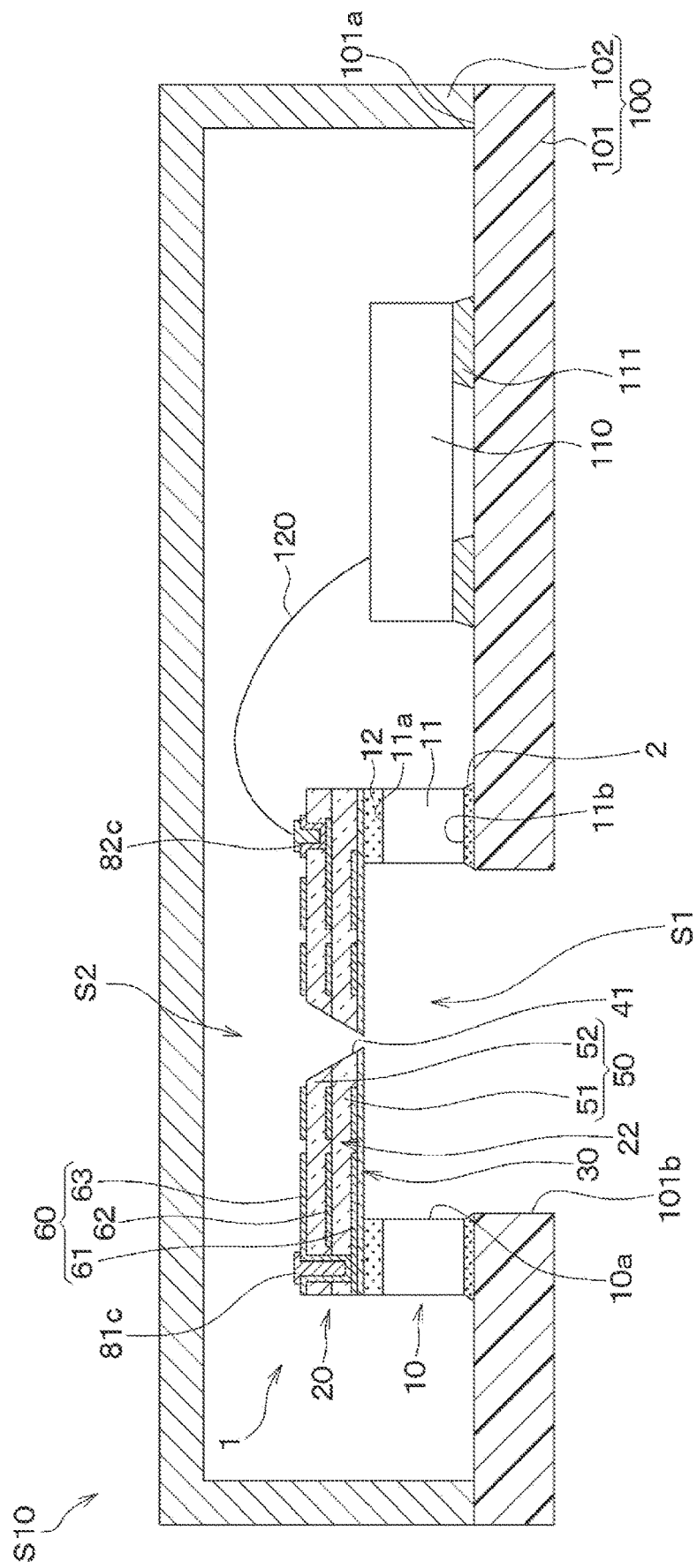
FIG. 8 is a cross-sectional view of a piezoelectric device according to the first embodiment.

The piezoelectric device S10 of the present embodiment is constructed by housing the piezoelectric element 1 in a casing 100, as shown in FIG. 8. The casing 100 includes (i) a printed circuit board 101 on which the piezoelectric element 1 and a circuit board 110 for performing predetermined signal processing and the like are mounted, and (ii) a lid portion 102 fixed to the printed circuit board 101 to accommodate the piezoelectric element 1 and the circuit board 110. In the present embodiment, the printed circuit board 101 corresponds to a mounted member.

Although not shown, the printed circuit board 101 has wiring portions, through-hole electrodes, and the like formed thereon as appropriate, and electronic components such as capacitors (not shown) are mounted as required. Further, in the piezoelectric element 1, the other surface 11*b* of the support substrate 11 is mounted on a one surface 101*a* of the printed circuit board 101 via a joining member 2 such as an adhesive. The circuit board 110 is mounted on the one surface 101*a* of the printed circuit board 101 via a joint member 111 made of a conductive material. The pad portion 82*c* of the piezoelectric element 1 and the circuit board 110 are electrically connected via bonding wires 120. Note that the pad portion 81*c* of the piezoelectric element 1 is electrically connected to the circuit board 110 via the bonding wire 120 in a cross section different from that in FIG. 8. The lid portion 102 is made of metal, plastic, resin, or the like, and is fixed to the printed circuit board 101 via a bonding member such as an adhesive (not shown) to accommodate the piezoelectric element 1 and the circuit board 110.

In the present embodiment, a through hole 101*b* is formed in a portion of the printed circuit board 101, which faces the sensing portion 30. Specifically, the through hole 101*b* has a substantially cylindrical shape, and is formed such that its central axis coincides with the center portion C of the vibration region 22 in the normal direction.

The above is an example of the configuration of the piezoelectric device S10 in the present embodiment. Hereinafter, a space between a portion where the through hole 101*b* is formed and the vibration region 22 in the casing 100 is referred to as a pressure receiving surface space S1. Further, a back space S2 is defined as a space which is (i) located on an opposite side of the pressure receiving surface space S1 across the vibration region 22 and makes (ii) one continuous space without including the slit 41 in there. The back space S2 may also be understood as a space in the casing 100 different from the pressure receiving surface space S1, or a space excluding the pressure receiving surface space S1. Further, in other words, the pressure receiving surface space S1 can also be understood as a space that has an influence on a pressure to be applied to a surface of the vibration region 22 on one side facing the through hole 101b formed in the casing 100 (that is, the other surface 22b in the present embodiment). The back space S2 may also be understood as a space that has an influence on a pressure applied to the surface of the vibration region 22 on an opposite side opposite to a through hole 101b side (that is, one surface 22a in the present embodiment).

In such a piezoelectric device S10, sound pressure is introduced as a pressure into the pressure receiving surface space S1, thereby applying the sound pressure to the vibration region 22 (that is, the sensing portion 30), and the sound pressure is detected as described above.

According to the present embodiment described above, the angle θ1 formed by the vibration region 22 is set in a range between 39 and 81 degrees. Therefore, it is possible to prevent the workability of the slits 41 from deteriorating due to the film thickness A2 of the etching mask member 200, and the slits 41 is preferably formable. Moreover, since the formed angle θ1 is 81 degrees or less, the influence of redeposition can be reducible, and deterioration of the workability can be suppressed.

(1) In the present embodiment, by setting the angle θ formed by the vibration region 22 to 63 degrees or less, it is possible to suppress the deterioration of workability due to the influence of the fence.

(2) In the present embodiment, by setting the angle θ1 formed by the vibration region 22 to 45 degrees or more, it is possible to suppress a deterioration in sensitivity.

Modification of the First Embodiment

The modification of the first embodiment is described in the following. In the first embodiment, when forming the slits 41, dry etching may be performed after wet etching. In such manner, the etching mask member 200 is not removed when wet etching is performed. Therefore, the film thickness A2 of the etching mask member 200 defined based on the film thickness A1 of the piezoelectric film 50 is reducible, and the slit width g defined by the film thickness A2 of the etching mask member 200 can be narrowed. Therefore, the effective width g/2 can be narrowed, and the sensitivity is improvable.

Figure 9A:
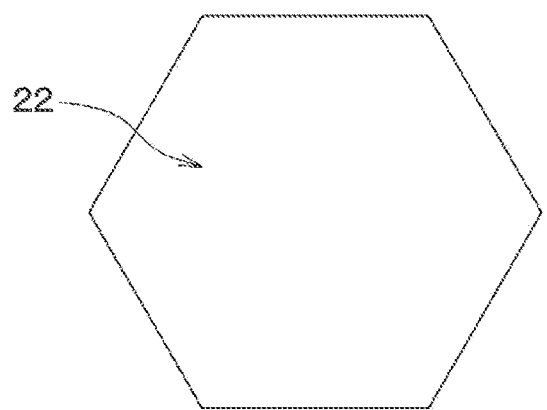
FIG. 9A is a plan view of a vibration region according to a modification of the first embodiment.
Figure 9B:
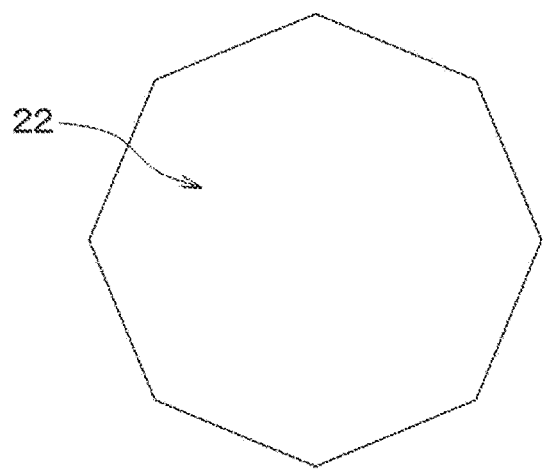
FIG. 9B is a plan view of a vibration region according to a modification of the first embodiment.
Figure 9C:
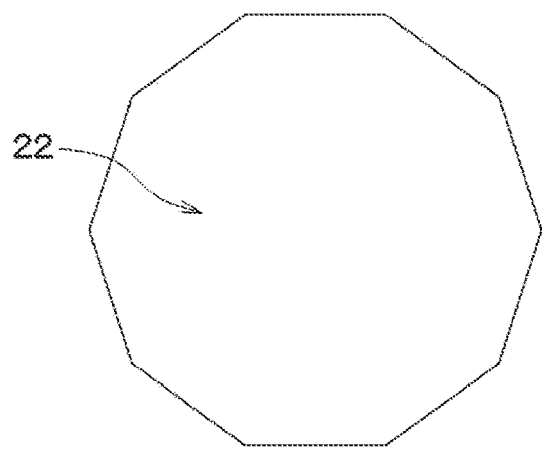
FIG. 9C is a plan view of a vibration region according to a modification of the first embodiment.
Figure 9D:
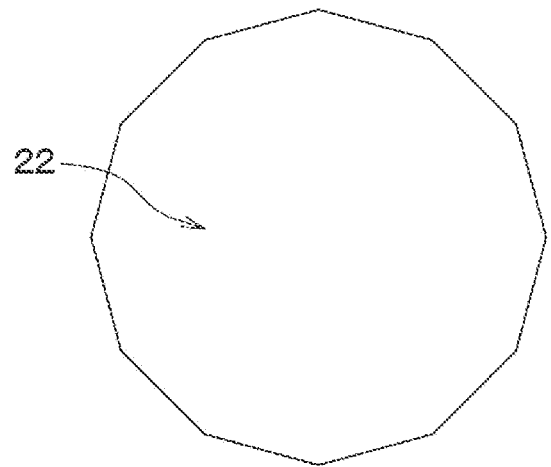
FIG. 9D is a plan view of a vibration region according to a modification of the first embodiment.
Figure 9E:
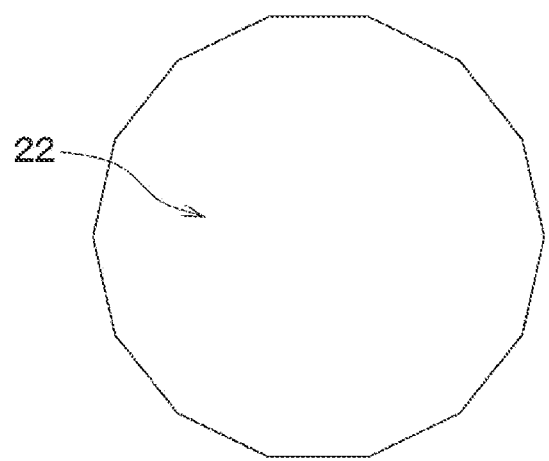
FIG. 9E is a plan view of a vibration region according to a modification of the first embodiment.
Figure 9F:
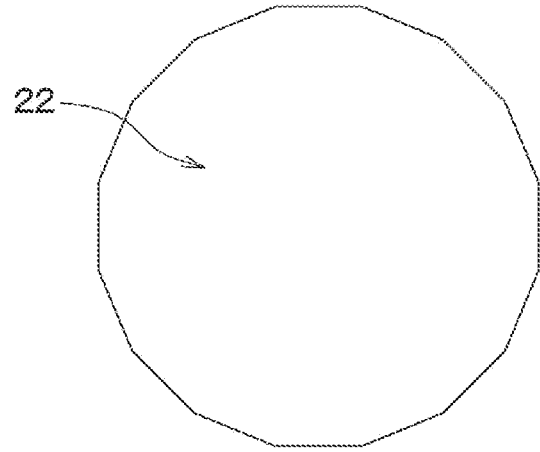
FIG. 9F is a plan view of a vibration region according to a modification of the first embodiment.
Figure 9G:
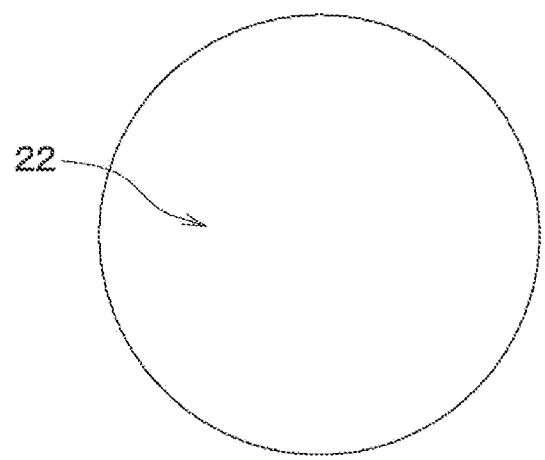
FIG. 9G is a plan view of a vibration region according to a modification of the first embodiment.

Further, in the above-described first embodiment, the planar shape of the vibration region 22 can be changed as appropriate. For example, as shown in FIGS. 9A to 9G, the vibration region 22 may also have a planar shape of hexagon, octagon, decagon, dodecagon, tetradecagon, hexadecagon, or circle. Moreover, although not shown, the vibration region 22 may have other polygonal shapes. Note that, though the slits 41 formed in the vibration regions 22 are omitted in FIGS. 9A to 9G, the slits 41 are formed in the vibration regions 22, respectively. For example, when the planar shape of the vibration region 22 is hexagon as shown in FIG. 9A, the slits 41 are formed to extend from each of the corners of the periphery of the vibration region 22, and to intersect at the center portion C. Further, when the planar shape of the vibration region 22 is circular as shown in FIG. 9G, a desired number of slits 41 are formed equi-circumferentially to intersect at the center portion C.

Second Embodiment

The following describes the second embodiment of the present disclosure. In the present embodiment, the shape of the slit 41 is changed with respect to the first embodiment. The rest of the configuration is similar to that of the first embodiment, and will thus not be described repeatedly.

Figure 10:
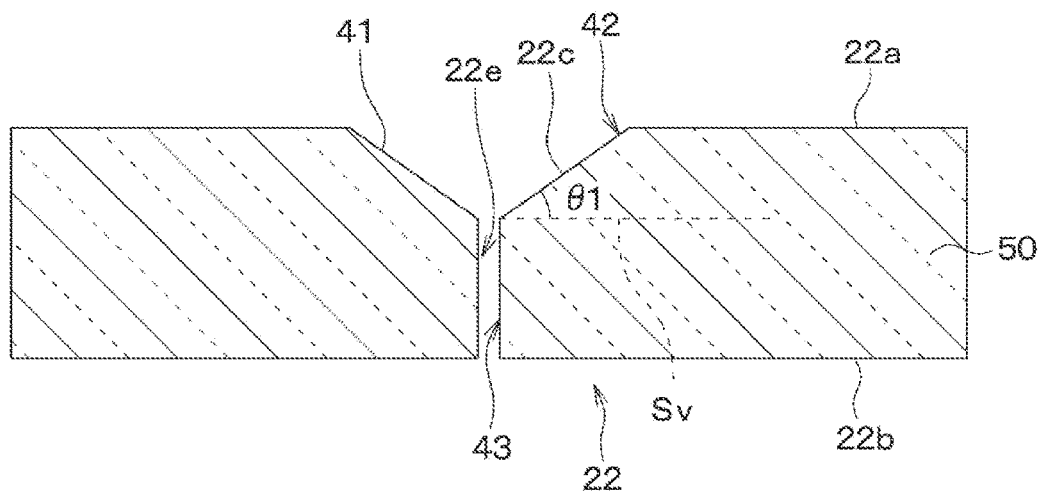
FIG. 10 is a schematic diagram of a vibration region according to a second embodiment.

In the piezoelectric element 1 of the present embodiment, as shown in FIG. 10, the slit 41 has a tapered portion 42 tapered on the one surface 22a side and a constant width portion 43 having a constant width on an other surface 22b side. That is, the slit 41 is formed on one side of the film 50, i.e., on the other surface 22b to form the constant width portion 43 in which the side surface 22c is perpendicular to the other surface 22b. Further, the slit 41 has a structure in which the tapered portion 42 and the constant width portion 43 are connected. Further, in the present embodiment, the angle 61 between the tapered portion 42 and a virtual plane Sv that is in parallel with the one surface 22a is set to 39 to 81 degrees.

Such a slit 41 is formable by, for example, removing the etching mask member 200 after forming the tapered portion 42, placing another etching mask member, and performing anisotropic dry etching so that the constant width portion 43 is formed. In an opening formed in another etching mask member when forming the constant width portion 43, an angle between the side surface of the opening and the other surface of the etching mask member is approximately 90 degrees.

According to the present embodiment described above, since the angle θ1 formed by the vibration region 22 is set to 39 to 81 degrees, the same effects as those of the first embodiment are achievable.

In the present embodiment, the slit 41 is formed to have the tapered portion 42 and the constant width portion 43 having a constant width. Therefore, for example, when compared with the piezoelectric element 1 in which the width of the slit 41 on the one surface 22a side and the width of the slit 41 on the other surface 22b side are the same, the piezoelectric element 1 of the present embodiment has a narrower effective width. Therefore, it becomes difficult for the sound pressure to escape, and the sensitivity is improved.

Third Embodiment

The following describes the third embodiment of the present disclosure. In the present embodiment, the shape of a boundary portion between the recess 10a and the vibrating portion 20 is changed from that of the first embodiment. The rest of the configuration is similar to that of the first embodiment, and will thus not be described repeatedly.

Figure 11:
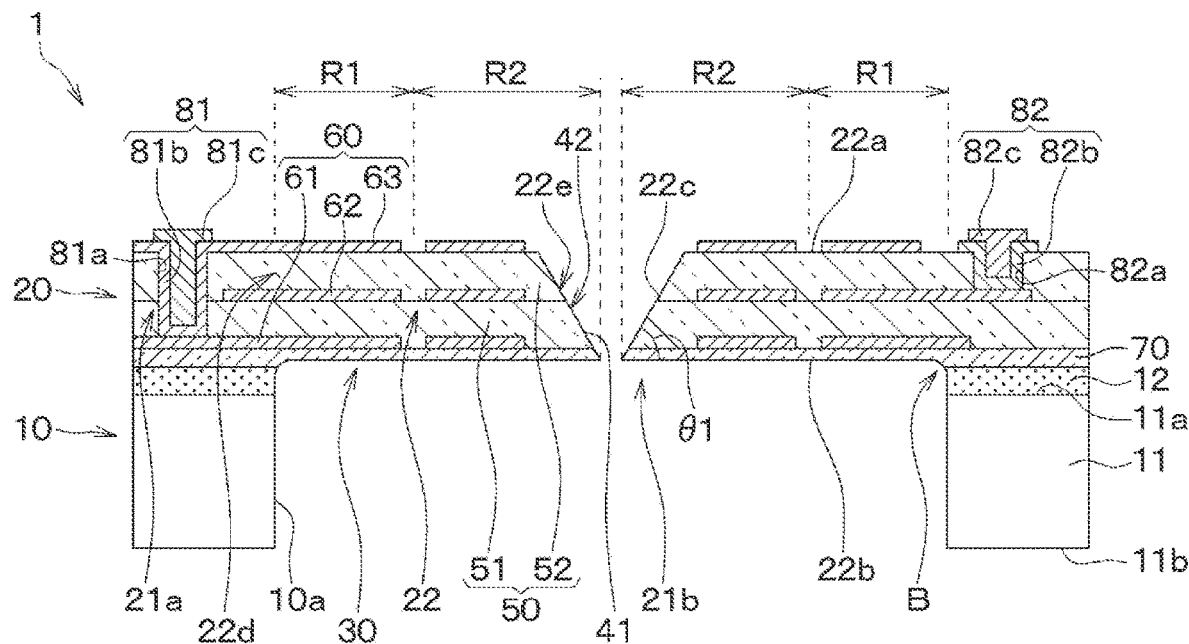
FIG. 11 is a cross-sectional view of a piezoelectric element according to a third embodiment.

In the piezoelectric element 1 of the present embodiment, as shown in FIG. 11, a boundary portion B between an opening end of the recess 10a and the vibrating portion 20 is curved. In the present embodiment, the recess 10a is formed so that the opening end reaches the base film 70, and the boundary portion B of the base film 70 with the recess 10a is formed in a curved shape. Such a curved shape is formed, for example, by removing part of the base film 70 by isotropic wet etching when removing the insulation film 12.

According to the present embodiment described above, since the angle 81 formed by the vibration region 22 is set to 39 to 81 degrees, the same effects as those of the first embodiment described above are achievable.

In the present embodiment, the boundary portion B between the recess 10a and the vibrating portion 20 is curved. Therefore, when sound pressure is applied to the vibration region 22, concentration of stress on the boundary portion B between the recess 10a and the vibrating portion 20 is suppressible, and breakage of the vibration region 22 is suppressed.

Fourth Embodiment

The following describes the fourth embodiment of the present disclosure. In contrast to the third embodiment, the present embodiment places a high-strength material in the base film 70. The rest of the configuration is similar to that of the third embodiment, and will thus not be described repeatedly.

Figure 12:
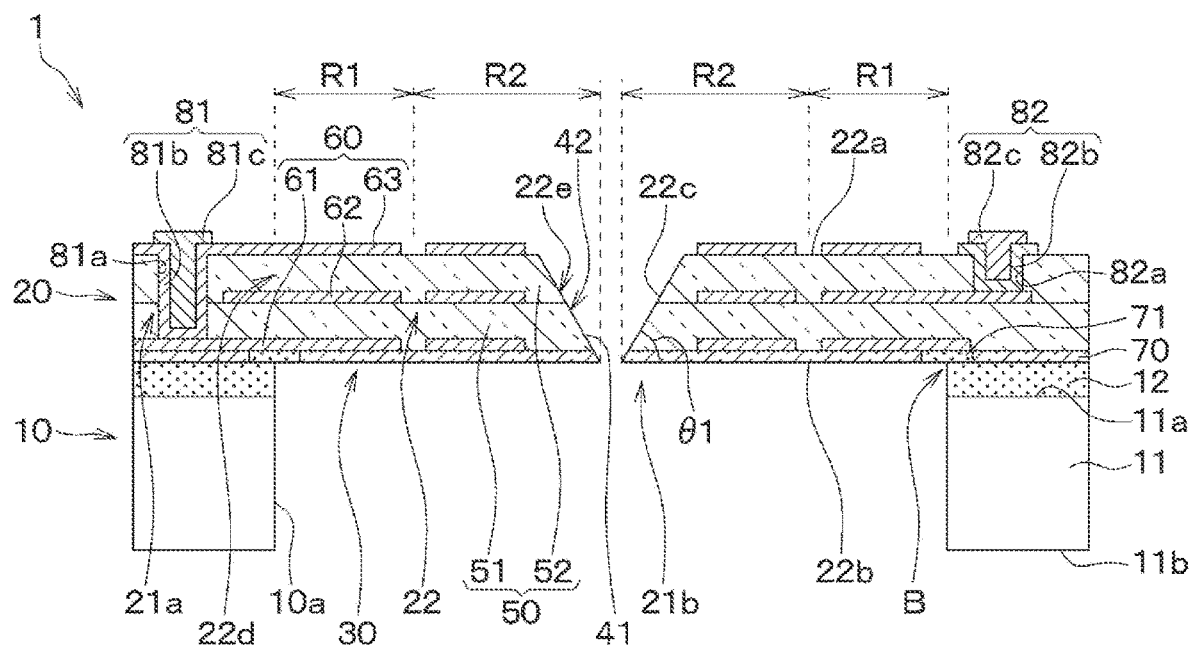
FIG. 12 is a cross-sectional view of a piezoelectric element according to a fourth embodiment.

In the piezoelectric element 1 of the present embodiment, as shown in FIG. 12, a protective member 71 made of a material having a higher strength than the base film 70 is arranged at a position between the boundary portion B of the base film 70 and the recess 10*a*. The protective member 71 is made of, for example, a nitride film.

According to the present embodiment described above, since the angle θ1 formed by the vibration region 22 is set to 39 to 81 degrees, the same effects as those of the first embodiment described above are achievable.

In the present embodiment, the protective member 71 is arranged in the boundary portion B of the base film 70 with the recess 10*a*. In other words, the protective member 71 is arranged at a portion where stress tends to concentrate when sound pressure is applied to the vibration region 22. Therefore, it is possible to prevent the vibration region 22 from being destroyed when the sound pressure is applied to the vibration region 22.

Fifth Embodiment

The following describes the fifth embodiment of the present disclosure. The present embodiment is a combination of the third embodiment and the fourth embodiment. The rest of the configuration is similar to that of the third embodiment, and will thus not be described repeatedly.

Figure 13:
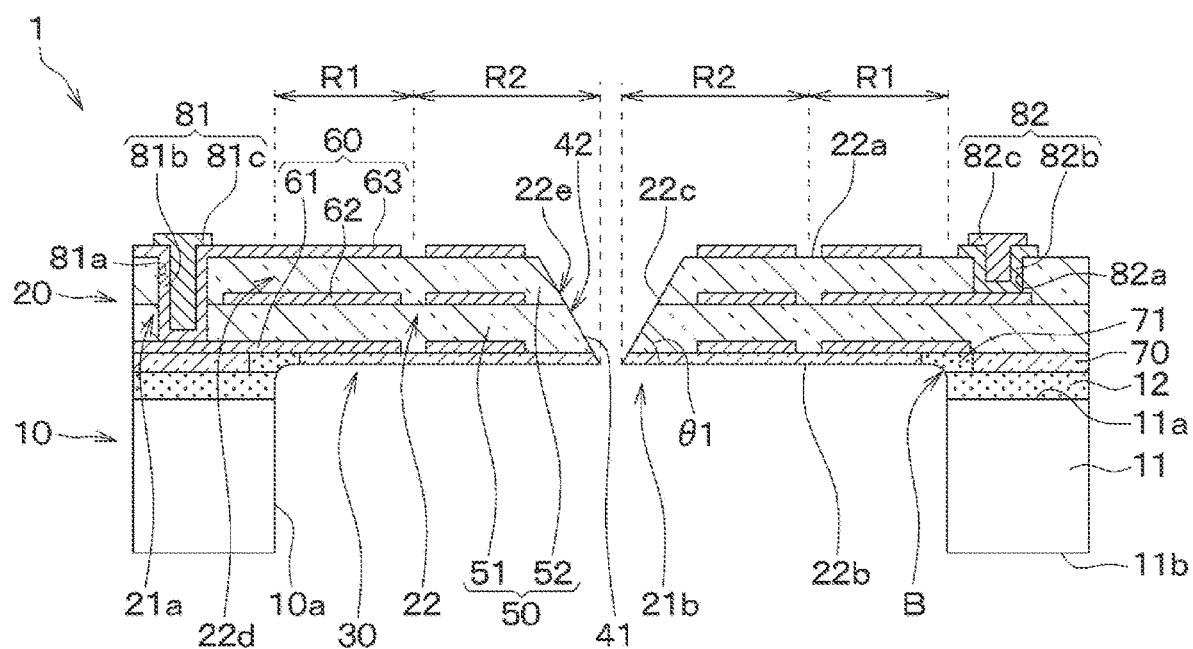
FIG. 13 is a cross-sectional view of a piezoelectric element according to a fifth embodiment.

In the piezoelectric element 1 of the present embodiment, as shown in FIG. 13, the protective member 71 is arranged in the boundary portion B of the base film 70 with the recess 10*a*. The boundary portion B of the protective member 71 with the recess 10*a* is curved.

According to the present embodiment described above, since the angle θ1 formed by the vibration region 22 is set to 39 to 81 degrees, the same effects as those of the first embodiment described above are achievable.

In the present embodiment, the protective member 71 is arranged in the boundary portion B of the base film 70 with the recess 10*a*. Further, the boundary portion B between the protective member 71 and the recess 10*a* is curved. Therefore, it is possible to further suppress the destruction of the vibration region 22.

Sixth Embodiment

The following describes the sixth embodiment of the present disclosure. The present embodiment is different from the first embodiment in the arrangement of the first electrode portion 81 and the second electrode portion 82. The rest of the configuration is similar to that of the first embodiment, and will thus not be described repeatedly.

Figure 14:
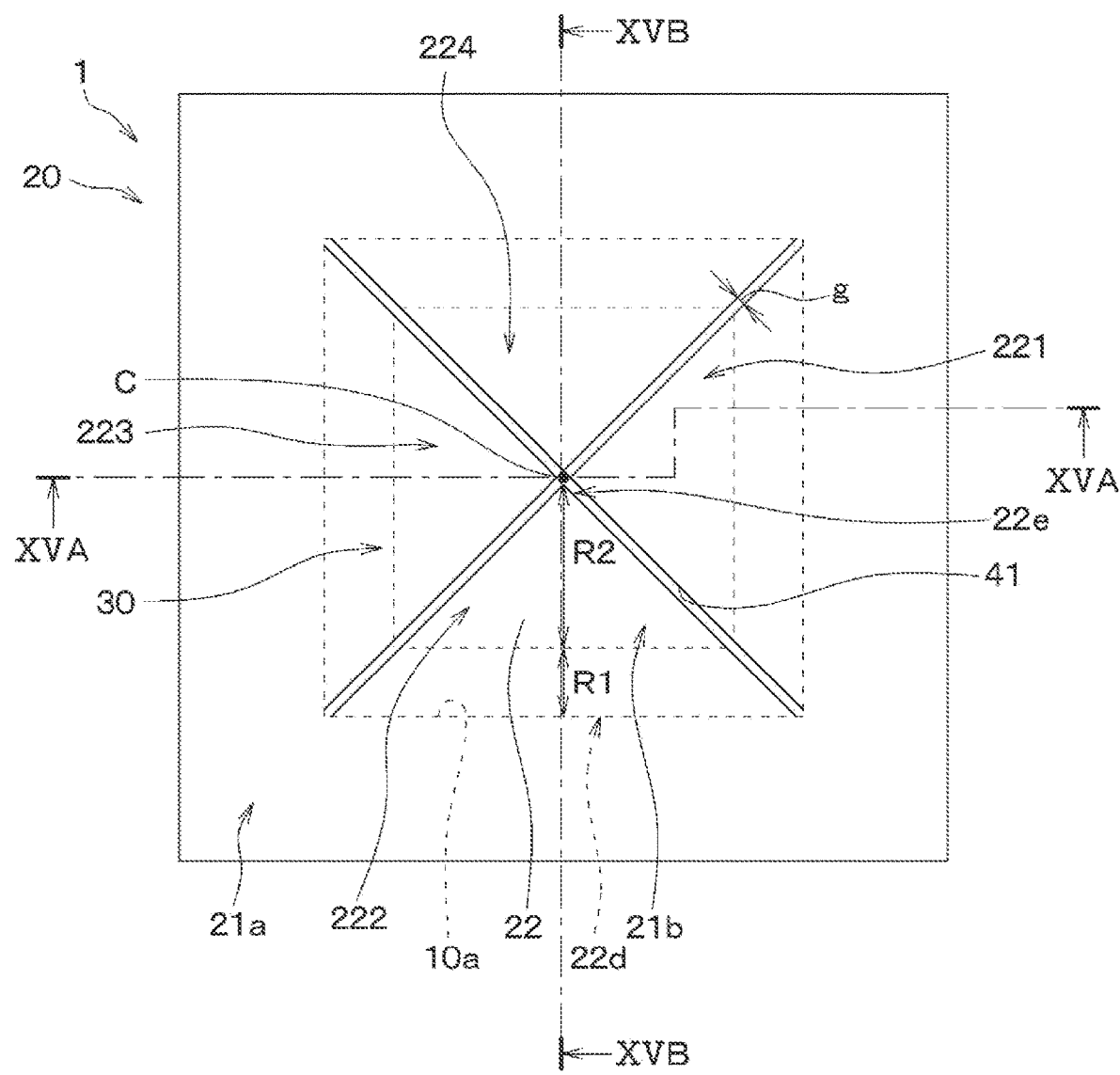
FIG. 14 is a plan view of a piezoelectric element according to a sixth embodiment.

As shown in FIG. 14, the piezoelectric element 1 of the present embodiment has the same planar configuration as that of the first embodiment. In the present embodiment, as shown in FIG. 14, one of the four vibration regions 22 is defined as a first vibration region 221, and second to fourth vibration regions 222 to 224 are further defined clockwise in the circumferential direction from the first vibration region 221 in the four vibration regions 22.

Figure 15A:
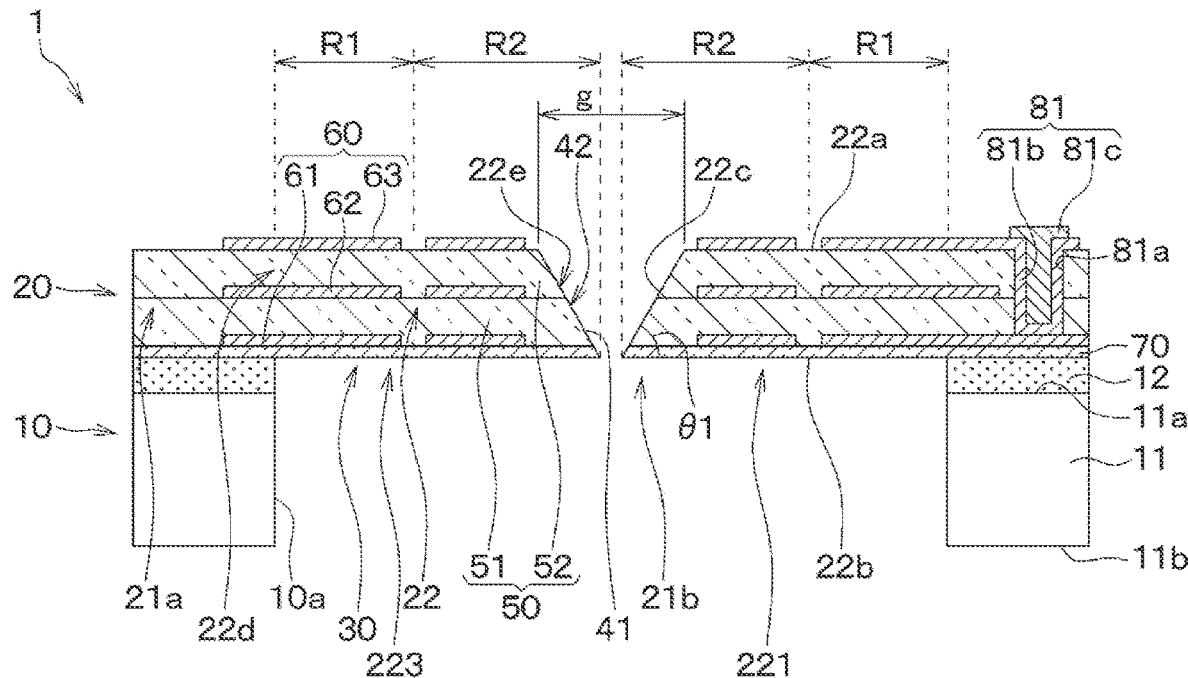
FIG. 15A is a cross-sectional view taken along a line XVA-XVA in FIG. 14.
Figure 15B:
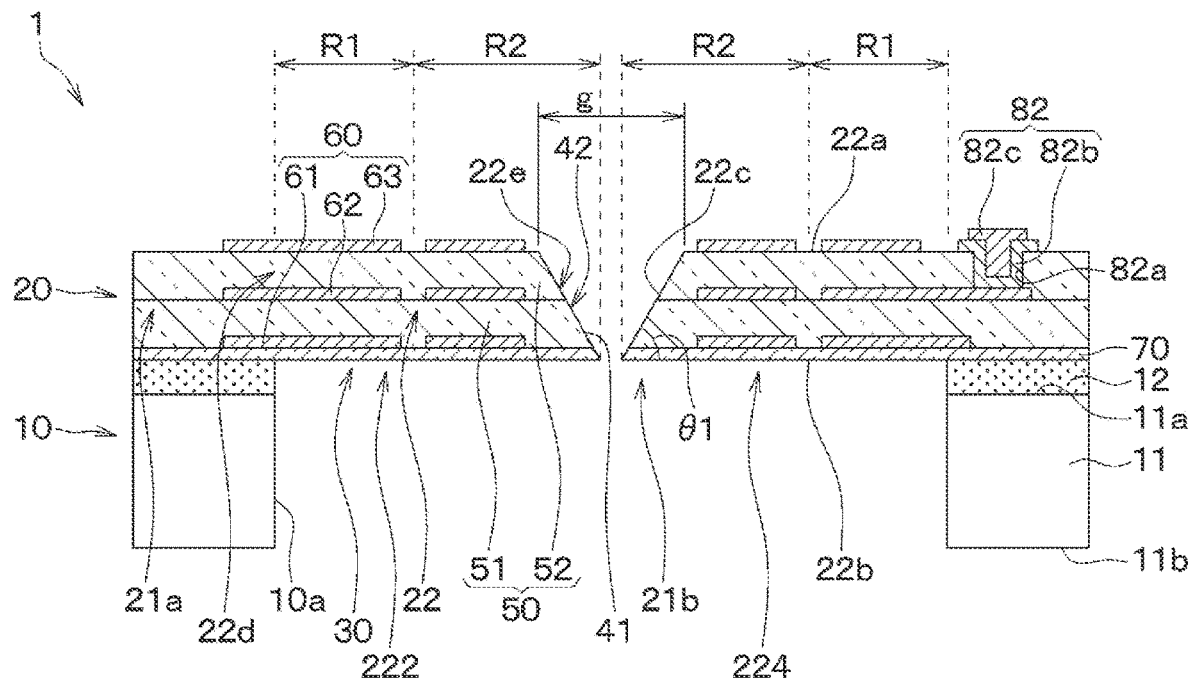
FIG. 15B is a cross-sectional view along a line XVB-XVB in FIG. 14.

Further, the first electrode portion 81 is connected to the lower layer electrode film 61 and to the upper layer electrode film 63 formed in the first vibration region 221, as shown in FIG. 15A. The second electrode portion 82 is connected to the intermediate electrode film 62 formed in the fourth vibration region 224, as shown in FIG. 15B.

Figure 16:
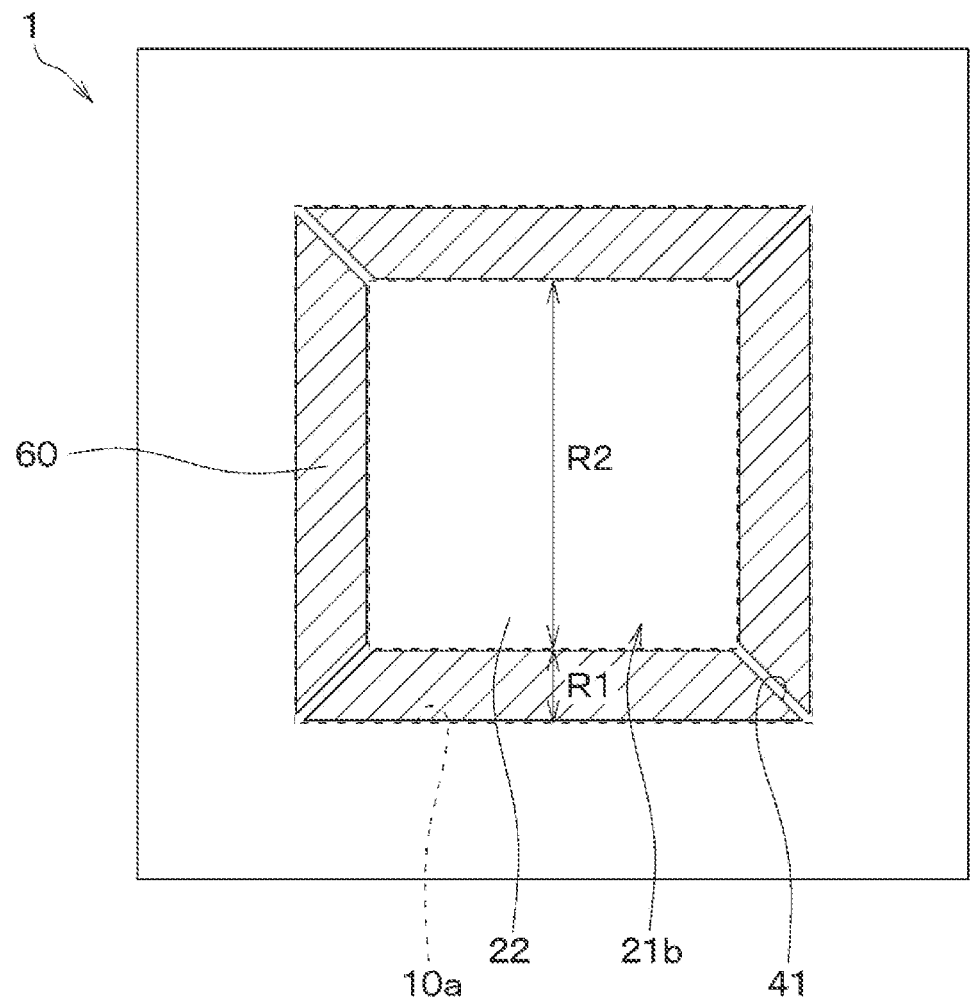
FIG. 16 is a plan view of an electrode film formed in a first region according to the sixth embodiment.

As show in FIG. 16, the electrode film 60 of the present embodiment is formed so that the outline of the portion defined in the first region R1 is substantially the same as the outline of the vibration region 22, which is a planar, rectangular shape in the present embodiment. However, the lower layer electrode film 61, the intermediate electrode film 62, and the upper layer electrode film 63 are respectively divided into the first to fourth vibration regions 221 to 224 as described above. Therefore, the shape of the outlines of the portions of the lower layer electrode film 61, the intermediate electrode film 62, and the upper layer electrode film 63 provided in the first region R1 is defined to a shape that is made of (a) the outlines of the lower layer electrode film 61, the intermediate electrode film 62, and the upper layer electrode film 63 positioned in the first region R1 and (b) the extension line of the outlines thereof. Further, though shown as the electrode film 60 in FIG. 17, the lower layer electrode film 61, the intermediate electrode film 62, and the upper layer electrode film 63 respectively have the same shape as the electrode film 60 in the first region R1.

Figure 17:
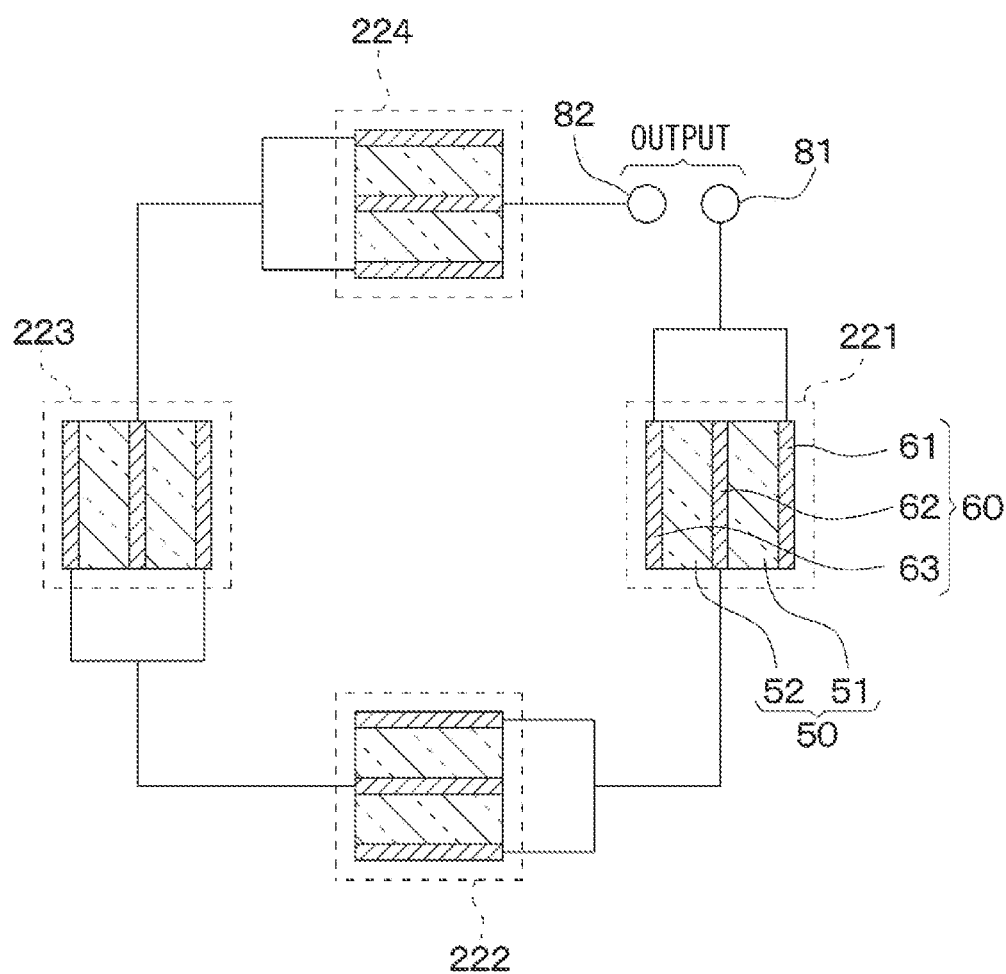
FIG. 17 is a schematic circuit diagram of a piezoelectric element according to the sixth embodiment.

Thus, in the present embodiment, as shown in FIG. 17, the circuit configuration is such that the vibration regions 221 to 224 are connected in series in order.

According to the present embodiment described above, since the angle θ1 formed by the vibration region 22 is set to 39 to 81 degrees, the same effects as those of the first embodiment described above are achievable.

In the present embodiment, the first to fourth vibration regions 221 to 224 are connected in series in order. Therefore, it is possible to facilitate routing of wiring portions that connect the electrode films 60 of the respective vibration regions 221 to 224.

Modification of the Sixth Embodiment

Figure 18:
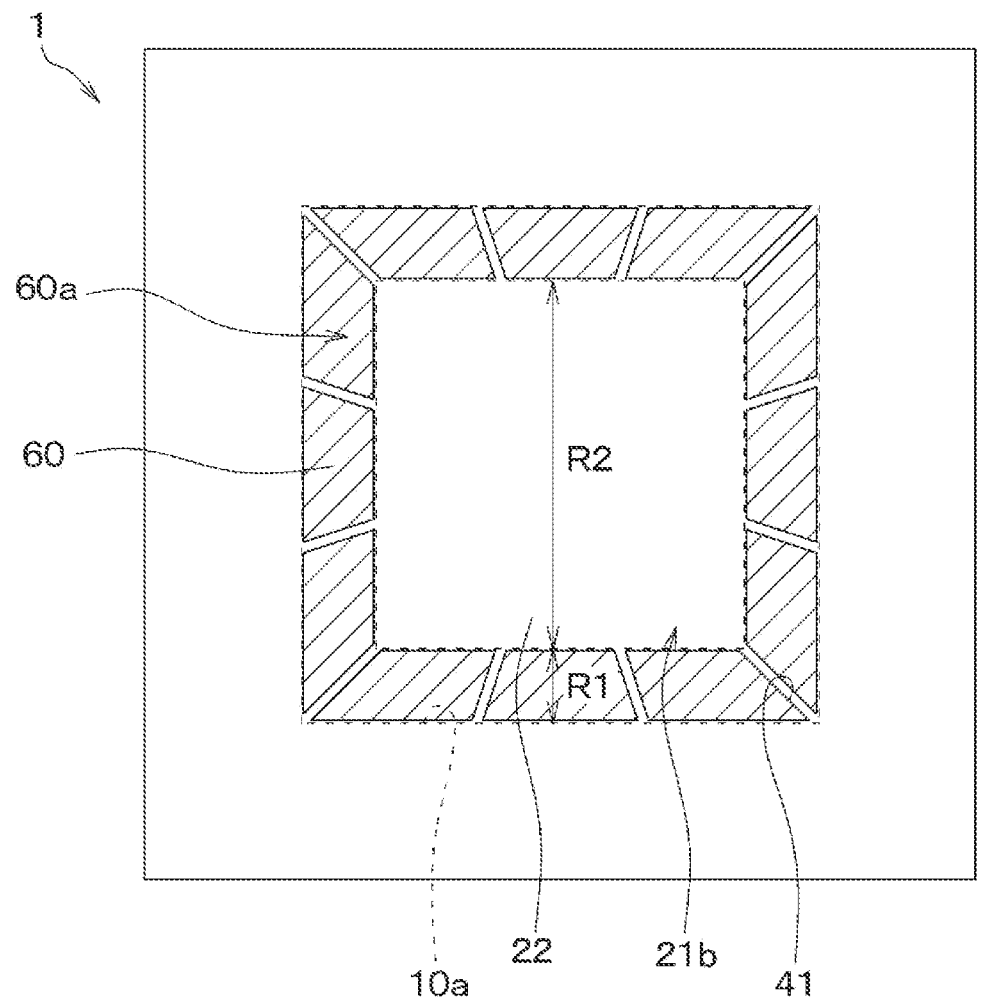
FIG. 18 is a plan view of an electrode film formed in a first region in a modification of the sixth embodiment.
Figure 19:
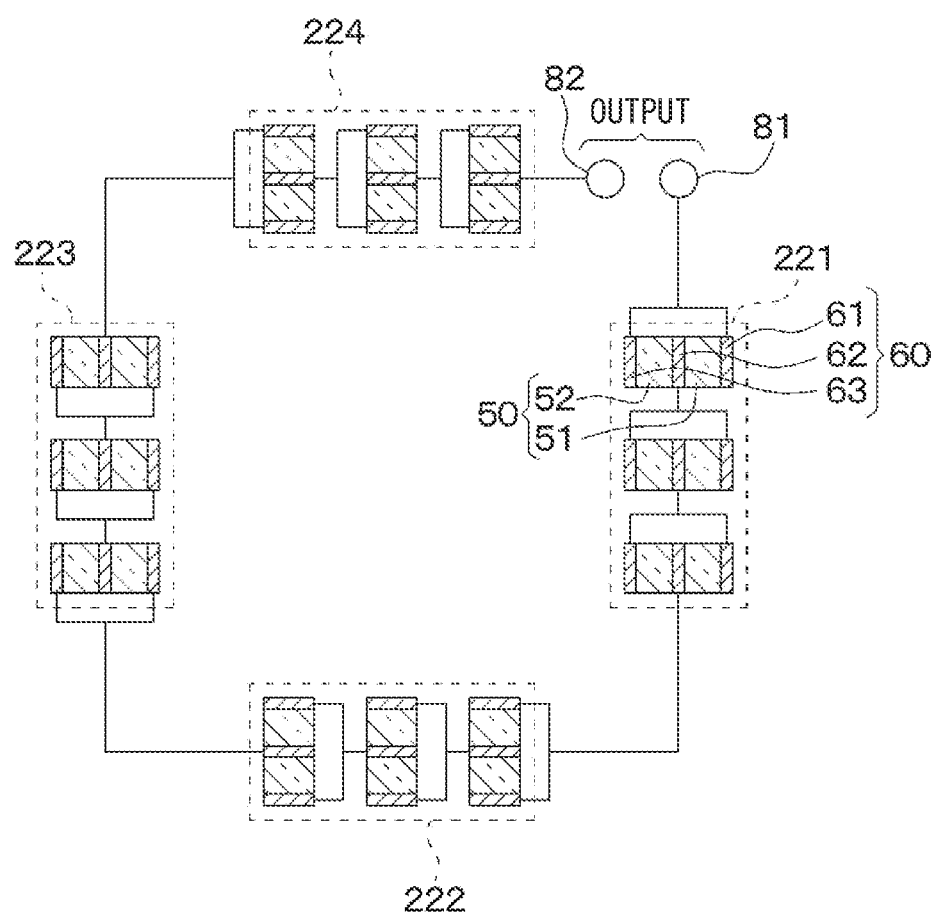
FIG. 19 is a schematic circuit diagram of a piezoelectric element in a modification of the sixth embodiment.

A modification of the sixth embodiment is described. In the piezoelectric element 1 of the present embodiment, as shown in FIG. 18, the electrode film 60 may be divided into a plurality of charge regions 60*a* in the first region R1. For example, the electrode film 60 may be divided into three charge regions 60*a* in the first region R1 of each of the vibration regions 221 to 224. Note that the lower layer electrode film 61, the intermediate electrode film 62, and the upper layer electrode film 63, which form the electrode film 60, are each divided into charge regions 60*a* in the first region R1 as shown in FIG. 18. In such case, as shown in FIG. 19, the piezoelectric element 1 is in a state in which capacitances formed by the respective divided charge regions 60*a* are connected in series. According to the above, the capacity in each of the vibration regions 221 to 224 is reducible, and the output can be improved. That is, it is possible to improve the detection sensitivity.

Seventh Embodiment

The following describes a seventh embodiment of the present disclosure. In the present embodiment, the shape of the slit 41 is changed with respect to the first embodiment. The rest of the configuration is similar to that of the first embodiment, and will thus not be described repeatedly.

Figure 20:
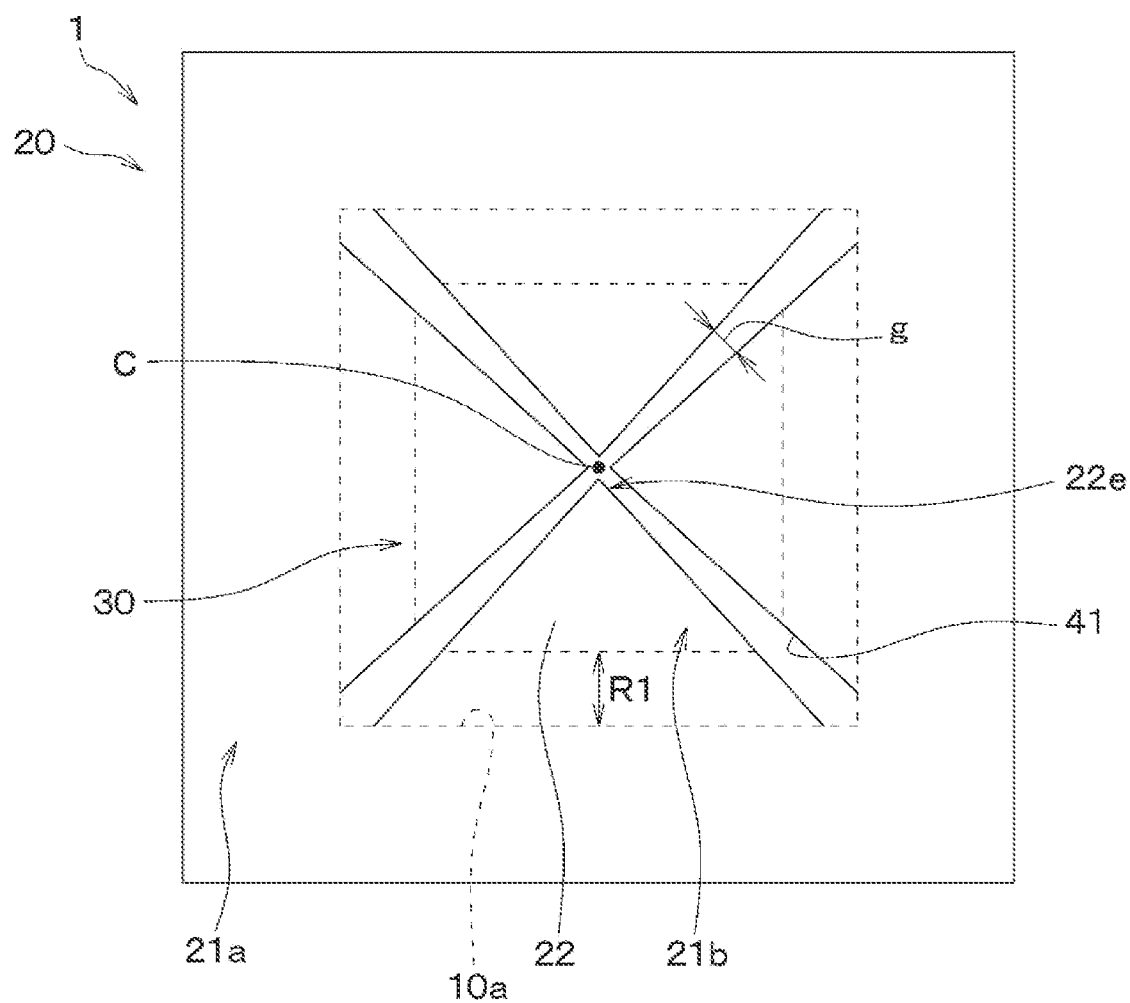
FIG. 20 is a plan view of a piezoelectric element according to a seventh embodiment.

In the piezoelectric element 1 of the present embodiment, as shown in FIG. 20, the slit 41 has a tapered shape tapered to have a narrower slit width g from the support region 21*a* toward the center C of the float region 21*b* when being viewed from the normal direction. In other words, the slit 41 has a tapered shape in which the slit width g is made narrower from the support area 21a toward the other end 22e of the vibration area 22 when being viewed in the normal direction. According to the present embodiment described above, since the angle θ1 formed by the vibration region 22 is set to 39 to 81 degrees, the same effects as those of the first embodiment described above are achievable.

In the present embodiment, the slit 41 is tapered such that the slit width g narrows toward the center portion C of the float region 21b. Therefore, when sound pressure is applied to the vibration region 22 and the vibration region 22 bends, the slit width g of each of the slits 41 in a bent state can easily be made uniform. In other words, when the vibration region 22 is bent, the slit width g of each of the slits 41 tends to be uniform between the portion on the support region 21a side and the portion on the center portion C side when being viewed in the normal direction. Therefore, it becomes difficult for a difference in local ease of release of sound pressure to occur in each of the slits 41, thereby reducing to noise. Therefore, it is possible to further improve the detection accuracy.

Eighth Embodiment

In the present embodiment, the shapes of the vibration region 22 and the intermediate electrode film 62 are adjusted with respect to the first embodiment. The rest of the configuration is similar to that of the first embodiment, and will thus not be described repeatedly.

Figure 21:
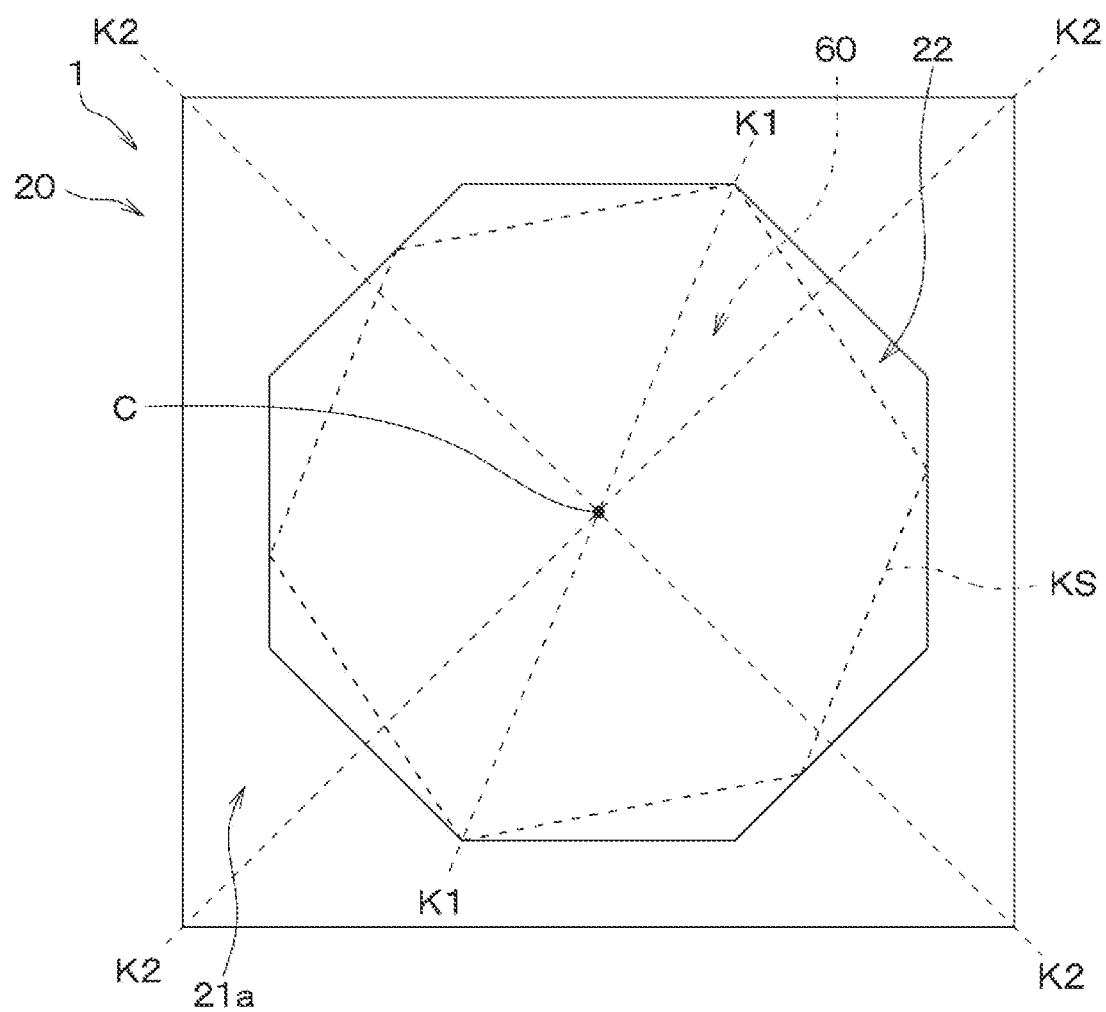
FIG. 21 is a plan view of a piezoelectric element in an eighth embodiment.

The piezoelectric element 1 of the present embodiment is described with reference to FIGS. 21 and 22. In FIG. 21, the slit 41 is omitted to be indicated. However, the slits 41 actually extend from the respective corners of the planar shape of the vibration regions 22 toward the center portion C, as in the first embodiment.

As shown in FIG. 21, the vibration region 22 has a regular octagonal outline when being viewed in the normal direction. In other words, the shape of the opening of the recess 10a of the support 10 is a regular octagon. The reason why the vibration region 22 has a regular octagonal shape is described in the following. As described above, in the present embodiment, the support substrate 11 is made of silicon. Therefore, by making the shape of the opening of the recess 10a (that is, the outline of the vibration region 22) a regular octagonal shape, concentration of warpage locally on the opening end of the recess 10a (that is, an outer edge portion of the vibration region 22) in the support substrate 11 is suppressible. Therefore, concentration of warpage locally on a certain portion of the vibration region 22, i.e., at the boundary between the vibration region 22 and the support region 21a, is suppressible.

Figure 22:
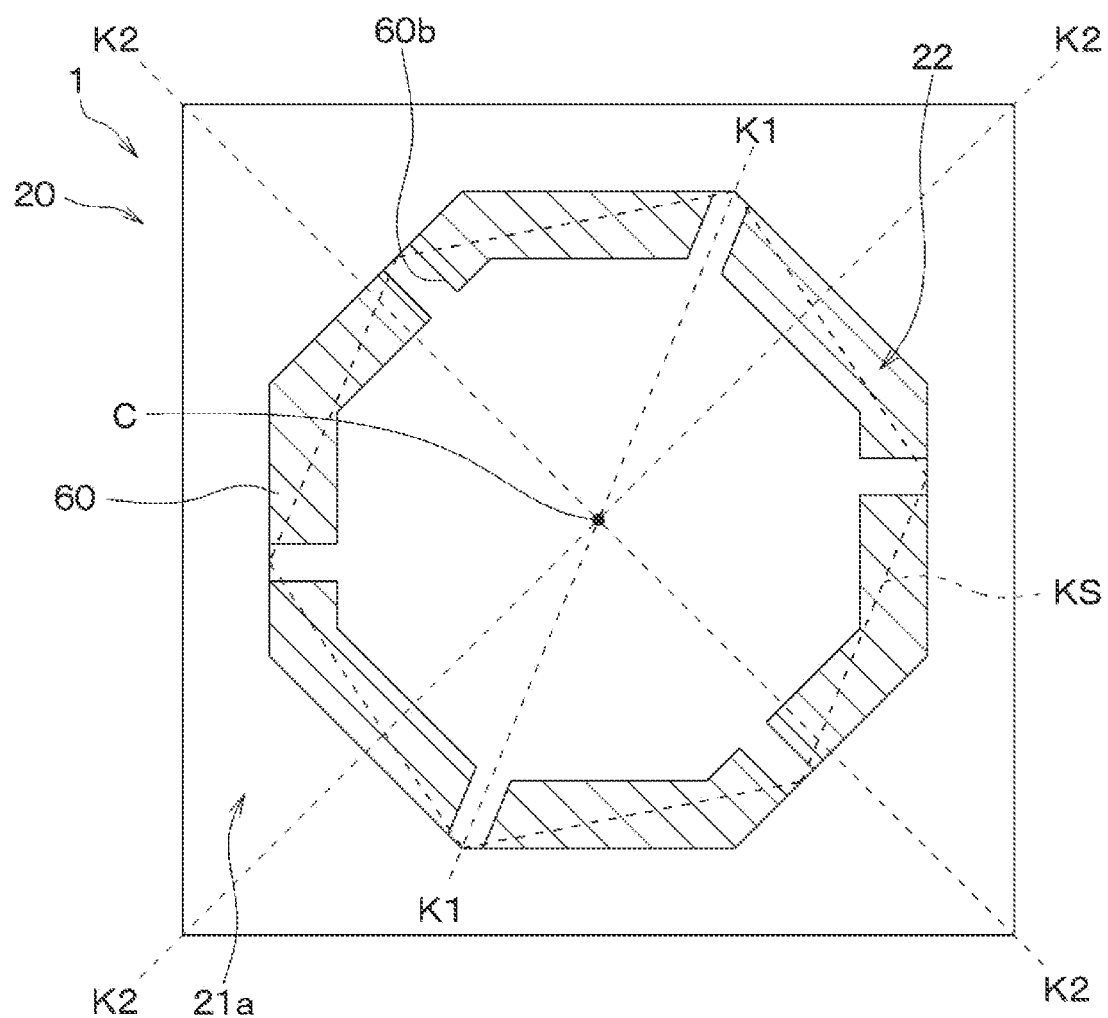
FIG. 22 is a plan view of an electrode film formed in a first region of the eighth embodiment.

In addition, as shown in FIG. 22, the electrode film 60 of the present embodiment has a regular octagonal outline at the portion formed in the first region R1 when being viewed in the normal direction. That is, the electrode film 60 is formed so that the outer edge of the electrode film 60 in the first region R1 substantially coincides with the opening end of the recess 10a. Further, the electrode film 60 is separated by electrode film slits 60b that are different from the slits 41 in the portions formed in the first regions R1. Specifically, six electrode film slits 60b are formed, and a virtual shape KS formed by connecting predetermined locations in each of the electrode film slits 60b makes a hexagonal shape (hereinafter a virtual shape KS may also be simply referred to as a virtual shape). More specifically, the electrode film slits 60b are formed so that the virtual shape formed by connecting the intersections of the electrode film slits 60b and the outline of the electrode film 60 makes a hexagonal shape.

The outline of the portion of the electrode film 60 positioned in the first region R1 here means, as described above, a shape that is composed of (a) the outline of the portion of the electrode film 60 positioned in the first region R1 and (b) the extension of the outline.

The reason why the virtual shape KS of the electrode film 60 is a hexagonal shape is described in the following. As described above, the electrode film 60 and the piezoelectric film 50 are arranged by orderly stacking the lower layer electrode film 61, the lower layer piezoelectric film 51, the intermediate electrode film 62, the upper layer piezoelectric film 52, and the upper layer electrode film 63 in such written order. When forming the lower layer electrode film 61, the intermediate electrode film 62, and the upper layer electrode film 63, after forming a metal film, the metal film is patterned into a desired shape by dry etching or the like using a mask. In such process, though a mask is used, there is a possibility that the underlying layer such as the lower layer piezoelectric film 51 and the upper layer piezoelectric film 52 is etched. In such case, when the piezoelectric film 50 is made of ScAlN, it has a hexagonal crystal structure. Therefore, by configuring the virtual shape KS of the electrode film 60 as a hexagonal shape, it is possible to suppress a collapse of crystallinity of the piezoelectric film 50 when the surface of the piezoelectric film 50 is etched In other words, by matching the crystal structure of the portion where the electrode film slit 60b is formed to the crystal structure of the piezoelectric film 50, it is possible to suppress fluctuations in the characteristics of the piezoelectric film 50.

Figure 23:
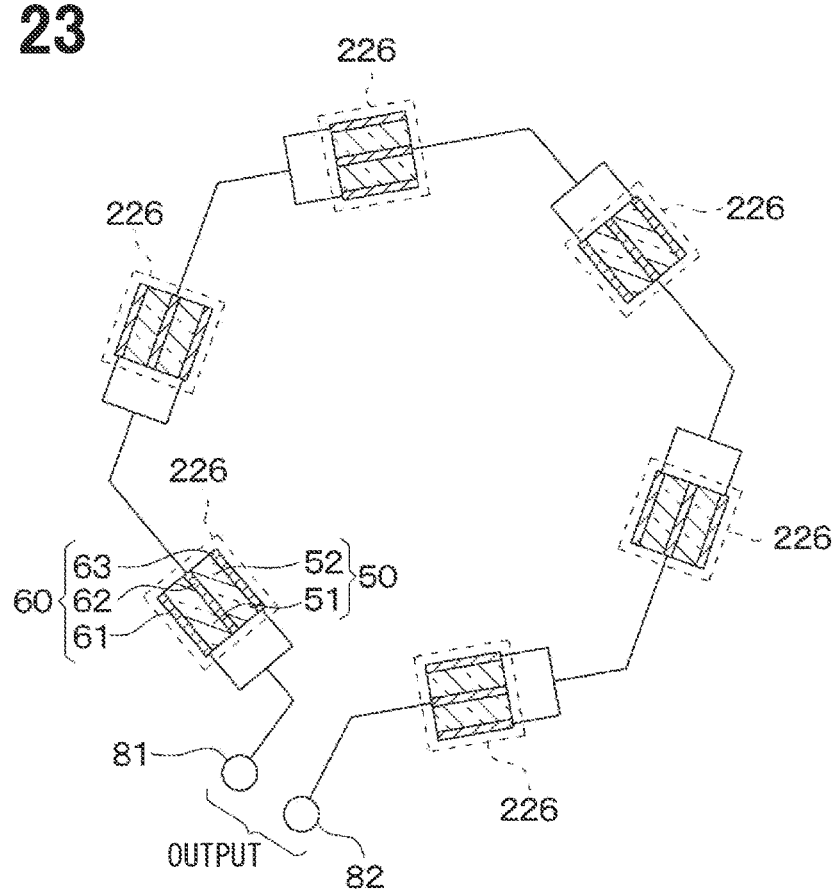
FIG. 23 is a schematic circuit diagram of the piezoelectric element according to the eighth embodiment.

Further, in the piezoelectric element 1 of the present embodiment, as shown in FIG. 23, capacitances between the electrode films 61 to 63 are connected. In the present embodiment, as described above, the electrode film 60 is divided into six pieces by the electrode film slits 60b that are different from the slits 41. Therefore, the piezoelectric element 1 of the present embodiment has six divided regions 226 and outputs a pressure detection signal based on the capacitance of each of the regions 226.

Figure 24:
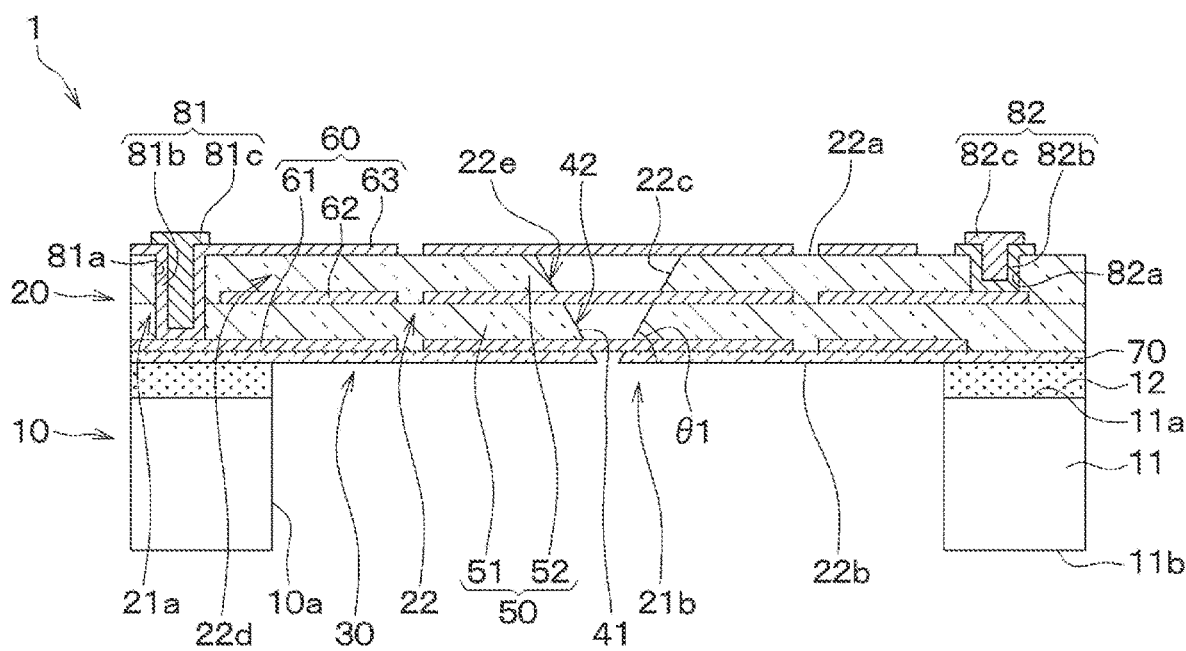
FIG. 24 is a cross-sectional view of the piezoelectric element according to the eighth embodiment.

The electrode films 60 of the present embodiment are separated by the electrode film slits 60b as described above, and are not separated by the slits 41. Therefore, as shown in FIG. 24, the electrode film 60 is in a continuous state at the portion where the slit 41 is formed. Such a piezoelectric element 1 is manufactured, for example, by forming the slit 41 or the electrode film slit 60b every time each of the films is formed when performing the steps of FIGS. 4A and 4B. For example, after forming the base film 70, a metal film is formed on the base film 70. Then, when the metal film is patterned to form the lower layer electrode film 61, the electrode film slits 60b are formed. After that, the lower layer piezoelectric film 51 is formed on the lower layer electrode film 61, and the slit 41 piercing through the lower layer piezoelectric film 51 only is formed in the lower layer piezoelectric film 51 before forming the intermediate electrode film 62. After that, the intermediate electrode film 62, the upper layer piezoelectric film 52, and the upper layer electrode film 63 are similarly formed, thereby manufacturing the piezoelectric element 1 of the present embodiment.

Further, in the electrode film 60 of the present embodiment, the outer edge of the electrode film 60 on the side opposite to the center portion C is actually formed to extend to the outside of the first region R1, and the inner edge is formed to the inside of the second region R2. Therefore, when patterning the metal film into a desired shape to form the intermediate electrode film 62 and the upper layer electrode film 63 after forming the metal film, the piezoelectric film 50 is not removed outside the first region R1, even when the piezoelectric film 50 is removed in a portion different from the electrode film slit 60b. Therefore, by making the virtual shape KS in a hexagonal shape, it is possible to suppress a decrease in detection accuracy.

Further, the virtual shape KS of the vibration region 22 and the electrode film 60 is arranged to be point symmetric with respect to the center portion C. In the present embodiment, the virtual shape KS of the electrode film 60 is a hexagonal shape when being viewed in the normal direction, and the outline of the vibration region 22 is a regular octagon. Further, the vibration region 22 and the electrode film 60 are arranged such that two opposing vertices of the virtual shape KS of the electrode film 60 and two opposing vertices of the outline of the vibration region 22 are aligned. In other words, the two opposing vertices of the virtual shape KS of the electrode film 60 are arranged on a virtual line K1 connecting the two opposing vertices of the vibration region 22.

Further, the piezoelectric element 1 (that is, the vibrating portion 20) of the present embodiment has a planar, rectangular shape as described above. Further, the virtual shape KS of the vibration region 22 and the electrode film 60 is formed so that each of the corners is positioned on a different portion from the virtual line K2 connecting the opposite corners of the outline of the piezoelectric element 1.

According to the present embodiment described above, since the angle θ1 formed by the vibration region 22 is set to 39 to 81 degrees, the same effects as those of the first embodiment described above are achievable.

(1) In the present embodiment, the vibration region 22 and the electrode film 60 are arranged point-symmetrically with respect to the center C when being viewed in the normal direction. Therefore, when sound pressure is applied to the vibration region 22, such a configuration makes it easy to extract electric charges evenly from the electrode film 60. Therefore, a decrease in detection sensitivity is suppressible, and a decrease in detection accuracy is suppressible.

(2) In the present embodiment, the virtual shape KS of the vibration region 22 and the electrode film 60 is formed so that each of the corners is positioned on a different portion from the virtual line K2 connecting the opposite corners of the outline of the piezoelectric element 1. Therefore, the deterioration of the detection accuracy is suppressible. That is, in the piezoelectric element 1, the portion on the virtual line K2 connecting the opposing corners is easily warped due to thermal stress or the like. In such case, if the corner of the vibration region 22 or the corner of the virtual shape KS of the electrode film 60 is positioned on the virtual line K2, a large thermal stress is likely to be applied to an easily-deformable corner, making the noise larger than otherwise. Therefore, by positioning the corners of the vibration region 22 and the electrode film 60 in a portion different from the virtual line K2 as in the present embodiment, it is possible to suppress a decrease in detection accuracy.

(3) In the present embodiment, the virtual shape KS of the electrode film 60 has a hexagonal shape. Therefore, it is possible to prevent the crystallinity of the piezoelectric film 50 from collapsing when the electrode film 60 is formed by patterning. Therefore, fluctuations in the characteristics of the piezoelectric element 1 is suppressible.

(4) In the present embodiment, the outline of the vibration region 22 is a regular octagon. Therefore, concentration of warpage locally on a certain portion of the vibration region 22 is suppressible.

Modification of the Eighth Embodiment

Figure 25:
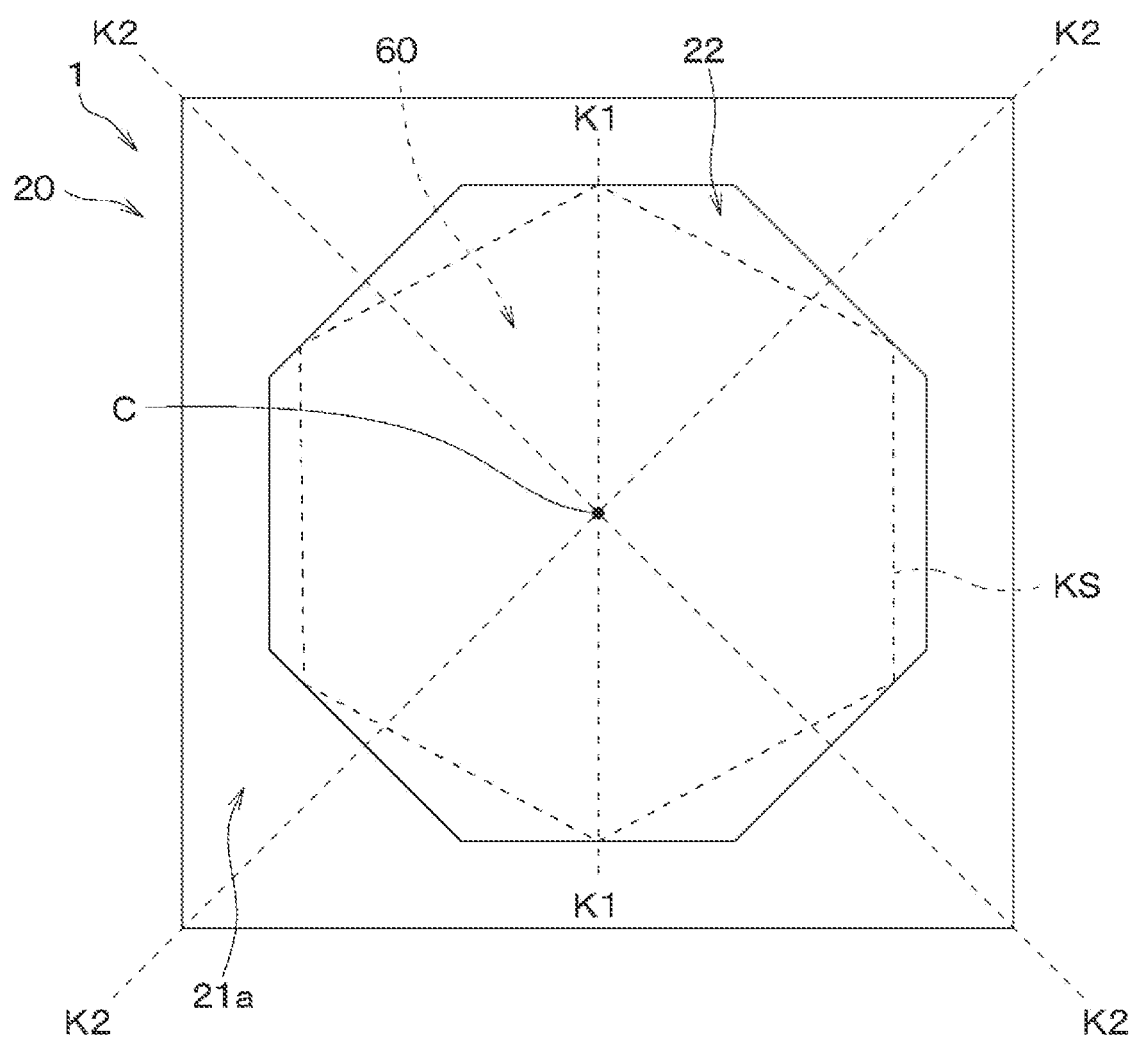
FIG. 25 is a plan view of a piezoelectric element in a modification of the eighth embodiment.

A modification of the eighth embodiment is described. In the eighth embodiment, when the vibration region 22 and the electrode film 60 are arranged point-symmetrically with respect to the center portion C, charges are easily extractable evenly from the electrode film 60 in the same manner as in the eighth embodiment. Thus, for example, as shown in FIG. 25, the vibration region 22 and the electrode film 60 may be arranged so that a pair of vertices on opposite sides of the electrode film 60 are positioned on a virtual line K3 connecting a middle point of one of a pair of opposing sides of the vibration region 22. Even in such a configuration, the vibration region 22 and the electrode film 60 are preferably formed so that each of the corners is positioned on a different portion from the virtual line K2. 25, illustration of the slit 41 is omitted in the same manner as in FIG.

Figure 26:
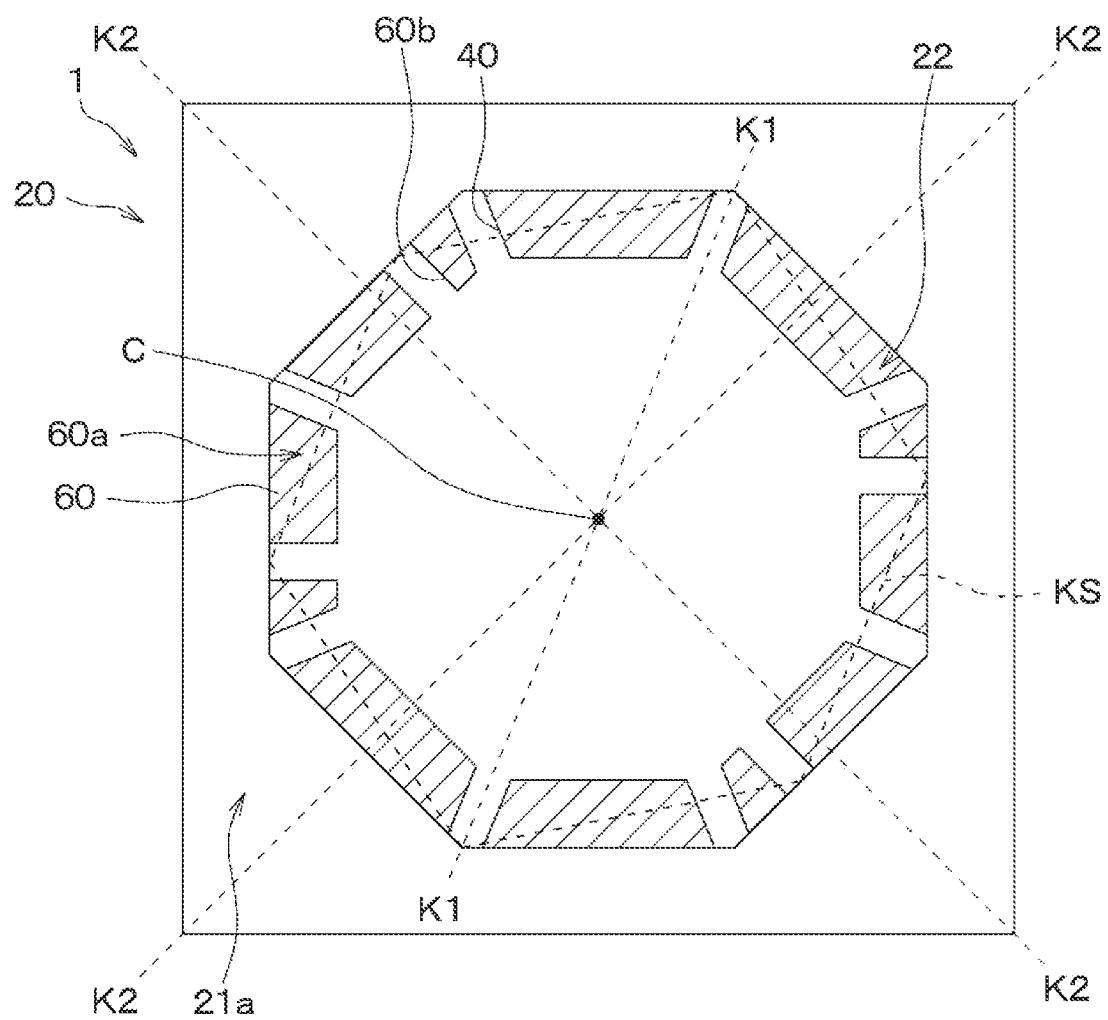
FIG. 26 is a plan view of an electrode film formed in the first region in a modification of the eighth embodiment.
Figure 27:
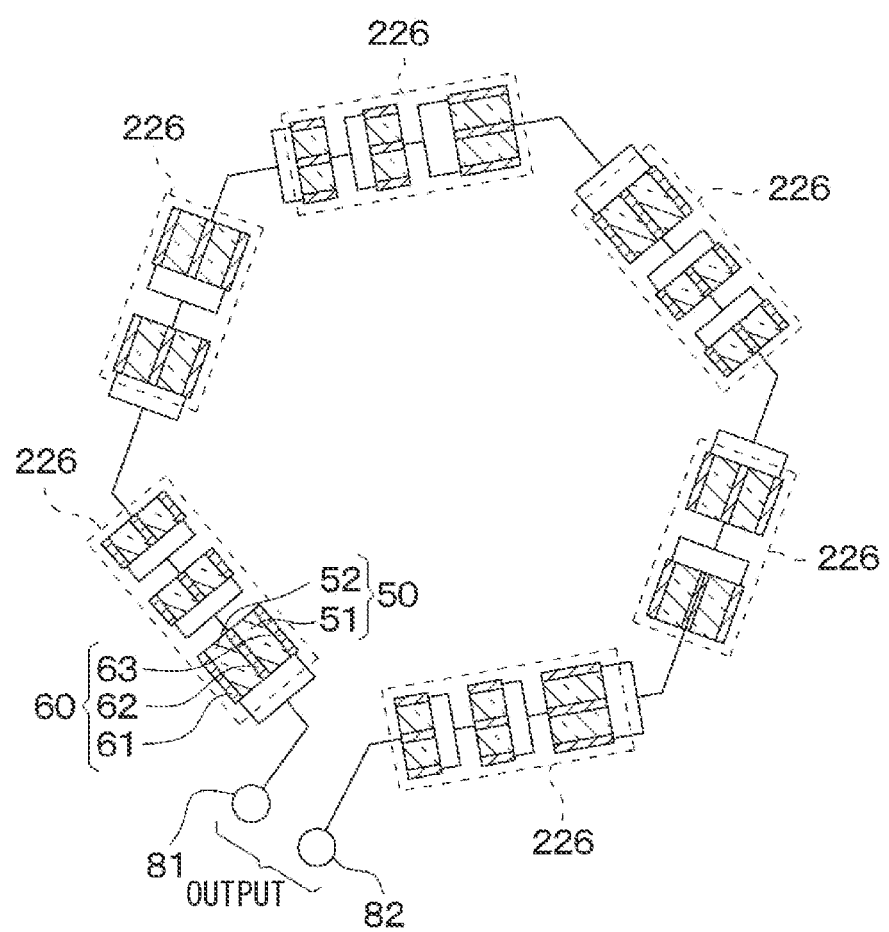
FIG. 27 is a schematic circuit diagram of a piezoelectric element in a modification of the eighth embodiment.

Further, in the eighth embodiment described above, as in the modification of the sixth embodiment, the electrode film 60 may be divided into a plurality of charge regions 60a in the first region R1 as shown in FIG. 26. Then, as shown in FIG. 27, each of the divided charge regions 60a may be connected in series. Note that, when the electrode film 60 is configured in such manner, the electrode film 60 may be divided by the slits 41 formed in the piezoelectric film 50.

Ninth Embodiment

The ninth embodiment is described. In the present embodiment, the slit length and the like are specified in comparison with the first embodiment. The rest of the configuration is similar to that of the first embodiment, and will thus not be described repeatedly.

Figure 28:
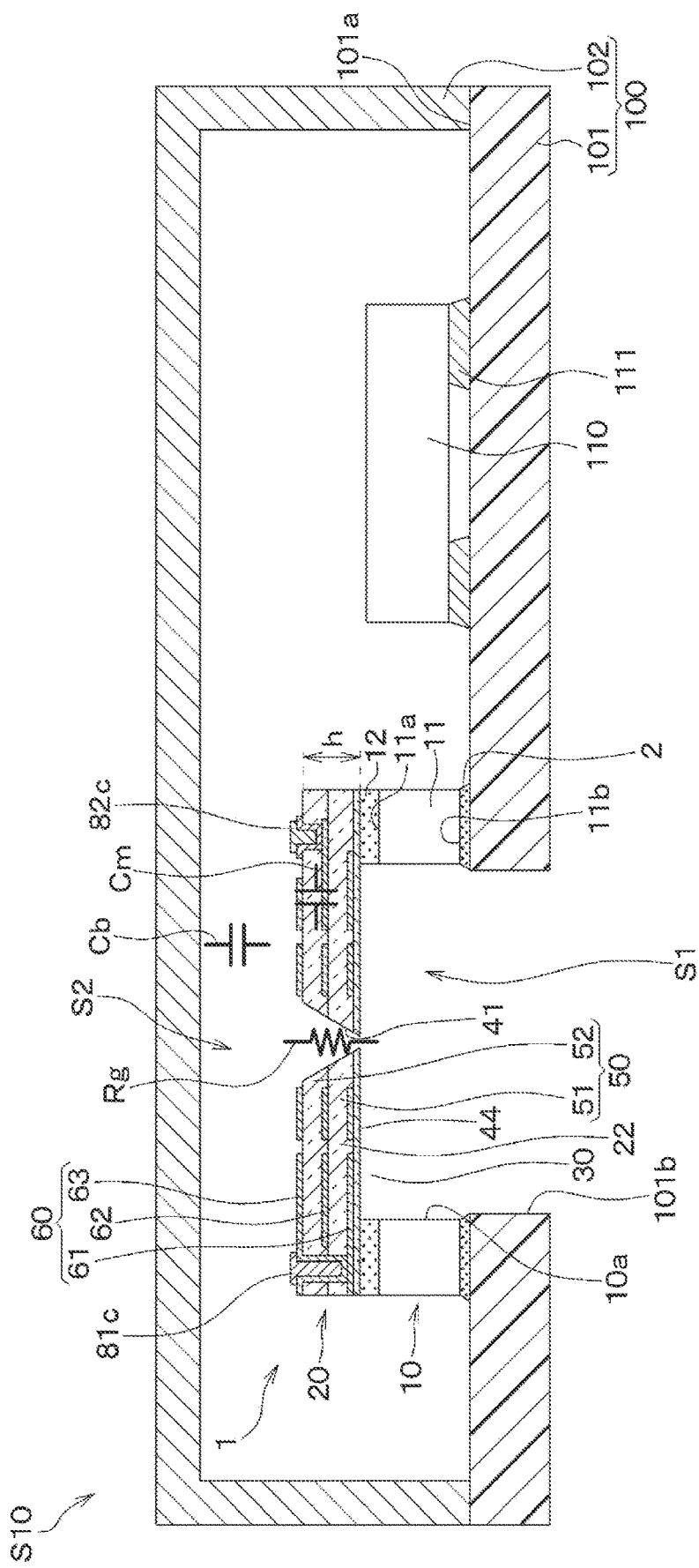
FIG. 28 is a schematic cross-sectional view of a piezoelectric device according to a ninth embodiment.

The piezoelectric device S10 of the present embodiment is basically the same as that of the first embodiment, and is configured as shown in FIG. 28. Note that FIG. 28 schematically shows an acoustic resistance Rg and the like, which is described later. In such case, the sensitivity of the piezoelectric device S10 is expressed by $1/\{(1/Cm)+(1/Cb)\}$, where Cm is an acoustic compliance of the piezoelectric element 1, and Cb is an acoustic compliance of the back space S2. The acoustic compliance Cb is shown by the following Formula 1.

$$Cb = \frac{Vb}{\rho 0 \times c^2} \quad \text{(Formula 1)}$$

In the Formula 1 above, Vb is the volume of the back space S2, ρ0 is the air density, and c is the speed of sound. The acoustic compliance Cb is proportional to a volume Vb of the back space S2. Therefore, the effect of the acoustic compliance Cb on the sensitivity becomes smaller as the back space S2 becomes smaller. At present, miniaturization of the piezoelectric device S10 is desired, and by miniaturizing the piezoelectric device S10, the back space S2 also becomes smaller. Therefore, the sensitivity of the piezoelectric device S10 is greatly affected by the acoustic compliance Cm of the piezoelectric element 1.

Here, in the piezoelectric element 1 as described above, it is desired to widen a frequency range in which the sensitivity can be maintained. Therefore, in the present embodiment, a low-frequency roll-off frequency is reduced.

First, a low-frequency roll-off frequency fr is expressed by the following Formula 2, where Rg is the acoustic resistance (that is, air resistance) of the slit 41.

$$fr = \frac{1}{2\pi \times Rg \times Cb} \quad \text{(Formula 2)}$$

Therefore, in order to reduce the low-frequency roll-off frequency fr, the acoustic resistance Rg or the acoustic compliance Cb of the back space S2 should be increased. However, the acoustic compliance Cb is proportional to the volume Vb of the back space S2 as in Formula 1 above. At present, there is a demand for miniaturization of the piezoelectric device S10. Therefore, in order to reduce the low-frequency roll-off frequency fr, it is preferable to increase the acoustic resistance Rg. The acoustic resistance Rg is expressed by Formula 3 below.

$$Rg = \frac{3 \times \mu \times h}{\sqrt{2} \times ga^3 \times L} \quad \text{(Formula 3)}$$

In the Formula 3, μ is an air frictional resistance, h is a thickness of the vibration region 22, ga is an average slit width of the slits 41, and L is a slit length of the slits 41 in each of the vibration regions 22. The average slit width ga is an average width of the slits 41 along the thickness direction. Further, as shown in FIG. 2, the slit length L is a length in the extending direction of the slit 41, and is a length from the corner portion of the vibration region 22 to the center portion C. In other words, the slit length L is a length of the side surface 22c of the vibration region 22 in the direction orthogonal to the thickness direction, and is a length of the slit 41 along the side surface 22c of the vibration region 22.

In order to set the low-frequency roll-off frequency fr to 20 Hz or less, which is out of the audible range, the following Formula 4 should be satisfied.

$$fr = \frac{1}{2\pi \times Rg \times Cb} \leq 20 \text{(Hz)} \quad \text{(Formula 4)}$$

In such case, changing the Formula 4 results in Formula 5 below. Then, when the Formula 5 is changed based on the Formula 3, the following Formula 6 is obtained.

$$Rg \geq \frac{1}{20 \times 2\pi \times Cb} = \frac{1}{40\pi \times Cb} \quad \text{(Formula 5)}$$

$$L \leq \frac{3 \times \mu \times h \times 40\pi \times Cb}{\sqrt{2} \times ga^3} \quad \text{(Formula 6)}$$

Therefore, in order to make the low-frequency roll-off frequency fr equal to or less than 20 Hz, it is sufficient that the slit length L, the average slit width ga, the thickness h of the vibration region 22, and the acoustic compliance Cb of the back space S2 satisfy the above-mentioned Formula 6. In the present embodiment, the slit length L and the like are adjusted so as to satisfy the Formula 6 above.

Figure 29:
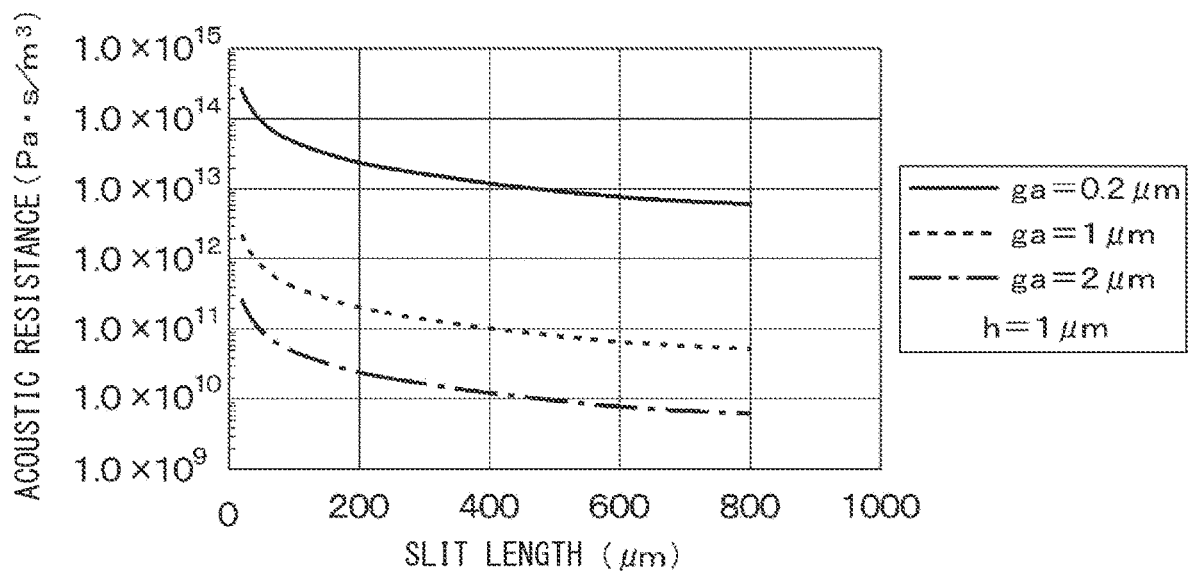
FIG. 29 is a diagram showing a relationship between an average slit width, a slit length, and an acoustic resistance when a thickness of the vibration region is constant.
Figure 30:
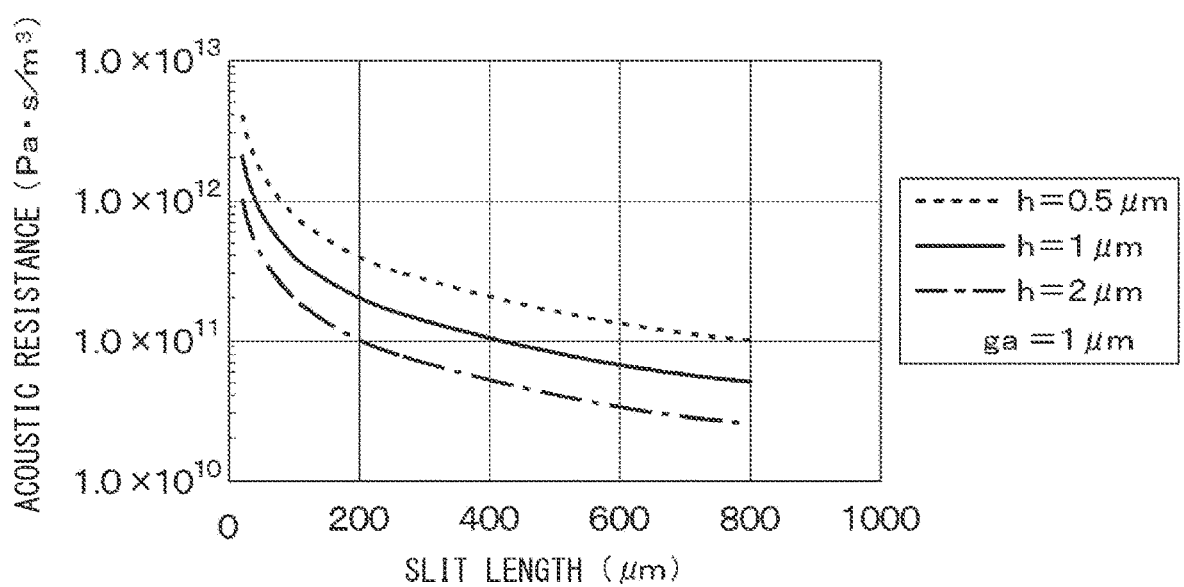
FIG. 30 is a diagram showing a relationship between the thickness of the vibration region, the slit length, and the acoustic resistance when the average slit width is constant.

Here, for example, when the thickness h of the vibration region 22 is 1 μm, as shown in FIG. 29, it is confirmable that the acoustic resistance Rg decreases as the average slit width ga increases, and as the slit length L increases. Further, when the average slit width ga is 1 μm, as shown in FIG. 30, it is confirmable that the acoustic resistance Rg decreases as the thickness h of the vibration region 22 increases, and decreases as the slit length L increases. Then, as shown in FIG. 31, for example, with reference to a standard case in which the slit length L is 700 μm at which the acoustic resistance is about 100 Hz, the slit length L of about 150 μm makes the acoustic resistance Rg being 20 Hz or less.

Figure 31:
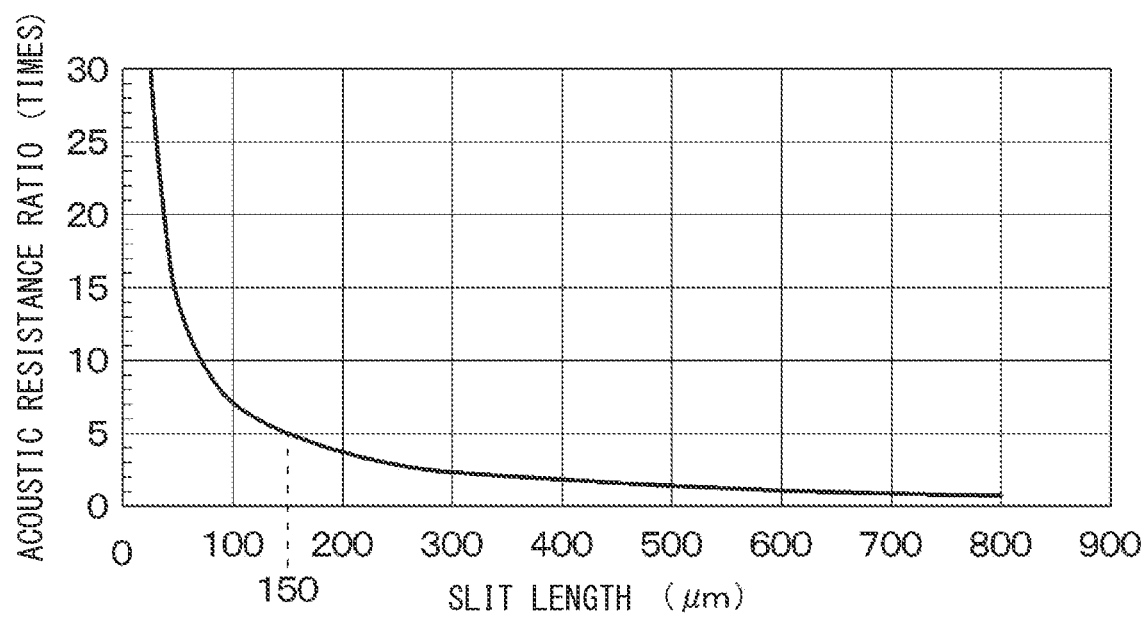
FIG. 31 is a diagram showing a relationship between the slit length and an acoustic resistance ratio.

Note that in FIG. 31, since the slit length L of 700 μm is set as a standard, an acoustic resistance ratio is 1 when the slit length L is 700 μm. Also, in FIG. 31, the volume of the back space S2 that affects the acoustic compliance Cb is $4 \times 10^{-9}$ m$^3$.

According to the present embodiment described above, since the angle θ1 formed by the vibration region 22 is set to 39 to 81 degrees, the same effects as those of the first embodiment described above are achievable.

In the present embodiment, the slit length L, the average slit width ga, the thickness h of the vibration region 22, and the acoustic compliance Cb of the back space S2 are set to satisfy the Formula 6 above. Therefore, the low-frequency roll-off frequency fr can be set to 20 Hz or less, thereby the sensitivity maintainable range is widened.

Tenth Embodiment

The tenth embodiment is described. In the present embodiment, the shape of the slit 41 is changed with respect to the ninth embodiment. Descriptions of the same configurations and processes as those of the ninth embodiment will not be repeated hereinafter.

Figure 32:
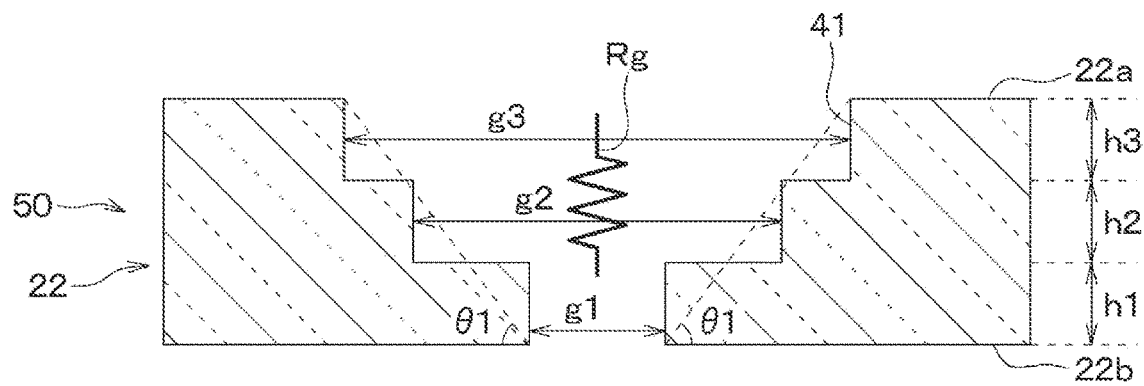
FIG. 32 is a cross-sectional view of a slit of the piezoelectric element in a tenth embodiment.

In the ninth embodiment, the tapered configuration in which the slit width g gradually narrows along the thickness direction of the vibration region 22 has been described. However, the slit width g of the slit 41 may change stepwise along the thickness direction of the vibration region 22. For example, as shown in FIG. 32, the slit width g may change in three steps. Specifically, in the present embodiment, the slit 41 is formed so that the slit width g increases in the order of g1, g2, and g3 from the other surface 22b side of the vibration region 22 toward the one surface 22a side. In such configuration, an angle between (a) a line connecting the opening end of the slit 41 on the other surface 22b side and the opening end of the slit 41 on the one surface 22a side and (b) the other surface 22b forms an angle θ1.

In such case, the slit length L may be determined using the average slit width ga, or may be determined using a Formula 7 below. In the Formula 7 below, in the vibration region 22, the thickness of a portion where the slit width is g1 is defined as a thickness h1 of the vibration region 22, and the thickness of a portion where the slit width is g2 is defined as a thickness h2 of the vibration region 22, and the thickness of a portion where the slit width is g3 is a thickness h3 of the vibration region 22.

$$L \leq \frac{3 \times \mu \times h1 \times 40\pi \times Cb}{\sqrt{2} \times g1^3} + \frac{3 \times \mu \times h2 \times 40\pi \times Cb}{\sqrt{2} \times g2^3} + \frac{3 \times \mu \times h3 \times 40\pi \times Cb}{\sqrt{2} \times g3^3} \quad \text{(Formula 7)}$$

Figure 33:
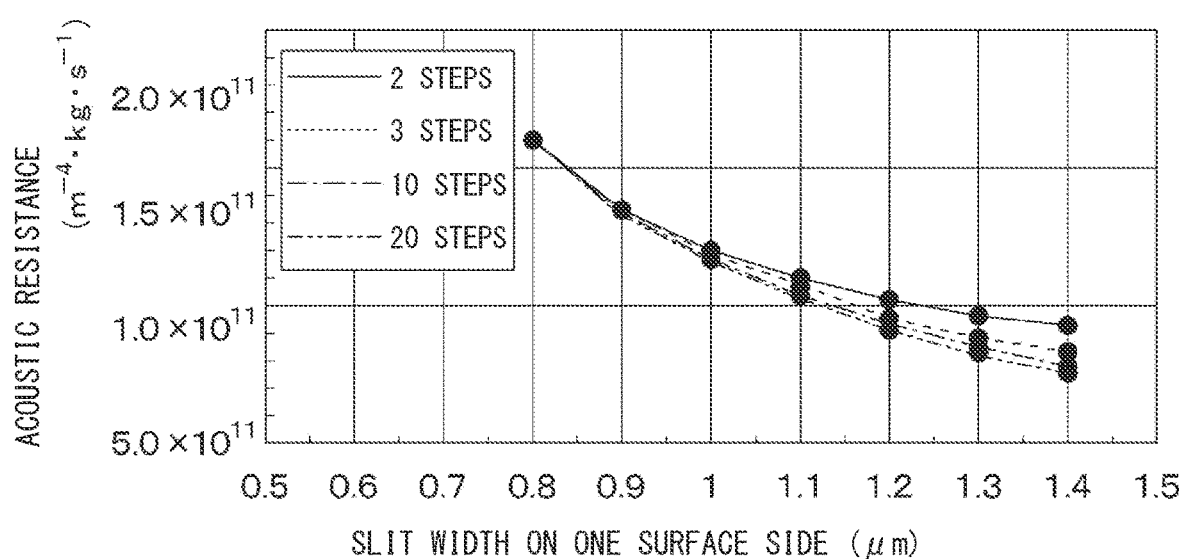
FIG. 33 is a diagram showing a relationship between the slit width on one side and the acoustic resistance.

Further, when the slit 41 has a width of g1 on the other surface 22b and a width of g3 on the one surface 22a, the acoustic resistance Rg changes, as shown in FIG. 33, by changing the number of steps between the other surface 22b and the one surface 22a. Specifically, when the slit width g1 on the other surface 22b and the slit width g3 on the one surface 22a are the same, it is confirmable that the acoustic resistance Rg tends to increase when the number of steps that change is small. The low-frequency roll-off frequency fr decreases as the acoustic resistance Rg increases, according to the Formula 2 above. Therefore, when changing the slit width g of the slit 41 along the thickness direction of the vibration region 22, it may be preferable to adjust the number of steps in consideration of the acoustic compliance Cb of the back space S2. Note that FIG. 33 shows a case where the slit width g1 on the other surface 22b is set to 0.8 μm, the thickness h of the entire vibration region 22 is set to 1 μm, and the slit width g3 on the one surface 22a is changed.

According to the present embodiment described above, since the angle θ1 formed by the vibration region 22 is set to 39 to 81 degrees, the same effects as those of the first embodiment described above are achievable.

In the present embodiment, the slit length L, the average slit width ga, the thickness h of the vibration region 22, and the acoustic compliance Cb of the back space S2 are set to satisfy the Formula 7 above. Therefore, the low-frequency roll-off frequency fr can be set to 20 Hz or less, thereby the sensitivity maintainable range is widened.

Eleventh Embodiment

The eleventh embodiment is described. In the present embodiment, the shape of the joining member 2 is defined as compared with the first embodiment. The rest of the configuration is similar to that of the first embodiment, and will thus not be described repeatedly.

Figure 34:
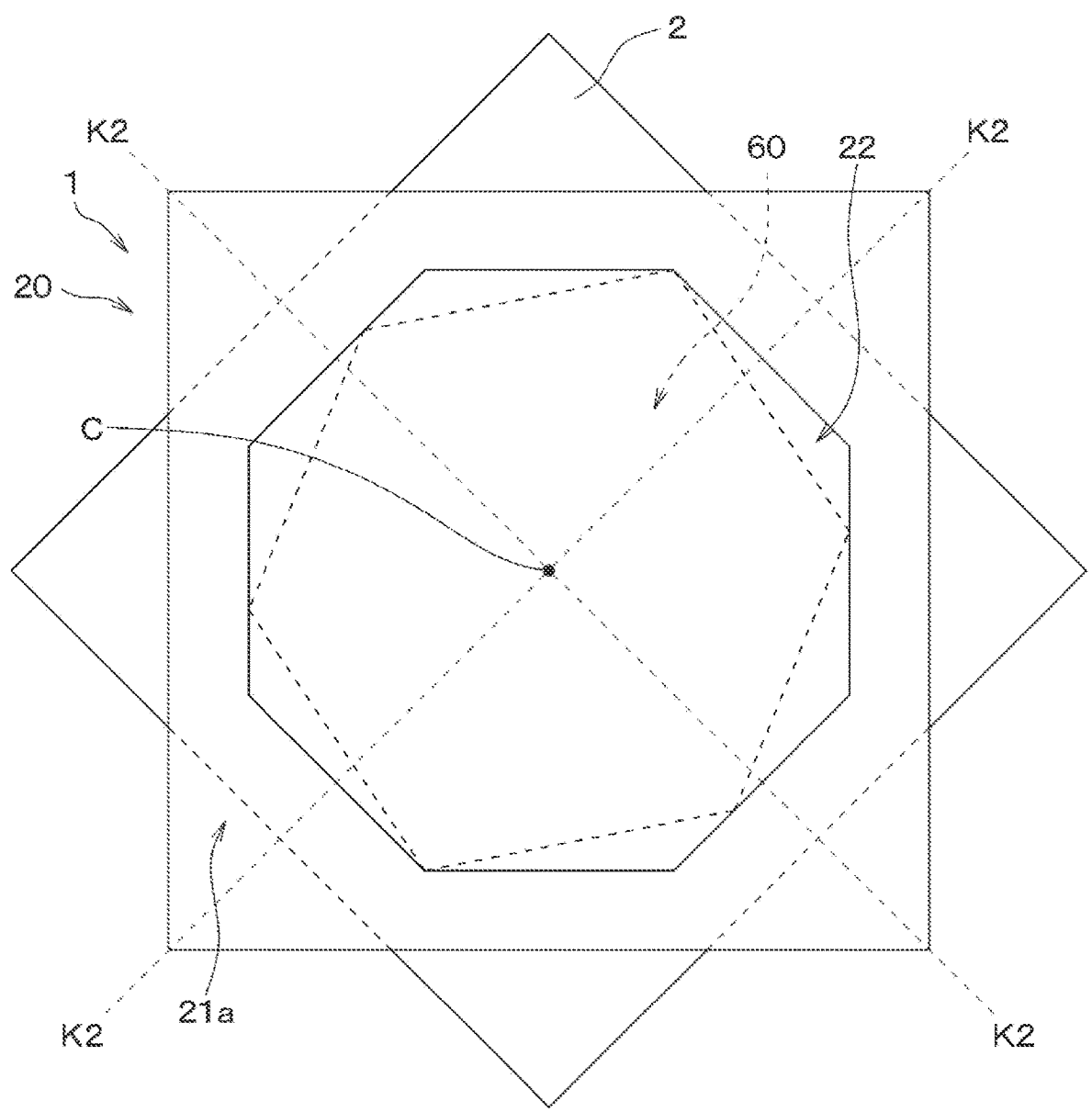
FIG. 34 is a plan view showing a positional relationship between a piezoelectric element and a joining member according to an eleventh embodiment.

In the piezoelectric device S10 of the present embodiment, as shown in FIG. 34, the joining member 2 has a rectangular outline with corners when being viewed in the normal direction. The joining member 2 is joined to a portion of the other surface 11b of the support substrate 11 of the piezoelectric element 1, which is different from the corner portion of the piezoelectric element 1. In the present embodiment, the joining member 2 is arranged so that each corner of the joining member 2 protrudes from each of opposing sides of the piezoelectric element 1 when being viewed in the normal direction. Further, the joining member 2 is arranged so that the corners of the joining member 2 are respectively positioned at a different portion from the virtual line K2 connecting the opposite corners of the outline of the piezoelectric element 1. In addition, the joining member 2 of the present embodiment is configured using a joining sheet having a predetermined outline.

Further, the electrode film 60 and the vibration region 22 of the present embodiment are hexagonal in shape and the vibration region 22 is octagonal in the same manner as in the eighth embodiment. The electrode film 60 and the vibration region 22 are arranged to be point symmetric with respect to the center portion C. In FIG. 34, the slit 41 is omitted to be indicated.

According to the present embodiment described above, since the angle θ1 formed by the vibration region 22 is set to 39 to 81 degrees, the same effects as those of the first embodiment described above are achievable.

(1) In the present embodiment, the joining member 2 is arranged at a portion different from the corner portion of the outline of the piezoelectric element 1. Therefore, it is possible to suppress the propagation of thermal stress from the printed circuit board 101 to the corners of the piezoelectric element 1 where deformation is likely to increase. Therefore, the piezoelectric element 1 is less likely to deform due to the transmitted thermal stress, and the vibration region 22 is less likely to deform. Therefore, it is possible to suppress a decrease in detection sensitivity and to improve detection accuracy.

(2) In the present embodiment, the joining member 2 has a rectangular outline with corners. The joining member 2 is arranged such that the corners thereof are respectively positioned at a different portion from the virtual line K2 when being viewed in the normal direction. Therefore, it is possible to suppress concentration of stress on the corner portion of the joining member 2 due to the deformation of the piezoelectric element 1, and it is possible to suppress the occurrence of problems such as peeling of the joining member 2.

Modification of the Eleventh Embodiment

Figure 35A:
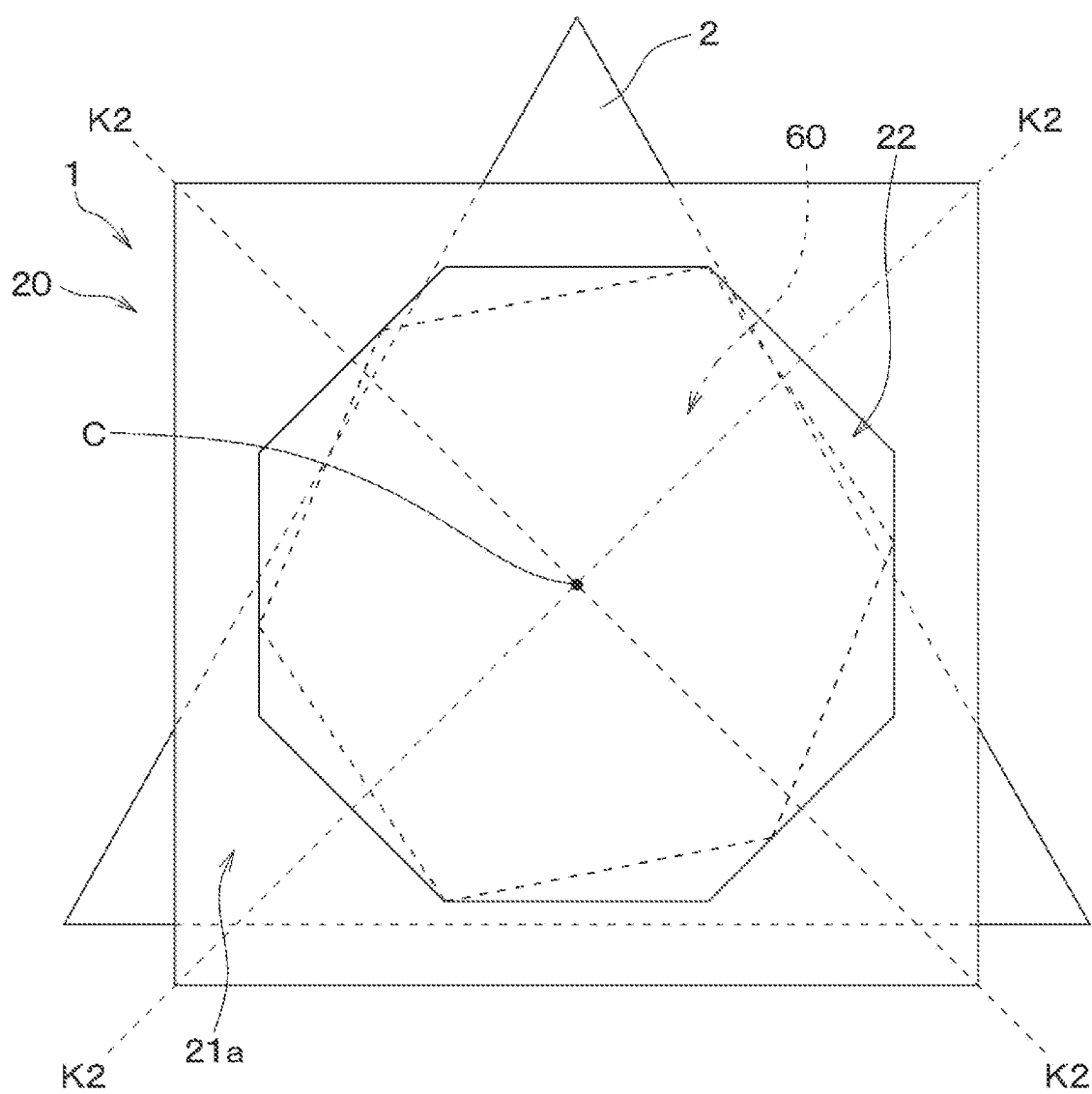
FIG. 35A is a plan view showing a positional relationship between a piezoelectric element and a joining member in a modification of the eleventh embodiment.
Figure 35B:
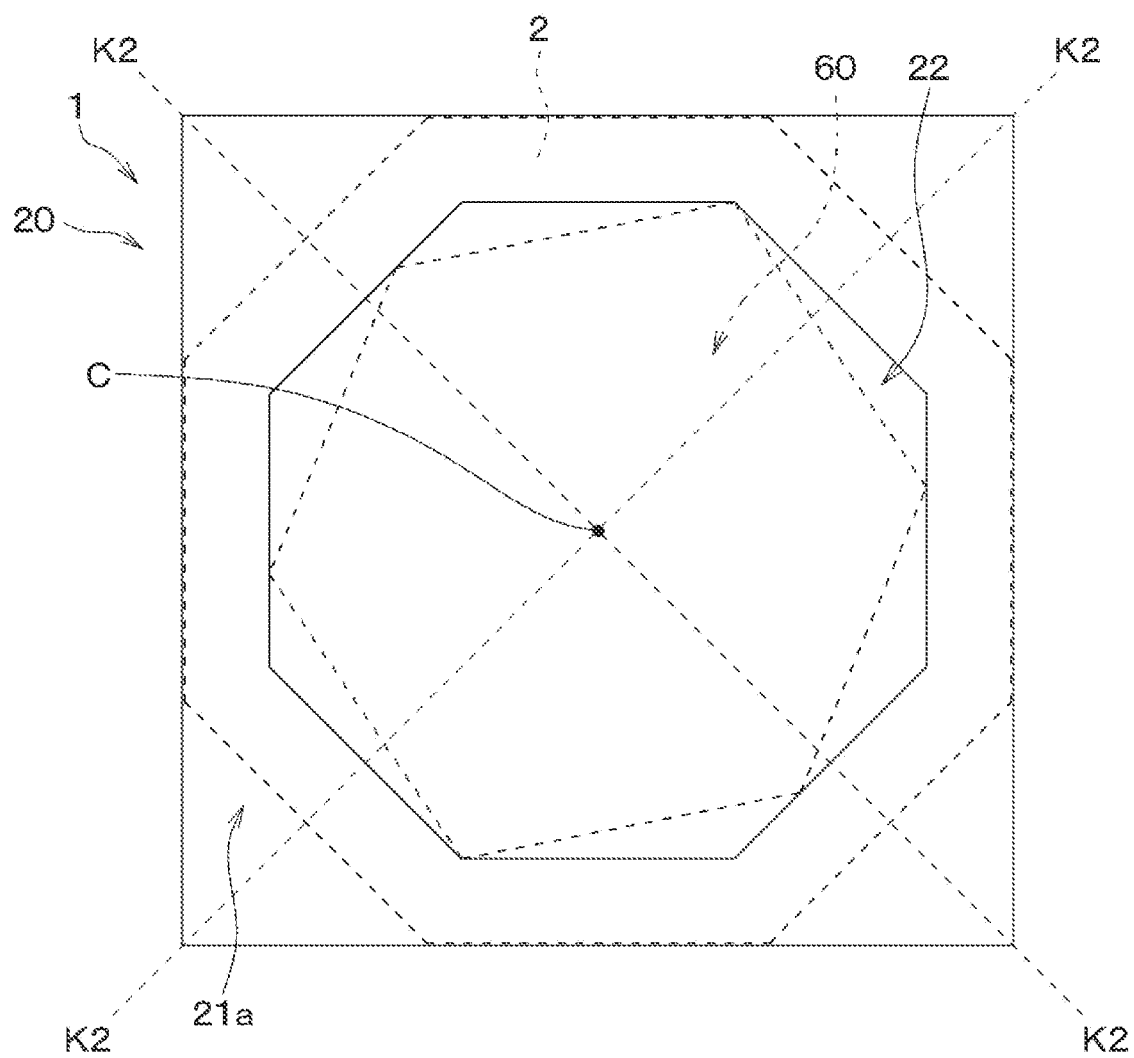
FIG. 35B is a plan view showing a positional relationship between a piezoelectric element and a joining member in a modification of the eleventh embodiment.

A modification of the eleventh embodiment is described. The joining member 2 may have an equilateral triangular shape when being viewed in the normal direction as shown in FIG. 35A, or may have a regular octagonal shape when being viewed in the normal direction as shown in FIG. 35B. Also, although not shown, the joining member 2 may have a regular hexagonal shape, a regular decagonal shape, or the like when being viewed in the normal direction. The joining member 2 may be arranged so as to protrude from the piezoelectric element 1 when being viewed in the normal direction, or may be arranged only inside the piezoelectric element 1.

Figure 36A:
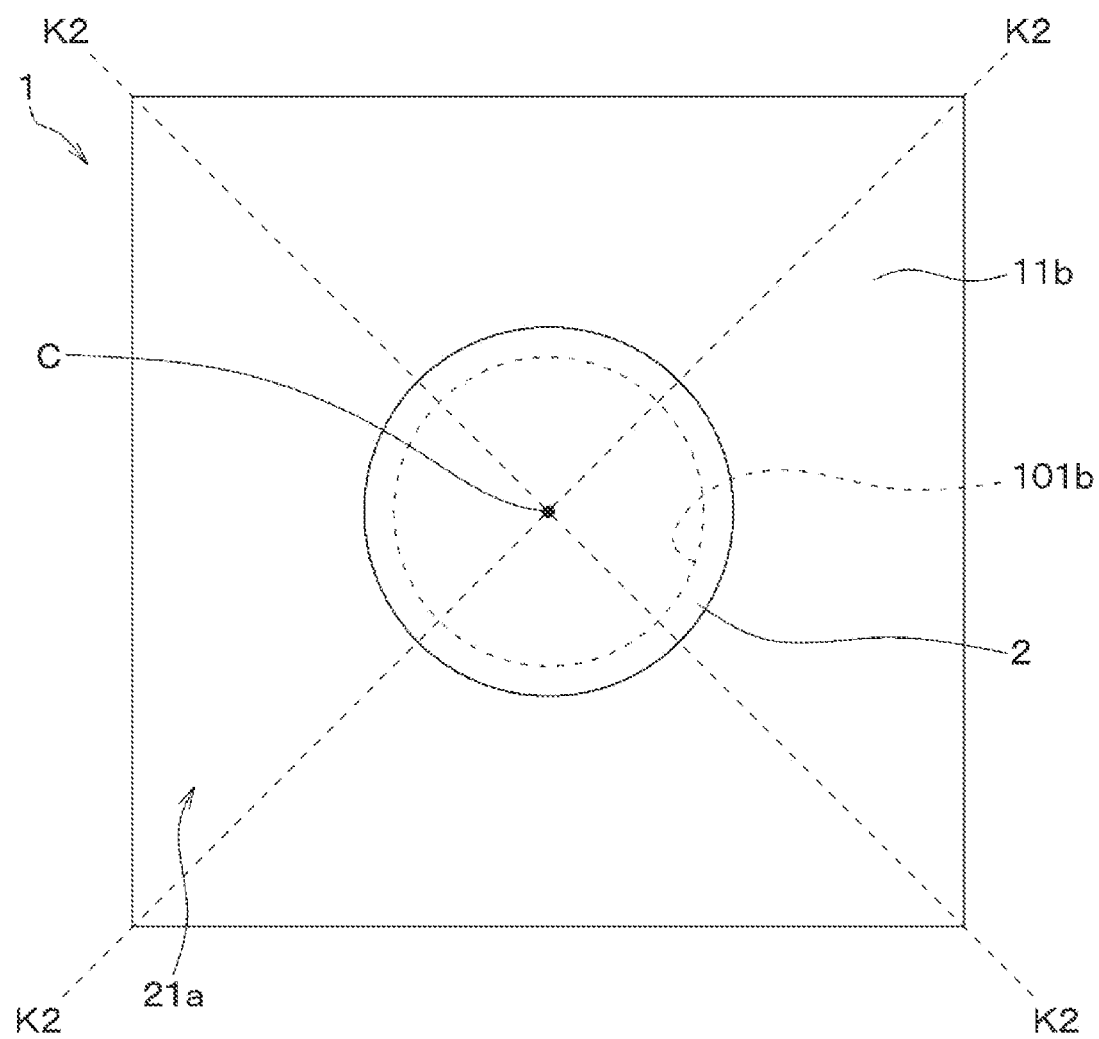
FIG. 36A is a plan view showing a positional relationship between a piezoelectric element and a joining member in a modification of the eleventh embodiment.
Figure 36B:
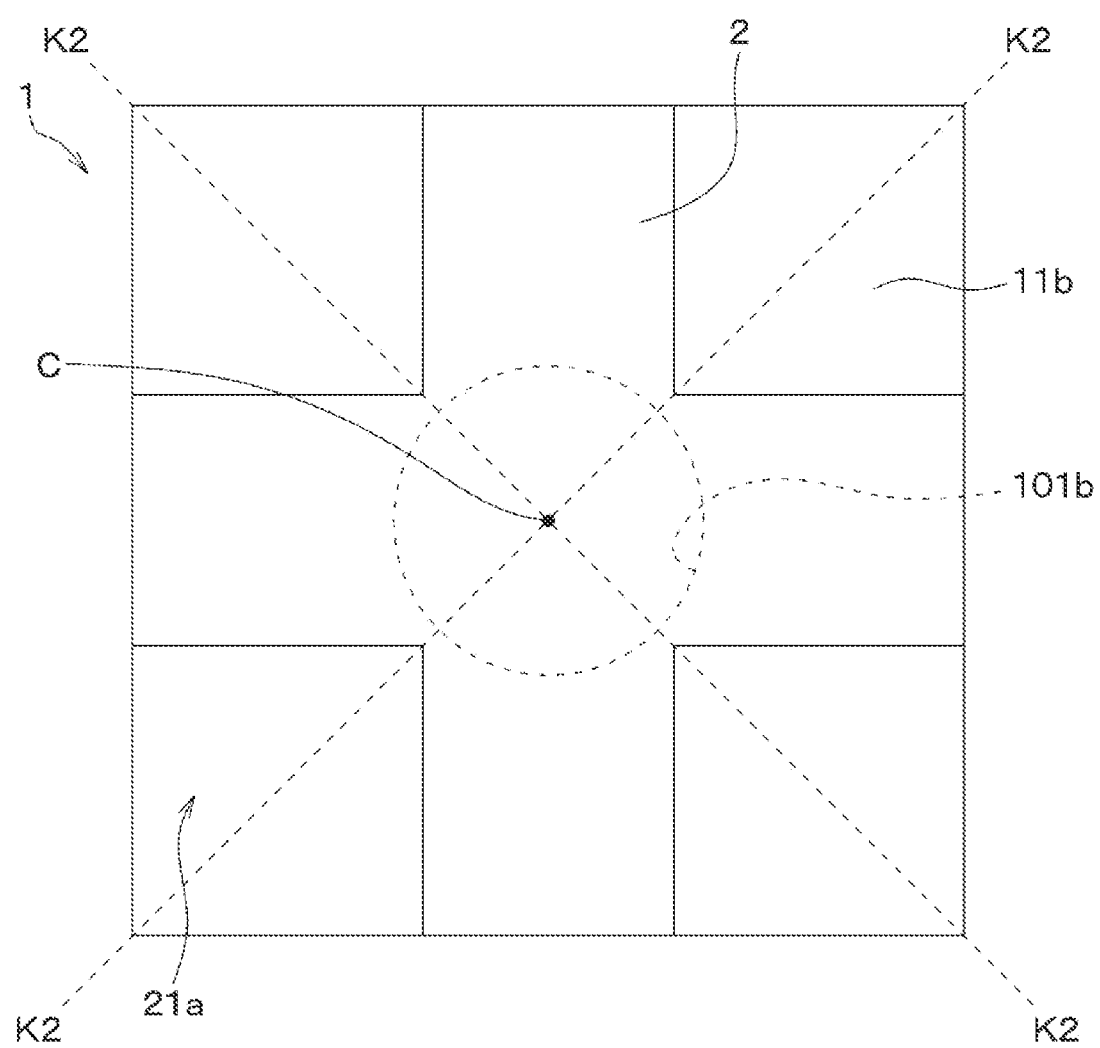
FIG. 36B is a plan view showing a positional relationship between a piezoelectric element and a joining member in a modification of the eleventh embodiment.
Figure 36C:
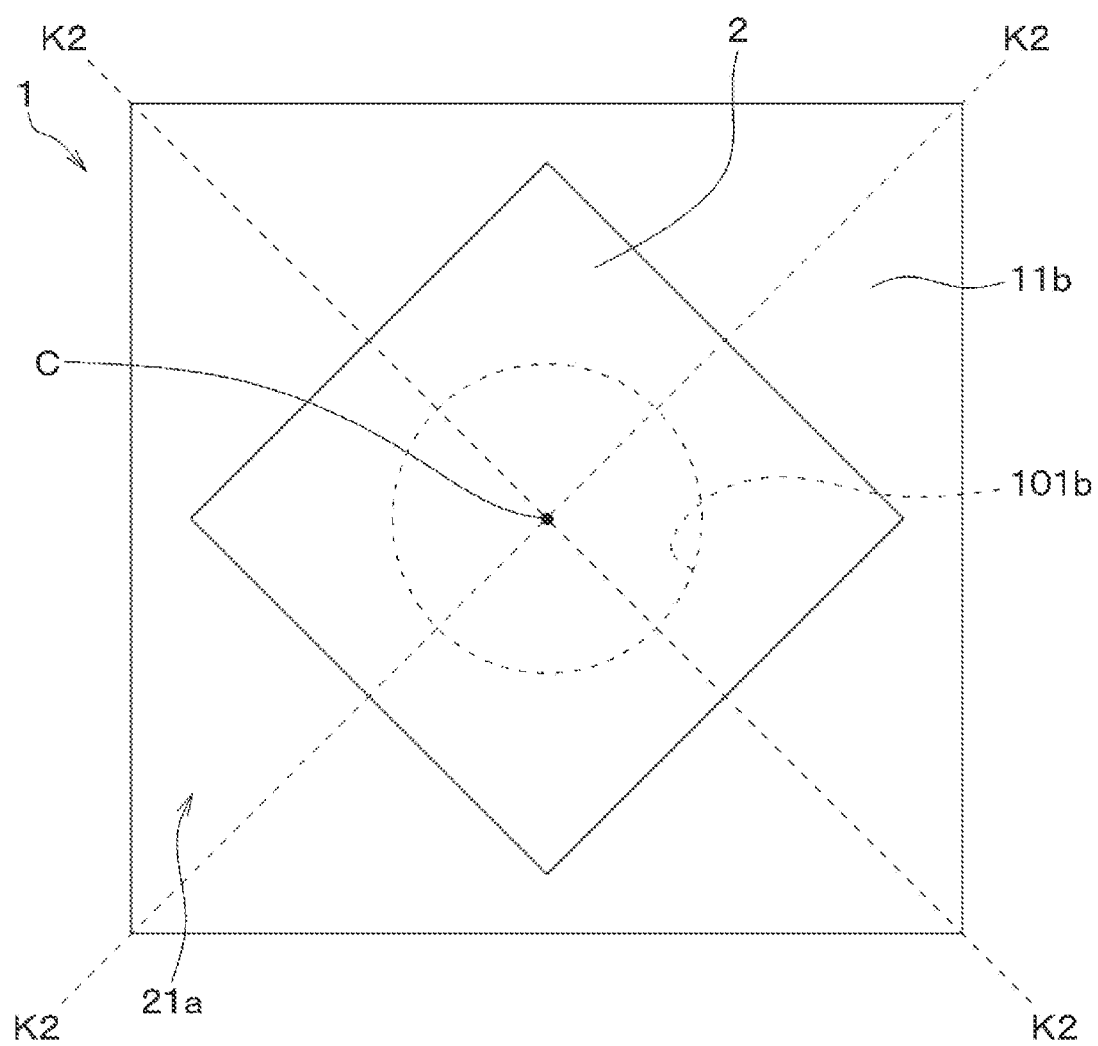
FIG. 36C is a plan view showing a positional relationship between a piezoelectric element and a joining member in a modification of the eleventh embodiment.

Also, the joining member 2 may be arranged as shown in FIGS. 36A to 36C with the through hole 101b formed in the printed circuit board 101 as a reference. FIGS. 36A to 36C are plan views of the piezoelectric element 1 and the joining member 2 viewed from the other surface 11b side of the support substrate 11. Further, in FIGS. 36A to 36C, the vibration region 22 is omitted to be indicated, and the portion facing the through hole 101b is indicated by broken lines. In FIGS. 36A to 36C, the recess 10a formed in the support substrate 11 has a shape that matches the through hole 101b when being viewed in the normal direction.

For example, as shown in FIG. 36A, the joining member 2 may have a ring shape surrounding the through hole 101b when being viewed in the normal direction. Further, as shown in FIG. 36B, the joining member 2 may have a cross shape (i.e., + shape) having one lateral portion and other portion extending orthogonally from the lateral portion when being viewed in the normal direction. Then, the joining member 2 may have a rhombic shape when being viewed in the normal direction, as shown in FIG. 36C. In addition, in FIG. 36B, the corner of the joining member 2 is positioned on the virtual line K2. However, even with such a configuration, since the joining member 2 is joined only to the portions different from the corners of the piezoelectric element 1, the thermal stress is less likely to be propagated to the corners of the piezoelectric element 1, and the same effects as the eleventh embodiment described above is achievable.

Twelfth Embodiment

The twelfth embodiment is described. The present embodiment differs from the first embodiment in that a printed circuit board 101 is formed with protrusions. The rest of the configuration is similar to that of the first embodiment, and will thus not be described repeatedly.

Figure 37:
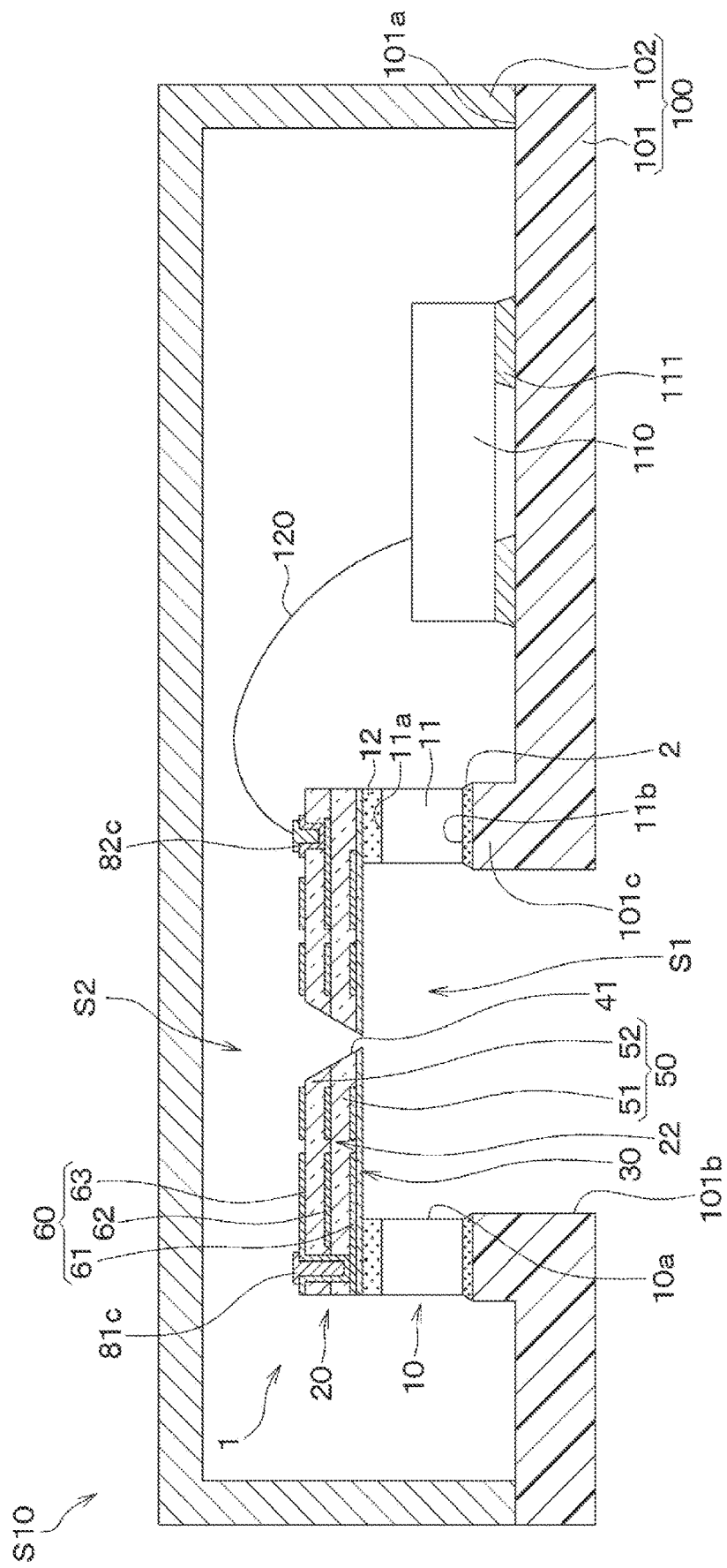
FIG. 37 is a cross-sectional view of a piezoelectric device according to a twelfth embodiment.

In the piezoelectric device S10 of the present embodiment, as shown in FIG. 37, a protrusion is formed on the printed circuit board 101. Specifically, the protrusion 101c is shaped to match the outline of the joining member 2 and is formed of a part of the printed circuit board 101. For example, the projection 101c of the present embodiment is formed in a portion of the printed circuit board 101 that faces the piezoelectric element 1 and is different from the portion that faces the corner of the piezoelectric element 1.

According to the present embodiment described above, since the angle 81 formed by the vibration region 22 is set to 39 to 81 degrees, the same effects as those of the first embodiment described above are achievable.

In the present embodiment, the printed circuit board 101 is formed with the protrusion 101c. Therefore, when the liquid joining member 2 is applied and arranged, the outline of the joining member 2 to be joined to the piezoelectric element 1 can be easily adjusted by applying the joining member 2 onto the protrusion 101c. Therefore, a liquid material can be used as the joining member 2, and the selectivity of the joining member 2 is improved. In particular, when adjusting the shape of the joining member 2 as in the eleventh embodiment, the outline of the joining member 2 can be easily adjusted.

Modification of the Twelfth Embodiment

The modification of the twelfth embodiment is described in the following. In the twelfth embodiment, the protrusion 101c may be formed of a member separate from the printed circuit board 101.

Other Embodiments

Although the present disclosure has been described in accordance with the foregoing embodiments, it is understood that the present disclosure is not limited to the above embodiments or structures. The present disclosure also includes various modification examples or variations within the scope of equivalents. Furthermore, various combination and formation, and other combination and formation including one, more than one or less than one element may be made in the present disclosure.

For example, in each of the above embodiments, the vibrating portion 20 is configurable as long as having at least one layer of the piezoelectric film 50 and at least one layer of the electrode film 60. Further, the piezoelectric element 1 may have a polygonal shape such as a pentagonal shape or a hexagonal shape instead of a rectangular shape in a plan view.

Further, in each of the above embodiments, the float region 21b of the vibrating portion 20 may be divided into three or less vibration regions 22 instead of being divided into four vibration regions 22. Alternatively, the float region 21b may be divided into five or more vibration regions 22.

Figure 38:
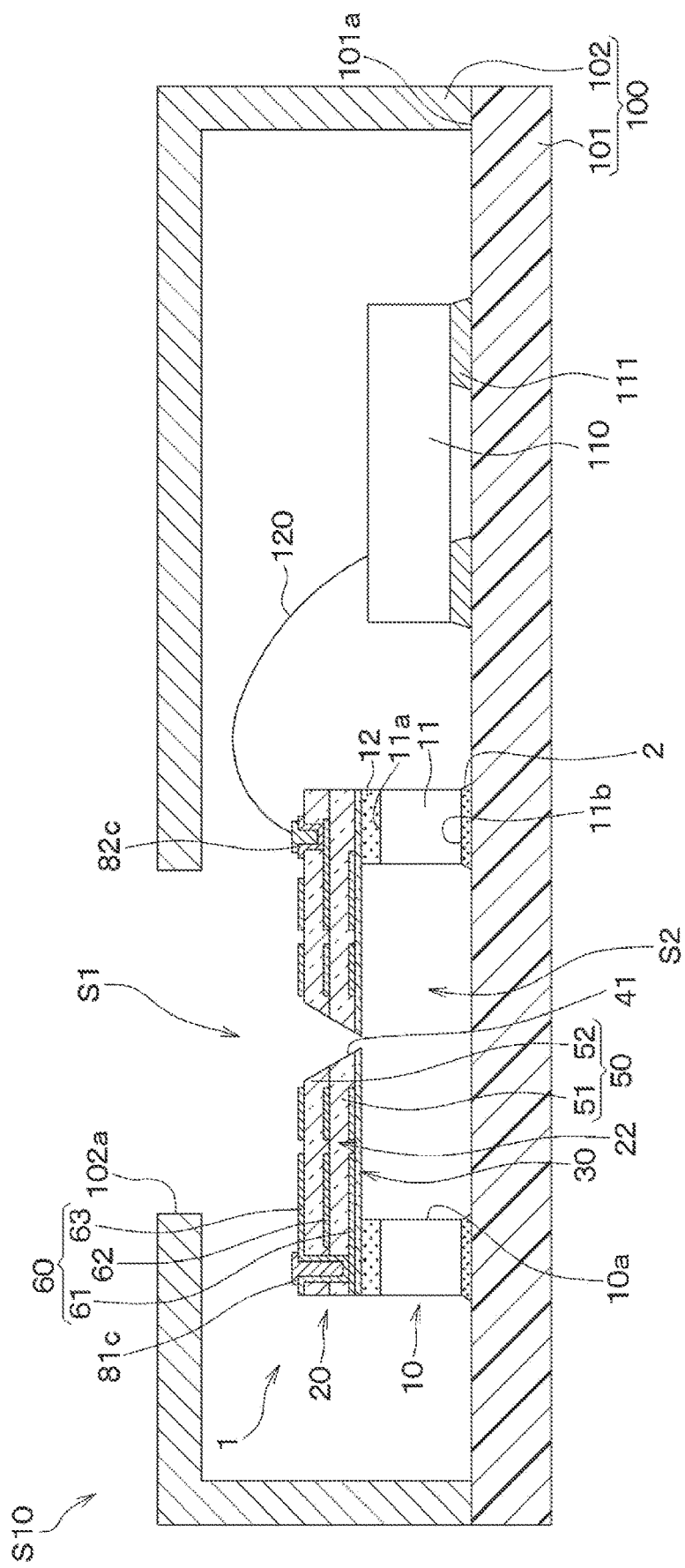
FIG. 38 is a cross-sectional view of a piezoelectric device according to other embodiments.

Furthermore, in each of the above-described embodiments, the piezoelectric device S10 may have a configuration in which a through hole 102a is formed in the lid portion 102, as shown in FIG. 38. In such case, as shown in FIG. 38, the pressure receiving surface space S1 is a space on the one surface 22a side of the vibration region 22 in the casing 100, and the back space S2 is a space on the other surface 22b side of the vibration region 22 in the casing 100.

In each of the above-described embodiments, the slits 41 may be not formed to intersect at the center portion C, and the vibration regions 22 may be supported by the support regions 21a on both sides. According to the above, the resonance frequency of the piezoelectric element 1 can be increased, the frequency range for which the detection sensitivity is maintainable can be widened, and the detection accuracy can be improved.

Each of the above embodiments can be combined as appropriate. For example, the second embodiment described above may be combined with the third to twelfth embodiments, and the slit 41 may have the tapered portion 42 and the constant width portion 43. The fourth and fifth embodiments described above may be combined with the sixth to twelfth embodiments, and the shape of the boundary portion B between the recess 10a and the vibrating portion 20 may be changed. The sixth embodiment described above may be combined with the seventh to twelfth embodiments, and the arrangement positions of the first electrode portion 81 and the second electrode portion 82 may be changed. The seventh embodiment described above may be combined with the eighth to twelfth embodiments, and the slit 41 may be tapered such that the slit width g becomes narrower toward the center portion C. The eighth embodiment described above may be combined with the ninth to twelfth embodiments to define the shape and arrangement of the vibration region 22 and the electrode film 60. The ninth embodiment described above may be combined with the tenth to twelfth embodiments to define the slit length L and the like. The tenth embodiment described above may be combined with the eleventh and twelfth embodiments to change the slit width g of the slit 41 along the thickness direction of the vibration region 22. The eleventh embodiment described above may be combined with the twelfth embodiment described above to define the arrangement position of the joining member 2. In addition, combinations of the above embodiments may be further combined.

What is claimed is:

1. Piezoelectric element comprising:
a support; and
a vibrating portion configured to output a pressure detection signal in accordance with a pressure, wherein
the vibrating portion includes a piezoelectric film disposed on the support and made of scandium aluminum nitride, and an electrode film connected to the piezoelectric film to generate electric charges by deformation and to extract the electric charges generated,
the vibrating portion is configured to have a support region supported by the support, and a plurality of vibration regions connected to the support region and floating from the support,
the plurality of vibration regions are separated from each other by a slit,
the slit has a tapered portion that is tapered from a first surface of the vibration regions on an opposite side to the support, to a second surface opposite to the first surface,
the electrode film is positioned in the vibration region such that the electrode film is not exposed at the tapered portion of the slit when being viewed from a normal direction that is orthogonal to the first surface, and
an angle defined by a side surface of the tapered portion in the vibration region and a surface parallel to the first surface is in a range of 39 to 81 degrees.

2. The piezoelectric element of claim 1, wherein
the angle defined by the side surface of the tapered portion and the surface parallel to the first surface is 63 degrees or less.

3. The piezoelectric element of claim 1, wherein
the angle defined by the side surface of the tapered portion and the surface parallel to the first surface is 45 degrees or more.

4. The piezoelectric element of claim 1, wherein
the slit is configured to have the tapered portion provided on a side of the first surface of the vibration region and a constant width portion provided on a side of the second surface and having a constant width, and the tapered portion and the constant width portion are connected to each other.

5. The piezoelectric element of claim 1, wherein the slit has a tapered shape in which a width of the slit is narrowed from the support region toward an opposite end of the vibration region opposite to the support region.

6. The piezoelectric element of claim 1, wherein the vibration region and the electrode film are arranged in a state of point symmetry with respect to a center portion of the vibration region in the normal direction to the first surface of the vibration region opposite to the support.

7. The piezoelectric element of claim 6, wherein the vibration region has a first region adjacent to the support region, and a second region different from the first region,
the piezoelectric film is made of a material having a hexagonal crystal structure, and
the electrode film is divided by six electrode film slits, and has a hexagonal virtual shape connecting predetermined locations in the electrode film slits of the first region, when being viewed from the normal direction.

8. The piezoelectric element of claim 6, wherein the support has a support substrate and an insulation film disposed on the support substrate and on which the vibrating portion is disposed,
the support substrate and the insulation film are configured to have a recess for floating the vibration region,
the support substrate is made of a silicon substrate, and an outline of the vibration region has a regular octagonal shape when being viewed from the normal direction.

9. The piezoelectric element of claim 1, wherein an outline of the vibration region has a polygonal shape when being viewed from the normal direction to the first surface of the vibration region opposite to the support, and
at least one of the electrode film and the vibration region has a polygonal shape with a corner, and the corner is positioned at a different portion from a virtual line connecting opposite corners of the outline of the vibration section.

10. A piezoelectric device comprising:
a casing; and
a piezoelectric element disposed in the casing, the piezoelectric element includes a support, and a vibrating portion configured to output a pressure detection signal in accordance with a pressure, wherein
the vibrating portion includes a piezoelectric film disposed on the support and made of scandium aluminum nitride, and an electrode film connected to the piezoelectric film to generate electric charges by deformation and to extract the electric charges generated,
the vibrating portion is configured to have a support region supported by the support, and a plurality of vibration regions connected to the support region and floating from the support,
the plurality of vibration regions are separated from each other by a slit,
the slit has a tapered portion that is tapered from a first surface of the vibration regions on an opposite side to the support, to a second surface opposite to the first surface,
the electrode film is positioned in the vibration region such that the electrode film is not exposed at the tapered portion of the slit when being viewed from a normal direction that is orthogonal to the first surface,
an angle defined by a side surface of the tapered portion in the vibration region and a surface parallel to the first surface is in a range of 39 to 81 degrees,
the casing includes a mounted member on which the piezoelectric element is mounted, and a lid portion fixed to the mounted member in a state of accommodating the piezoelectric element in the casing, and
the casing has a through hole communicating with an outside and introducing an atmospheric pressure therein.

11. The piezoelectric device of claim 10, wherein when a space within the casing which is different from a pressure receiving surface space positioned between the through hole and the vibrating portion is defined as a back space, an acoustic compliance of the back space is designated as Cb, and a thickness of the vibration region is designated as h, an average slit width that is an average of widths of the slit along a thickness direction is designated as ga, an air resistance is designated as µ, and a slit length along the side surface of the vibration region of the slit is designated L, the slit length satisfies a following formula $$L \le \frac{3 \times \mu \times h \times 40\pi \times Cb}{\sqrt{2} \times ga^3}. \qquad \text{Formula}$$

12. The piezoelectric device of claim 11, wherein the piezoelectric element has the support mounted on the mounted member via a joining member, and has an outline of a polygonal shape with corner portions when being viewed from the normal direction of the first surface opposite to the support in the vibration region, and
the joining member is arranged at a portion different from the corner portions in the normal direction.

13. The piezoelectric device of claim 12, wherein the joining member has an outline of a polygonal shape with corner portions when being viewed from the normal direction, and the corner portions of the joining member are positioned on a different portion from a virtual line connecting opposite corner portions in the outline of the piezoelectric element.

14. The piezoelectric device of claim 12, wherein the mounted member has a protrusion provided at a portion where the joining member is arranged, and the joining member is arranged on the protrusion.

* * * * *